(12) United States Patent
Kuniyasu et al.

(10) Patent No.: US 9,715,231 B2
(45) Date of Patent: Jul. 25, 2017

(54) AGRICULTURE SUPPORT SYSTEM

(71) Applicant: KUBOTA CORPORATION, Osaka (JP)

(72) Inventors: Tsunehisa Kuniyasu, Osaka (JP); Keisuke Miura, Osaka (JP); Hirotaka Choami, Osaka (JP); Naohiro Saijo, Osaka (JP); Hiromasa Fujiwara, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/777,619

(22) PCT Filed: Sep. 3, 2014

(86) PCT No.: PCT/JP2014/073221
§ 371 (c)(1),
(2) Date: Sep. 16, 2015

(87) PCT Pub. No.: WO2015/033968
PCT Pub. Date: Mar. 12, 2015

(65) Prior Publication Data
US 2016/0291590 A1    Oct. 6, 2016

(30) Foreign Application Priority Data

Sep. 4, 2013  (JP) ................................ 2013-183489
Sep. 4, 2013  (JP) ................................ 2013-183493
(Continued)

(51) Int. Cl.
*G05D 1/00*      (2006.01)
*G06Q 50/02*    (2012.01)
(Continued)

(52) U.S. Cl.
CPC .......... *G05D 1/0011* (2013.01); *G05B 15/02* (2013.01); *G06Q 10/0631* (2013.01); *G06Q 50/02* (2013.01); *G05D 2201/0201* (2013.01)

(58) Field of Classification Search
CPC ......... G05D 1/0071; G05D 2201/0201; G05B 15/02; G06Q 50/02
(Continued)

(56) References Cited

U.S. PATENT DOCUMENTS 5,995,894 A    11/1999  Wendte
6,070,673 A     6/2000  Wendte
(Continued)

FOREIGN PATENT DOCUMENTS

JP    H10-118896    5/1998
JP    11-175609     7/1999
(Continued)

OTHER PUBLICATIONS

Japanese Office Action in related application No. 2013-183489, mailed Jul. 5, 2016.
(Continued)

*Primary Examiner* — McDieunel Marc
*Assistant Examiner* — James E Stroud
(74) *Attorney, Agent, or Firm* — Greenblum & Bernstein, P.L.C.

(57) ABSTRACT

An agriculture support system includes: an operation contents creation part configured to create an operation contents, the operation contents being carried out in an agricultural field; an operation instruction part configured to send the operation contents to a mobile terminal allocated to the agricultural operator; an operation contents storage part configured to storage the operation contents; a first display part configured to display the operation contents on the mobile terminal, the operation contents being sent by the
(Continued)

operation instruction part; a notification part configured to notify an external device of completion of confirming the operation contents, the operation contents being displayed on the mobile terminal, the external device being different from the mobile terminal; and a second display part configured to display the operation contents on the external device, the operation contents being already confirmed by the notification part.

14 Claims, 30 Drawing Sheets

(30) Foreign Application Priority Data

Sep. 4, 2013 (JP) ................................. 2013-183494
Sep. 4, 2013 (JP) ................................. 2013-183495

(51) Int. Cl.
*G05B 15/02* (2006.01)
*G06Q 10/06* (2012.01)

(58) Field of Classification Search
USPC .......................................................... 701/50
See application file for complete search history.

(56) References Cited

U.S. PATENT DOCUMENTS

| | | | |
|---|---|---|---|
| 2010/0010854 A1 | 1/2010 | Watanabe | |
| 2011/0227745 A1 | 9/2011 | Kikuchi et al. | |
| 2014/0273827 A1* | 9/2014 | Killpack | H04L 69/04 455/41.1 |
| 2015/0063129 A1* | 3/2015 | Blasinski | H04L 41/0631 370/252 |
| 2016/0189445 A1* | 6/2016 | Schmidt | G07C 5/085 701/50 |
| 2016/0232621 A1* | 8/2016 | Ethington | G06Q 10/06315 |
| 2016/0247079 A1* | 8/2016 | Mewes | G06N 5/048 |
| 2016/0262370 A1* | 9/2016 | Leeb | A01M 7/0057 |
| 2016/0283791 A1* | 9/2016 | Ogura | G06K 9/00657 |

FOREIGN PATENT DOCUMENTS

| | | |
|---|---|---|
| JP | 2000-292510 | 10/2000 |
| JP | 2004-169355 | 6/2004 |
| JP | 2006-279136 | 10/2006 |
| JP | 2007-048107 | 2/2007 |
| JP | 2009-175914 | 8/2009 |
| JP | 2010-268760 | 12/2010 |
| JP | 2010-282565 | 12/2010 |
| JP | 2011-95934 | 5/2011 |
| JP | 2011-141625 | 7/2011 |
| JP | 2012-039964 | 3/2012 |
| JP | 2013-117853 | 6/2013 |

OTHER PUBLICATIONS

Japanese Office Action in related application No. 2013-183494, mailed Jul. 5, 2016.
Japanese Office Action in related application No. 2013-183495, mailed Jun. 28, 2016.
European Search Report in counterpart application No. 14843027.5, dated Jan. 26, 2017.
Japanese Office Action in related application No. 2013-183489, mailed Dec. 20, 2016.
Japanese Office Action in related application No. 2013-183493, mailed Dec. 13, 2016.

* cited by examiner

Fig.4
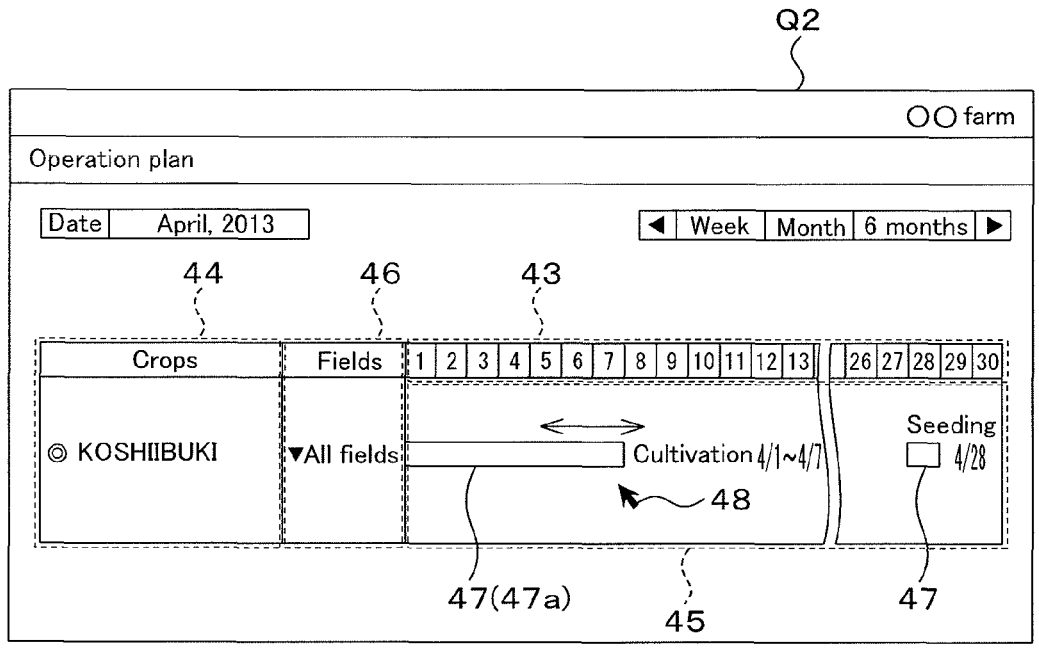
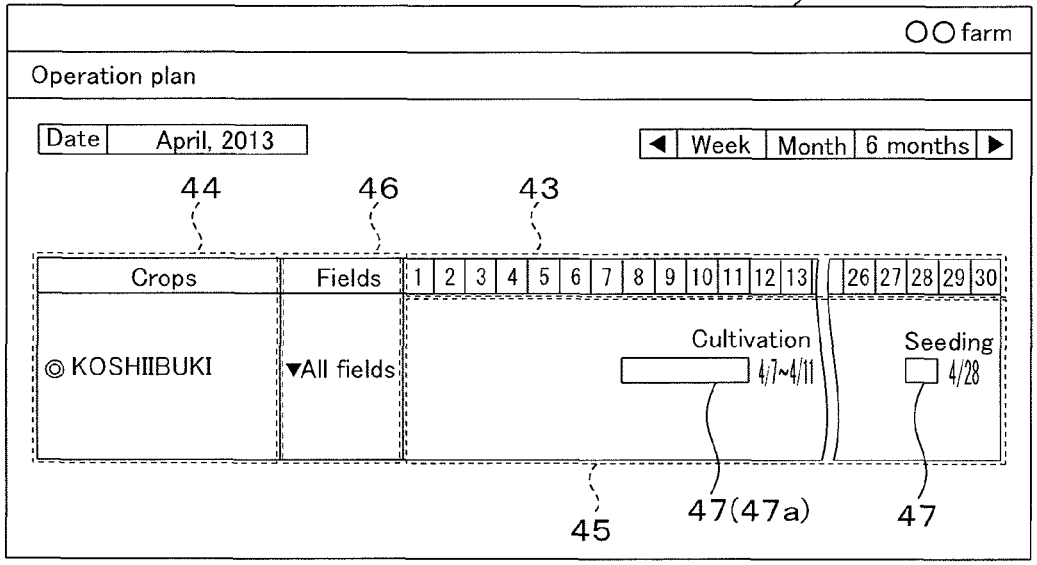

Fig.5
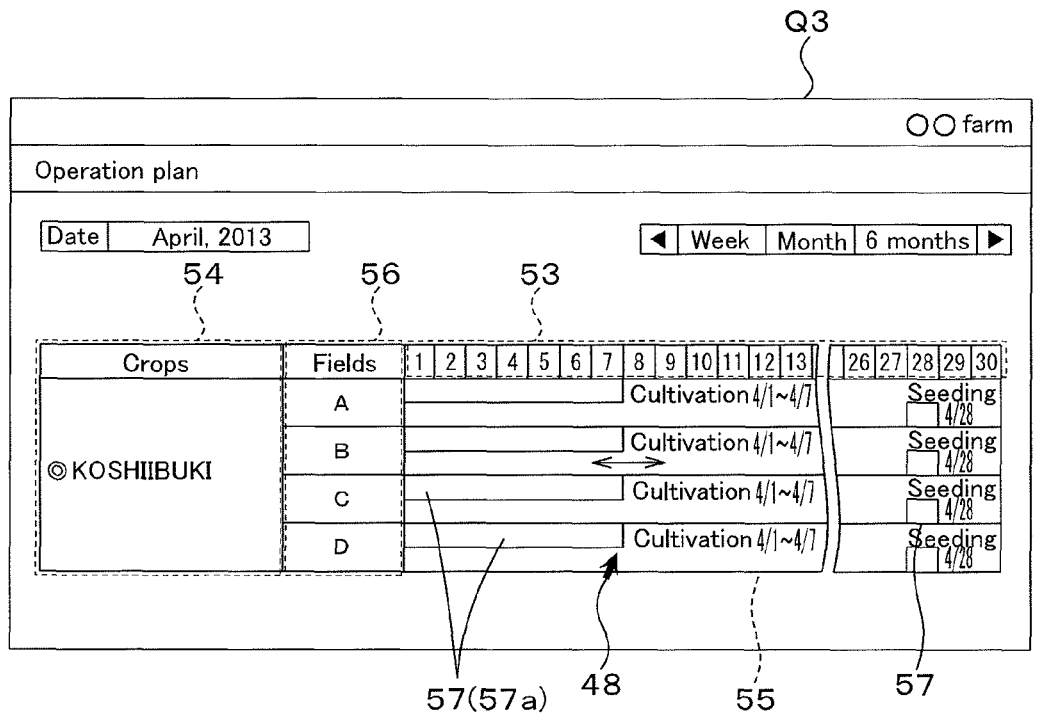
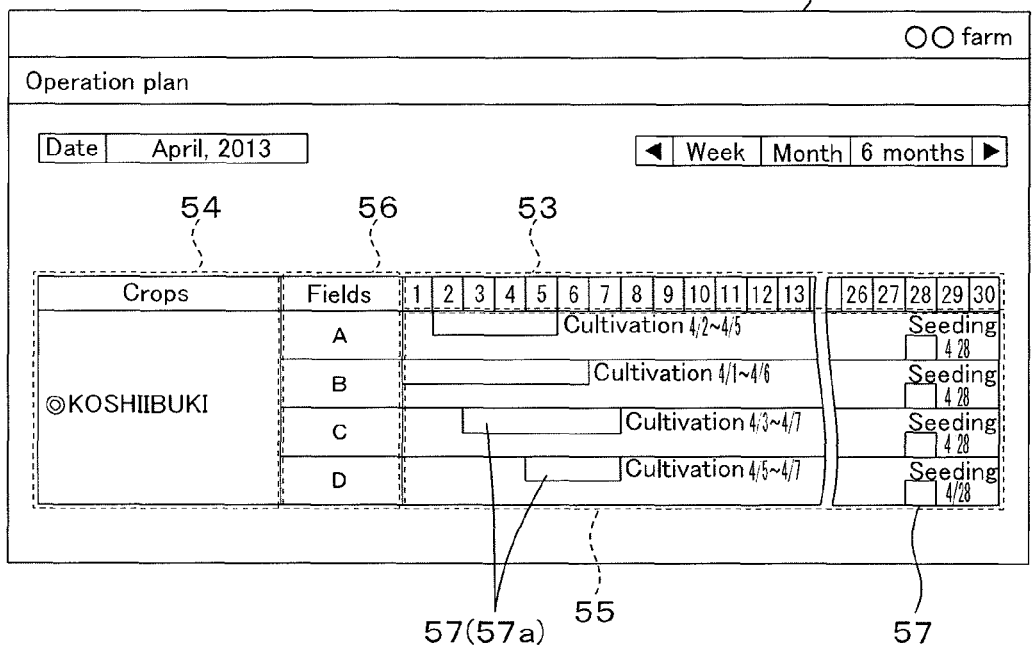

Fig.9

Q5 — ○○farm

62 — Operation instruction

Date | April 4th, 2013        63        ◀ | Week | Month | 6 months | ▶

| Planting plan choice | ○ * * * * *<br>◎ KOSHIIBUKI |

64

```
┌────────┬────────┬────────┐
│        │        │   ╱╱   │
│        │   B    │  ╱╱    │
│        │        │ ╱╱     │
├────────┼────────┼────────┤
│        │ ┌────┐ │        │
│   C    │ │ A  │ │   D    │
│        │ └────┘ │        │
└────────┴────────┴────────┘
```

Operation item (Agricultural operation) | Cultivation  — 65

Operator choice:
- ○ Operator B
- ○ Operator C
- ○ Operator D
66

Operation time
12:00〜17:00
67

Machine choice | NW4511 — 68
Fertilizer choice | Fertilizer for KOSHIIBUKI — 69
Fertilizer setup | per 10a     20 kg — 70

Registration

Fig.10
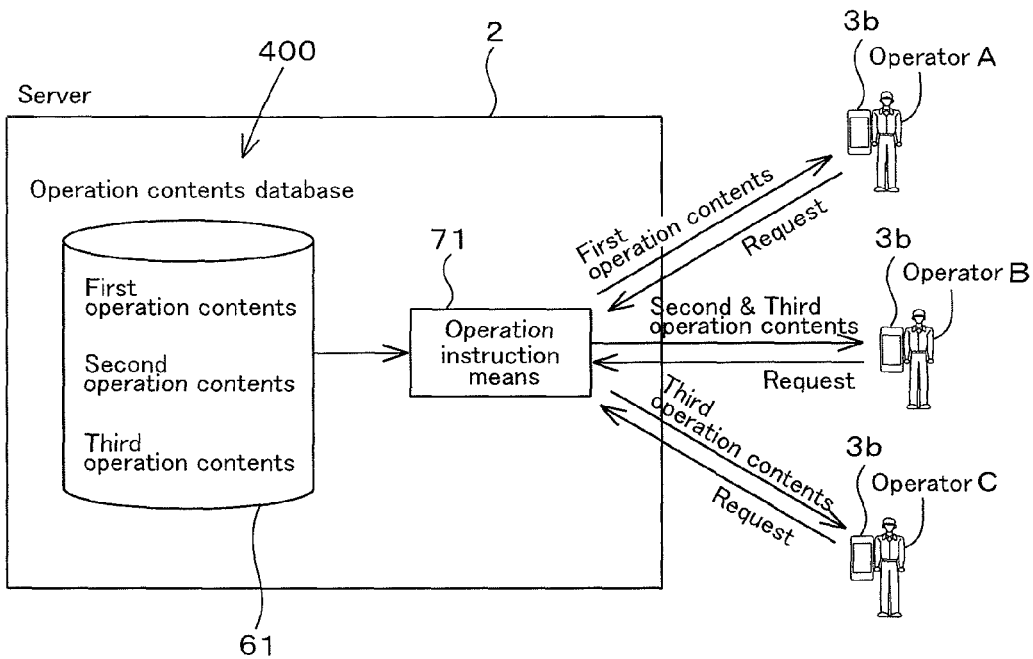
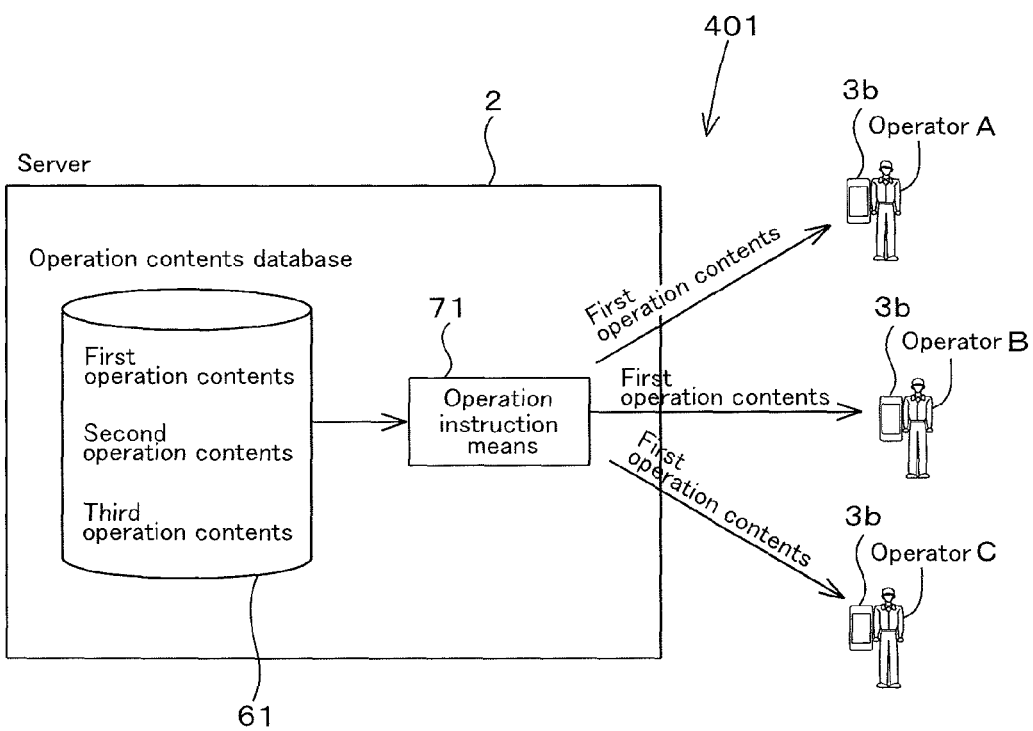

Fig.16

| Journal confirmation | M8 |
|---|---|
| Date | |
| April 4th, 2013 | |
| Operation plan, Field | |
| Operation plan<br>  KOSHIIBUKI<br>Agricultural field<br>   Agricultural field A | |
| Agricultural operation | |
| Cultivation | |
| Operator | |
| Operator A | |
| Machine (Implement) | |
| HW4511 | |
| Fertilizer, Distribution amount | |
| Fertilizer A, 20kg per 10a | |
| Register journal | 83 |

|  | 1st operation contents | 2nd operation contents | 3rd operation contents |
|---|---|---|---|
| Date | 4th, April | 4th, April | 4th, April |
| Planting plan | KOSHIIBUKI | KOSHIIBUKI | KOSHIIBUKI |
| Agricultural field | Agricultural field A | Agricultural field B | Agricultural field C |
| Agricultural operation (Operation item) | Cultivation | Cultivation | Cultivation |
| Operation time | 12:00~17:00 | **** | **** |
| Operator (Practice Operator) | Operator A | Operator B | Operators B, C |

801

|  | 1st actual report | 2nd actual report |
|---|---|---|
| Date | 4th, April | 4th, April |
| Planting plan | KOSHIIBUKI | KOSHIIBUKI |
| Agricultural field | Agricultural field A | Agricultural field B |
| Agricultural operation (Operation item) | Cultivation | Cultivation |
| Operation time | 12:00~17:00 | **** |
| Operator (Practice Operator) | Operator A | Operator B |

Fig.29

| Crops | Default values |
|---|---|
| KOSHIIBUKI | Cultivation 4/1~4/7   Seeding 4/28··· |
| KOSHIHIKARI | Cultivation 4/5 ··· |

900

| Crops | Agricultural fields | Operation plans |
|---|---|---|
| KOSHIIBUKI | Agricultural field A | Cultivation 4/2~4/3   Seeding 4/28··· |
| | Agricultural field B | Cultivation 4/1~4/7   Seeding 4/28··· |
| | Agricultural field C | Cultivation 4/2~4/3   Seeding 4/28··· |
| | Agricultural field D | Cultivation 4/2~4/3   Seeding 4/28··· |

901

| Crops | Default values |
|---|---|
| KOSHIIBUKI | Cultivation 4/2,4/3   Seeding 4/28··· |
| KOSHIHIKARI | Cultivation 4/5 ··· |

AGRICULTURE SUPPORT SYSTEM

CROSS-REFERENCE TO RELATED APPLICATIONS

The present application claims priority under 35 U.S.C. §119 to Japanese Patent Application No. 2013-183489, filed Sep. 4, 2013, to Japanese Patent Application No. 2013-183493, filed Sep. 4, 2013, to Japanese Patent Application No. 2013-183494, filed Sep. 4, 2013 and to Japanese Patent Application No. 2013-183495, filed Sep. 4, 2013. The contents of these applications are incorporated herein by reference in their entireties

DETAILED DESCRIPTION OF THE INVENTION

Technical Field

The present invention relates to an agriculture support system for supporting agricultural operations of a plurality of agricultural operators, for example.

BACKGROUND ART

Conventionally, a private farmer and a farming group manage an agricultural field, an agricultural operation, an operator (an agricultural operator) for the agricultural operation, and the like. These agricultural managements are usually carried out by using a notebook and the like; however, the agricultural managements increasingly depend on the IT in accordance with development of the information technology. Patent document 1 discloses, for example, a system using a computer and the like as a technique for the agricultural managements.

The system disclosed in Patent document 1 preliminarily registers an operation content, an operation term, and a weather condition for start of the operation to an operation contents database, for each of the agricultural fields. And, when an agricultural operator arrives at a certain agricultural field, the agricultural operator specifies the corresponding agricultural field based on positional information received from a mobile terminal, the mobile terminal being carried by the agricultural operator. When date of the agricultural field corresponds to the operation term for the specified agricultural field and a present weather condition obtained from a weather site satisfies the weather condition preliminarily registered in the operation contents database, the system records that the operation preliminarily registered in the operation contents database is already done in the specified agricultural field.

An agricultural operation device disclosed in Patent document 2 includes: an operation rule information storage part configured to store operation rule information, the operation rule information including: operation information showing an operation, the operation having to be carried out when a condition relating to a state of crop or a state of environment is satisfied; and a contribution of the operation to the growth of the crop; an operation rule information extraction part configured to extract the operation rule information from the operation rule information storage part, the operation rule information including a condition meeting: information showing the inputted state of crop; or information showing the inputted state of environment; and an operation instruction part configured to output the operation information, the operation information being included in the extracted operation rule information. That is, Patent document 2 discloses that the operation information is outputted from the agricultural operation support system to the agricultural operator on the basis of the operation rule information corresponding to the condition when the condition relating to the state of crop or the state of environment meets the information.

A use history management system for an agricultural chemical or a fertilizer disclosed in Patent document 3, provides a progression confirmation information shown comparing a use plan in a use plan table to an accumulated result of a use result in a use result table by a use plan data input/output part and a use result data input/output part cooperating with each other when a mobile terminal outputs a progression confirmation request.

A production distribution management system for an agricultural production disclosed in Patent document 4, refers to a seeding possible period listed on a seeds and seedlings information database, a standard growth term, a standard harvesting amount per unit area, a standard price of a breed and an item listed on a price database, and the like, and is capable of planning an annual production plan, estimating a sales amount based on the above mentioned values. That is, Patent document 4 discloses that a relation between an agricultural field, an agricultural operation, and an agricultural operation term is determined as the production plan.

RELATED ART DOCUMENTS

Patent Documents

[Patent Document 1] Japanese Unexamined Patent Application Publication No. 2007-048107
[Patent Document 2] Japanese Unexamined Patent Application Publication No. 2012-039964
[Patent Document 3] Japanese Unexamined Patent Application Publication No. 2010-282565
[Patent Document 4] Japanese Unexamined Patent Application Publication No. H11-175609

DISCLOSURE OF THE INVENTION

Problems to be Solved by the Invention

The system disclosed in Patent document 1 is a technique for automatically creating a daily journal (a report) by storing the operation contents to an agricultural operation journal database when an actual weather condition meets the weather condition shown in the operation contents. The operation contents can be automatically created as the report by using the system of Patent document 1; however, a manager and the like actually cannot check the operation contents during the agricultural operation.

The agricultural operation support device disclosed in Patent document 2 can output the operation information (the operation contents) from the agricultural operation support device to the agricultural operator. However, in order to carry out the agricultural operation shown in the agricultural contents by using an agricultural machine, the agricultural operator is required to set a configuration of the agricultural machine in reference to the operation contents.

The use history management system disclosed in Patent document 3 can provide a progression state against the use plan on the basis of the use plan and the use result of the agricultural chemicals. In the use history management system, the progression state of the agricultural chemicals in each agricultural field can be known; however, in a case where the manager owns a plurality of agricultural field, it is actually hard to know the progression state totally of all the agricultural fields.

The production distribution management system for an agricultural production disclosed in Patent document 4, can create a production plan (an operation plan) for determining the relation between the agricultural field, the agricultural operation, and the agricultural operation term, however, does not consider creation of the operation plan for several years. For this reason, it is required to newly think and create the operation plan every time when a planting year of the crop changes, and thus the creation of the operation plan is hard.

In consideration of the above mentioned problems, the present invention intends to provide an agriculture support system capable of allowing the manager to confirm (check) the operation contents during an agricultural operation by the agricultural operator, the operation contents being carried out by the agricultural operator.

Means of Solving the Problems

To achieve the above-mentioned purpose, the present invention provides the following technique.

In particular, an agriculture support system includes: a mobile terminal allocated to an agricultural operator; an external device different from the mobile terminal; an operation contents creation part configured to create an operation contents, the operation contents being carried out in an agricultural field; an operation instruction part configured to send the operation contents to the mobile terminal; a first display part configured to display the operation contents on the mobile terminal, the operation contents being sent by the operation instruction part; a notification part configured to notify the external device of completion of confirming the operation contents, the operation contents being displayed on the mobile terminal; and a second display part configured to display the operation contents on the device, the operation contents being already confirmed.

In addition, an agriculture support system includes: a mobile terminal allocated to an agricultural operator; a server; an operation contents creation part configured to create an operation contents, the operation contents being carried out in an agricultural field; an operation instruction part configured to send the operation contents to the mobile terminal; and an operation contents storage part configured to store the operation contents, wherein the mobile terminal includes: an obtaining part configured to obtain the operation contents from the operation contents storage part; a first display part configured to display the operation contents; and a notification part configured to notify the server of completion of confirming the operation contents and to notify the server of completion of an agricultural operation, and the server creates the operation contents as an interim report when confirmation of the operation contents is notified from the notification part, and converts the interim report into an actual report when completion of the agricultural operation is notified from the notification part.

The mobile terminal creates the operation contents as the interim report in the confirmation of the operation contents, and includes: a creation part configured to convert the interim report into the actual report in the completion of the agricultural operation.

In addition, an agriculture support system includes: a mobile terminal allocated to an agricultural operation; an external device different from the mobile terminal; an operation contents creation part configured to create an operation contents, the operation contents being carried out in an agricultural field; and an operation instruction part configured to send the operation contents to the mobile terminal, wherein the mobile terminal displays the operation contents sent by the operation instruction part, and notifies completion of confirming the operation contents, the operation contents having been displayed, and the external device displays the operation contents confirmed by the mobile terminal.

Furthermore, an agriculture support system includes: a mobile terminal allocated to an agricultural operation; a server; and an operation contents creation part configured to create an operation contents, the operation contents being carried out in an agricultural field, wherein the mobile terminal includes: an obtaining part configured to obtain the operation content; a first display part configured to display the operation contents; and a notification part configured to notify the server of completion of confirming the operation contents and to notify the server of completion of an agricultural operation, and the server creates the operation contents as an interim report when confirmation of the operation contents is notified from the notification part, and converts the interim report into an actual report when completion of the agricultural operation is notified from the notification part.

An agriculture support system includes: a mobile terminal allocated to an agricultural operator; a control device configured to communicate with the mobile terminal, the control device being mounted on an agricultural machine; an operation contents creation part configured to create an operation contents, the operation contents including an agricultural operation and an agricultural field for the agricultural operation; and an operation instruction part configured to send the operation contents to the mobile terminal, wherein the mobile terminal includes: a setup part configured to extract a setup value of the agricultural machine from the operation contents and send the setup value to the control device when the agricultural operation shown in the operation contents is an operation of the agricultural machine, and the control device configured to set up the agricultural machine based on the setup value.

The mobile terminal includes: a display part configured to display the operation contents, the operation contents already received, and the setup part sends the setup value to the control device when the operation contents displayed by the display part is confirmed.

The control device outputs a warning to a display device of the mobile terminal or of the agricultural machine when the setting of the agricultural machine cannot be carried out by using the setup value, the warning indicating that the setup cannot be carried out.

An agriculture support system includes: an operation plan setup part configured to set an operation plan for each of the agricultural fields, the operation plan relating an agricultural operation and the agricultural operation period to each other; an operation plan storage part configured to store the operation plan; a calculation part configured to calculate a progression state of the operation plan; and a progression display part configured to display the progression state, wherein the calculation part extracts the agricultural fields for as identical agricultural operation from the operation plan storage part to calculate a completion rate of the agricultural fields where the agricultural operation completed in a group of the agricultural fields having been extracted, and the progression display part displays the completion rate of the agricultural fields as the progression state.

The progression display part includes: a first scale configured to display the completion rate of the agricultural fields; a second scale configured to display an agricultural operation period of the identical agricultural operation for the group of the agricultural fields along the first scale.

The progression display part displays date of display of the progression state on the first scale or the second scale.

The progression display part displays, on the agricultural field map: the agricultural field where the agricultural operation completed; and the agricultural field where the agricultural operation does not complete.

In addition, an agriculture support system includes: an operation plan setup part configured to set an operation plan of an agricultural operation being to be carried out in an agricultural field, the agricultural field being for a predetermined crop to be planted; an operation standard storage part configured to store a default value of the operation plan for each of the crops; and a default change part configured to change the operation plan into a default value corresponding to a predetermined crop when the operation plan of the predetermined crop is set by the operation plan setup part, wherein the operation plan setup part obtains the default value of the operation plan of the crop from the operation standard storage part in the setting of the operation plan, the crop being related to the agricultural field, and sets the operation plan on the basis of the default value previously obtained.

The agriculture support system includes: an operation plan storage part configured to store the operation plan, the operation plan being set by the operation plan setup part, wherein the operation plan setup part obtains the default value of the operation plan from the operation standard storage part, the operation plan including: the agricultural operation for the agricultural field; and the agricultural operation period, and is capable of changing the agricultural operation and/or the agricultural operation period each having obtained, the operation plan storage part stores the agricultural operation and/or the agricultural operation period as the operation plan, the agricultural operation and the agricultural operation period each having changed, and the default change part writes the agricultural operation and/or the agricultural operation period to the operation standard storage part as the default value when the agricultural operation and/or the agricultural operation period is changed by the operation plan setup part, the agricultural operation and the agricultural operation period each having changed, the default value having changed.

Effects of the Invention

According to the present invention, an external device allocated to a manager and the like can be notified that an agricultural operator confirmed an operation contents by using a mobile terminal at start of an agricultural operation, and the manager can confirm the operation contents through the external device, the operation contents being carried out by the agricultural operator.

In addition, in a case where the agricultural operator confirmed the operation contents at the start of the agricultural operation by using the mobile terminal, the operation contents can be stored as an interim report to a server, and the operation contents being carried out by the agricultural operator can be confirmed on a side of the server, for example. Moreover, at completion of the agricultural operation, the interim report can be converted into an actual report, the actual report can be stored on the side of the server, and thus the actual report can be confirmed on the side of the server, the actual report showing a result of the agricultural operation.

Furthermore, the interim report and the actual report can be stored in the mobile terminal even in a case where the side of the server could not create the interim report and the actual report due to an influence of the communication, such as a temporal impossibility of the communication between the mobile terminal and the server, for example.

In addition, an agricultural machine can be easily setup on the basis of the operation contents.

Moreover, the agricultural operator can watch the operation contents and can set up the agricultural machine on a timing to start the agricultural operation.

Furthermore, it can be immediately known that the agricultural machine does not match the operation contents, for example.

In addition, a progression state (a completion rate of the agricultural fields) of the operation plan can be easily known even in a case where a plurality of the agricultural fields are managed.

Moreover, not only the completion rate of the agricultural fields can be easily known by a first scale, but also a relationship between the completion rate of the agricultural fields and the agricultural operation period can be known by a second scale, and not only the completion rate of the agricultural fields to an agricultural field group but also a progression (a temporal progression) to the agricultural operation period can be easily known.

Furthermore, both of: a timing of confirmation of the progression state (a date of display of the progression state); and the completion rate of the agricultural fields or the agricultural operation period can be known at the same time.

In addition, positions of: the agricultural fields where the agricultural operation completed; and the agricultural fields where the agricultural operation does not complete can be easily known.

Moreover, the operation plan actually created in past can be easily reflected to the operation plan being to be newly created, and thereby the creation of the operation plan becomes easy.

Furthermore, in a case of creating the operation plan including the agricultural operation and the agricultural operation period, the agricultural operation and the agricultural operation period can be easily set up.

BRIEF DESCRIPTION OF THE DRAWINGS

FIG. 4 is a view showing: a common setup screen before changed; and the common setup screen after changed;

FIG. 5 is a view showing: an individual setup screen before changed; and the individual setup screen after changed;

FIG. 9 is a view showing an operation creation screen;

FIG. 10 is a view showing: an example of sending the operation contents to a target agricultural operator; and an example of sending the operation contents to a non-target agricultural operator;

FIG. 16 is a view showing a report confirmation screen;

FIG. 25 is an explanation view showing a relation between the proper report and completion of the agricultural operation;

FIG. 29 is a view showing an example of the operation plans of individual agricultural fields before changed, the operation plans of individual agricultural fields after changed, and default values after changed.

BEST MODE FOR CARRYING OUT THE INVENTION

Referring to drawings, an agriculture support system according to an embodiment of the present invention will be described below.

Figure 1:
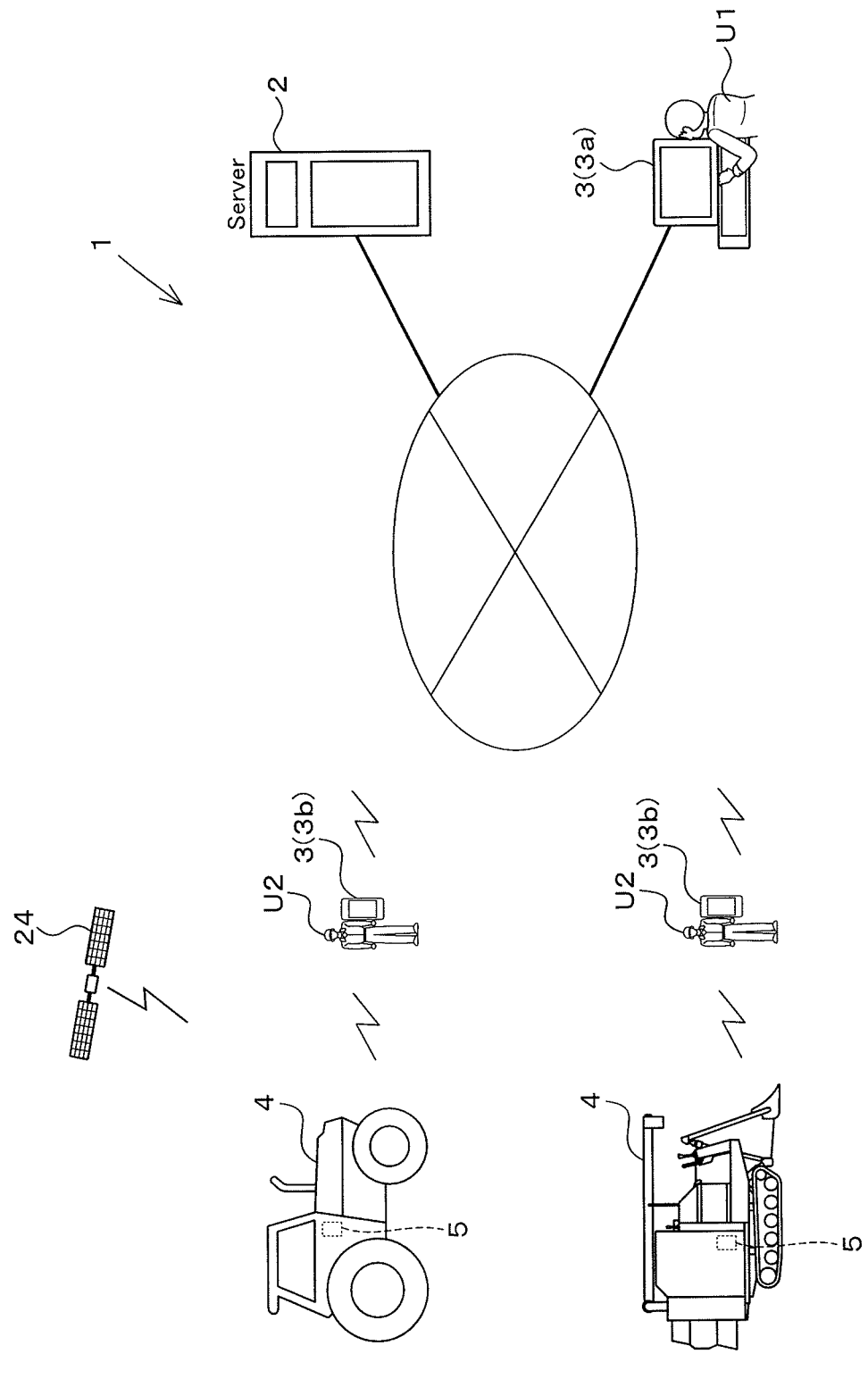
FIG. 1 is an overall view showing an agriculture support system.

FIG. 1 shows an overall view of an agriculture support system.

As shown in FIG. 1, the agriculture support system 1 is configured to support the agriculture, and includes a server 2 configured to provide various supports relating to the agriculture. The server 2 mainly provides: a support for creating various plans (a planting plan and an operation plan), the plans being created by a manager and the like; and a support for creating an instruction document (operation contents) of an agricultural operation. In addition, the server 2 supports management of an agricultural result, and supports analysis and evaluation of the agricultural result.

The agriculture support system 1 includes a computer (node) 3 configured to be connected to the server 2. The computer 3 is roughly divided into a management computer 3a operated by a manager U1 and an operator computer 3b operated by an agricultural operator U2. The management computer 3a is constituted, for example, of a personal computer installed on a farmhouse and the like, and the operator computer 3b is constituted of a mobile terminal.

Moreover, the agriculture support system 1 includes a data collection device 5 mounted on an agricultural machine 4. The data collection device 5 communicates with the mobile terminal 3b to send and receive various data. For example, the data collection 5 collects data (agricultural operation data) generated by an operation of the agricultural machine 4, and sends the data to the mobile terminal 3b. Meanwhile, the agricultural machine 4 is a tractor, a combine, a rice transplanter, or the like.

The agriculture support system 1 is capable of creating the various plans (the planting plan and the operation plan) and the instruction document (the operation contents) on the server 2 by connecting the management computer 3a to the server 2. In addition, the system is capable of issuing an operation instruction to the agricultural operator by sending the created operation contents from the server 2 to the mobile terminal 3b. Furthermore, the system is capable of storing the agricultural operation data to the server 2 by sending the agricultural operation data from the mobile terminal 3b to the server 2, and capable of analyzing and evaluating the agricultural operation data in the server 2.

The agriculture support system 1 will be explained below showing a tractor, that is, one of the agricultural machines 4 as an example. A configuration of the tractor will be explained first.

Figure 30:
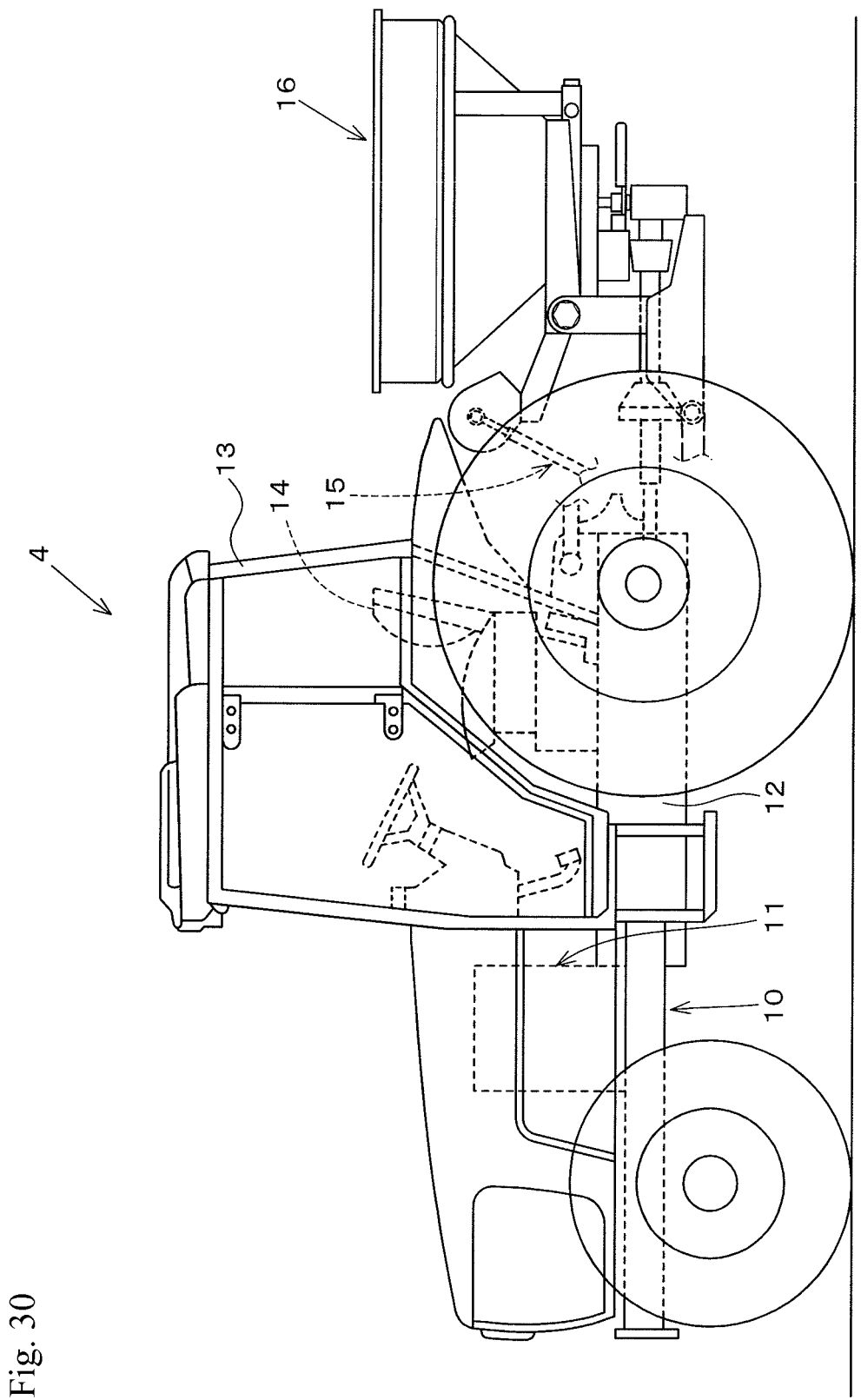
FIG. 30 is a schematic overall view of a tractor.

As shown in FIG. 30, the tractor 4 includes a travel vehicle (travel body) 10 provided with wheels at a front and of and a rear end of the travel vehicle 10, an engine 11, and a transmission gearbox 12. A standalone cabin 13 is disposed in rear of the engine 11, and an operator seat 14 is disposed in the cabin 13. In addition, various types of implements and the like can be attached to a rear portion of the travel vehicle 10. In particular, a three-point link mechanism 15 is disposed on the rear portion of the travel vehicle 10, the three-point link mechanism 15 being configured to be freely movable upward and downward, and a PTO shaft is disposed on the rear portion of the travel vehicle 10, the PTO shaft being configured to transmit a motive power from the engine 11. An operation tool 16 such as a fertilizer distributor, a cultivator, an agricultural chemicals distributor, a seed distributor, or a harvest machine can be freely attached to and detached from the three-point link mechanism 15. Meanwhile, FIG. 30 shows an example where the fertilizer distributor is attached to the three-point link mechanism 15.

Figure 2:
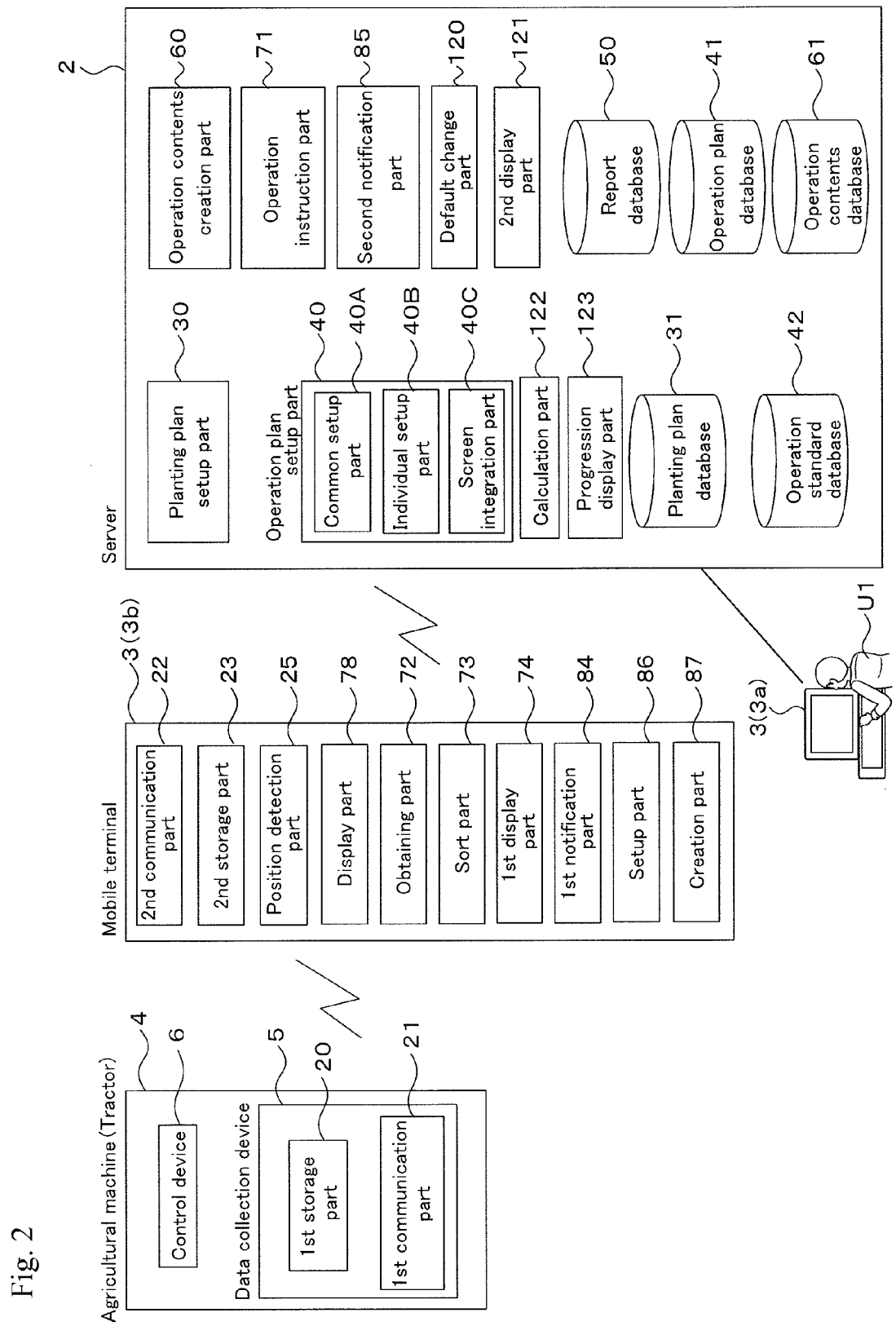
FIG. 2 is a block diagram showing the agriculture support system.

As shown in FIG. 2, the data collection device 5 and a control device 6 are mounted on the tractor 4. The data collection device 5 and the control device 6 are connected to each other by a vehicle communication network. The control device 6 controls a travel system, an operation system, and the like of the tractor 4. The control device 6 controls an operation of the engine as the control of the travel system. The control device 6 controls: the moving of the three-point link mechanism 15; an output (a revolution speed) of the PTO shaft; and the like in accordance with an inputted signal value as the control of the operation system when receiving an input from an operation tool such as an operation lever and an operation switch, the operation lever and the operation switch being disposed around the operator seat.

Control signals and various types of detection signals (for example, signals detected by sensors) are outputted to the vehicle communication network to be transmitted to each of sections of the tractor 4, the control signals controlling the travel system and the operation system of the tractor 4, the detection signals being used for the controls. Meanwhile, the control of the travel system and the control of the operation system by the control device 6 are not limited to the above-described examples.

The data collection device 5 automatically collects various data relating to the agricultural operations through the vehicle communication network, the agricultural operations being performed during the operation of the tractor 4. For example, data such as a revolution speed of a rotary, a load of the rotary, a revolution speed of the engine, a vehicle speed, and a depth of plowing are outputted to the vehicle communication network when the cultivator as the operation tool 16 is jointed to the rear portion of the tractor 4 and then the cultivator is in operation. The data collection device 5 obtains the data such as the revolution speed of the rotary, the load of the rotary, the revolution speed of the engine, the vehicle speed, and the depth of plowing as the agricultural operation data.

In addition, in a case where the operation tool 16 is the fertilizer distributor, the agricultural chemicals distributor, or the seed distributor, the data including the vehicle speed, the revolution speed of the engine, and a distribution amount (a fertilizer distribution amount, an agricultural chemicals distribution amount, and a seed distribution amount) are outputted to the vehicle communication network. The data collection device 5 obtains the vehicle speed, the revolution speed of the engine, the fertilizer distribution amount, the agricultural chemicals distribution amount, and the seed distribution amount as the agricultural operation data. Alternatively, in the case where the operation tool 16 is the harvest machine, the data including the vehicle speed, the revolution speed of the engine, a harvest amount, and the like are outputted to the vehicle communication network, and the data collection device 5 obtains the vehicle speed, the revolution speed of the engine, and the harvest amount as the agricultural operation data.

The data collection device 5 includes a first storage part 20 and a first communication part 21. The first storage part 20 temporarily stores the above-mentioned agricultural operation data relating to the agricultural operations. The first storage part 20 sequentially accumulates the agricultural operation data during the operation of the tractor 4. Meanwhile, the data collection device 5 stores machine specifying information for identifying (specifying) the tractor 4, and also stores an operation time of the operation of the tractor 4.

The first communication part 21 communicates with the mobile terminal 3b in wireless, and is constituted of a device for a short range wireless communication. The first communication part 21 communicates with the mobile terminal 3b in wireless, for example, in the Wi-Fi (Wireless Fidelity, registered trademark) of the IEEE802.11 series that is a communication standard.

The mobile terminal 3b is constituted, for example, of a smartphone (multifunctional mobile phone) or a mobile computer such as a tablet PC, which has a relatively high computing capability. As shown in FIG. 1, the mobile terminal 3b is carried by the agricultural operator U2 during the agricultural operation, and the mobile terminal 3b is allocated to each of the agricultural operators U2. For example, when there are two of the mobile terminals 3b and two of the agricultural operators U2 (an operator A and an operator B), one of the mobile terminals 3b is allocated to the "operator A", and the other one of the mobile terminals 3b is allocated to the "operator B". The following explanation, hereinafter, will be described referring to the agricultural operator as an "operator" for convenience in the explanation.

Meanwhile, identification information (for example, MAC address) for identifying the mobile terminal 3b is related to identification information (for example, a name, an address, and a mail address unique to the agricultural operator) for identifying the operator. The identification information of the mobile terminal 3b and the identification information of the operator related to each other are stored in the server 2, the management computer 3a, the mobile terminal 3b and the like. Using the identification information of the mobile terminal 3b and the identification information of the operator, the operator can be specified on the basis of the identification information of the mobile terminal 3b, and the mobile terminal 3b can be specified on the basis of the operator. A method for the relation and a storage place for the identification information are not limited to the above described method and storage place as long as the mobile terminal 3b and the operator are related to each other.

The mobile terminal 3b includes a second communication part 22 and a second storage part 23.

The second communication part 22 communicates with the data collection device 5 and the server 2 in wireless, and is constituted of a communication device. The second communication part 22 communicates with the data collection device 5 in wireless, for example, in the Wi-Fi (Wireless Fidelity, registered trademark) of the IEEE802.11 series that is a communication standard. In addition, the second communication part 22 communicates with the server 2 in wireless, for example, through a data communication network and a mobile phone communication network. The second storage part 23 stores the data sent from the data collection device 5 and the server 2 in addition to the identification information.

Meanwhile, the mobile terminal 3b may include a position detection part 25. The position detection part 25 receives a signal (a position of the GPS satellite, a send time, a correction data, and the like) sent from a positioning satellite (for example, the GPS satellite) 24, and detects a position (for example, a latitude and a longitude) of itself on the basis of the received signal. The deposition of the position detection part 25 in the mobile terminal 3b allows detection of a position of the agricultural operator during the agricultural operation when the agricultural operator carries the mobile terminal 3b during the agricultural operation.

Next, the server 2 will be explained in detail.

As shown in FIG. 2, the server 2 includes a planting plan setup part (a planting plan setup means) 30 and a planting plan storage part (a planting plan storage means) 31, the planting plan setup part being configured to set a planting plan, the planting plan storage part being configured to store the planting plan. The planting plan setup part 30 is constituted of a computer program or the like stored in the server 2. The planting plan storage part 31 is a planting plan database storing (recording) the data on the basis of a predetermined rule. Meanwhile, the planting plan storage part 31 may be something simply storing the data other than the planting plan database storing (recording) the data on the basis of a predetermined rule.

The planting plan is a plan showing what crop will be planted to which agricultural field, that is, a plan for relating a predetermined "agricultural field" and a predetermined "crop" to each other. The manager and the like managing a plurality of agricultural fields creates the planting plan, for example, before the crop is planted to the agricultural field. The agricultural field is a rice field or a vegetable field each individually divided where crops are planted.

Figure 3:
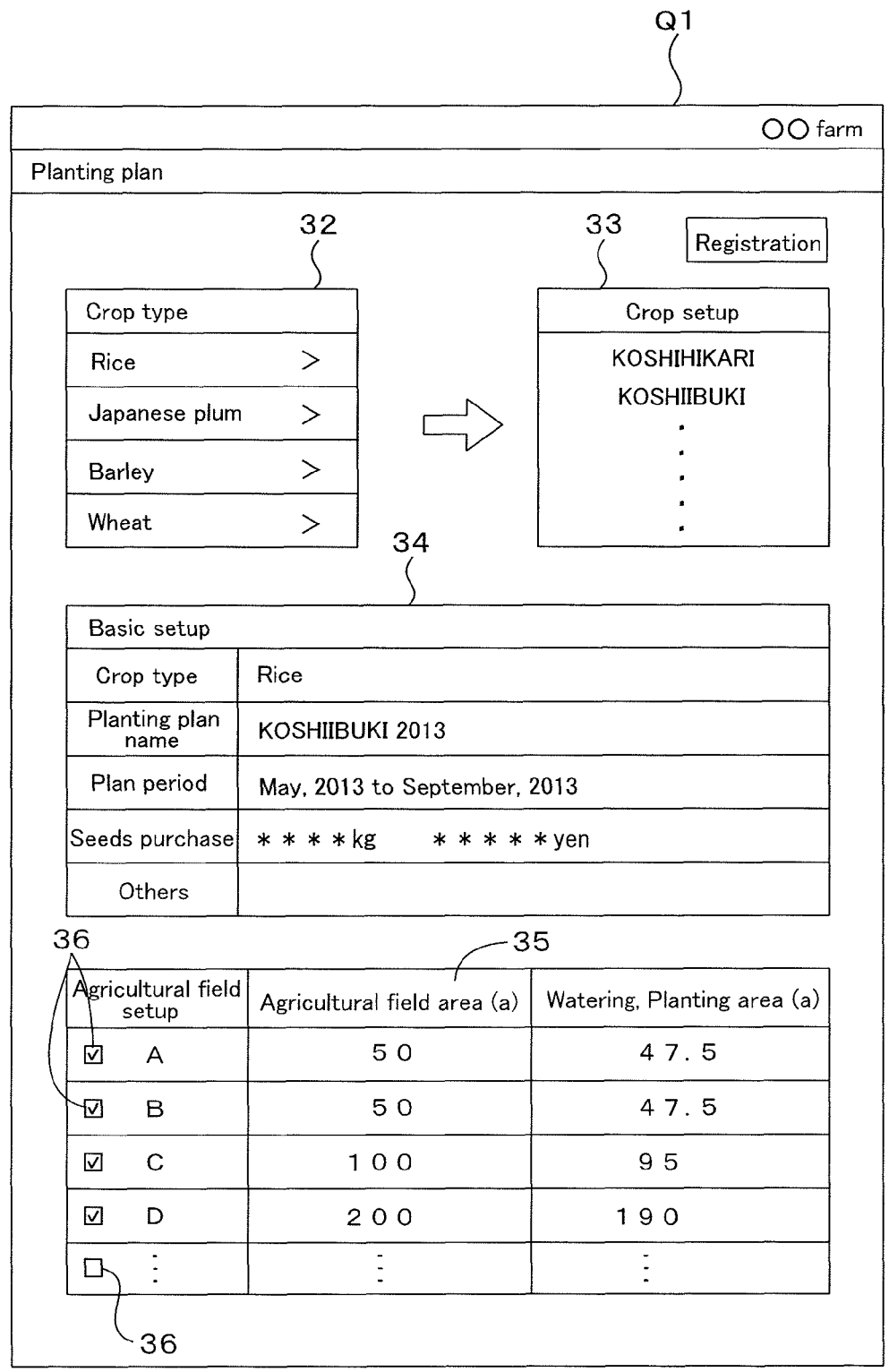
FIG. 3 is a view showing a planting plan screen.

When the management server 3a logs in to the server 2 and the management server 3a requests to create the planting plan, the planting plan setup part 30 performs, in response to the request, a process to display a planting plan screen Q1 shown in FIG. 3 on the management computer 3a. Referring to FIG. 3, the planting plan, the planting plan screen Q1, and the planting plan setup part 30 will be explained below.

The planting plan setup part 30 displays a first classification setup part 32 on the planting plan screen Q1, the first classification setup part 32 being configured to set a higher classification (for example, an item of crop) of a crop, the crop being set in the planting plan and being chosen from among a plurality of crops (for example, rice, Japanese plums, barley, and wheat). For example, when the "rice" is chosen from among the plurality of crops displayed on the first classification setup part 32, the higher classification of the crop is set to the "rice".

In addition, the planting plan setup part 30 displays a second classification setup part 33 on the planting plan screen Q1, the second classification setup part 33 being configured to set a lower classification (for example, a variety of the crop and a year of the crop), the lower classification being used for further specifying the crop from among the crops (the items) belonging to the higher classification. For example, when the "KOSHIIBUKI" is chosen by the second classification setup part 33, the crops in the planting plan is determined to the "KOSHIIBUKI".

Meanwhile, the first classification setup part 32 and the second classification setup part 33 are areas for specifying a crop to be set in the planting plan from among various types of crops; number of classifications, a classification method, and a classification crass number are not limited. For example, in the above described example, the crop is set under a condition where the "item of crop" is the higher classification and the "variety of the crop" is the lower classification; however, not limited to that, a combination of the "variety of the crop" and a "region" may be the lower classification (for example, the KOSHIIBUKI of Niigata Pref.), and thereby the combination of the "variety of the crop" and the "region" can be set as the "crop".

The planting plan setup part 30 displays a basic setup part 34 on the planting plan screen Q1, the basic setup part 34 being provided for a basic setup relating to the crop set by the setup part (the first classification setup part 32 and the second classification setup part 33). In the basic setup part 34, a name of the planning plan (a planting plan name), an estimated period for the planting, purchase completion of seeds of the crop, a seeds purchase amount of the seeds, a purchase price, and the like can be set.

In addition, the planting plan setup part 30 displays an agricultural field setup part 35 being provided for setting an agricultural field where the crop is planted, the agricultural field being chosen from among the plurality of agricultural fields. In particular, the planting plan setup part 30 reads plural pieces of agricultural field information (for example, an agricultural field name, an agricultural field area, and a planting area) from a setup storage part (for example, a basic database) disposed on the server 2, the agricultural field information being owned by the manager. Then, the planting plan setup part 30 displays a list of the read agricultural field information on the agricultural field setup part 35, and displays a choice part 36 provided for choice of the agricultural fields.

In the agricultural field setup part 35, when an agricultural field A, an agricultural field B, an agricultural field C, and an agricultural field D, for example, are chosen and "registration"s displayed on the plating plan screen Q1, the planting plan setup part 30 relates each of the agricultural fields (the agricultural field A to the agricultural field D) to the crop (the KOSHIIBUKI), the agricultural fields being chosen by the agricultural field setup part 35, the crop (the KOSHIIBUKI) being set by the setup part (the first classification setup part 32 and the second classification setup part 33).

When the planting plan setup part 30 relates the agricultural fields (the agricultural field A to the agricultural field D), the planting plan including the agricultural field A to the agricultural field D and the KOSHIIBUKI is stored in the planting plan database 31. The set planting plan (a relation between the crop and the agricultural field) is stored to the planting plan database 31 every time when the planting plan is set.

As described above, according to the planting plan setup part 30, the planting plan can be easily created by connecting the management computer 3a to the server 2, the planting plan relating the agricultural field to the crop to be planted, and the created planting plan can be sequentially stored to the planting database.

In addition, the server 2 includes an operation plan setup part (an operation plan setup means) 40, an operation plan storage part (an operation plan storage means) 41, and an operation standard storage part (an operation standard storage means) 42, the operation plan setup part 40 being provided for the setting of the operation plan. The operation plan setup part 40 is constituted of a computer program or the like stored in the server 2.

The operation plan storage part 41 and the operation standard storage part 42 are an operation plan database and an operation standard database, respectively, the operation plan database and the operation standard database storing (recording) the data in accordance with a predetermined rule. Meanwhile, each of the operation plan storage part 41 and the operation standard storage part 42 may employ a configuration simply storing the data, other than the operation plan database and the operation standard database storing (recording) the data in accordance with the predetermined rule.

The operation plan is a plan showing what agricultural operation will be done in which period (an agricultural operation period) in a predetermined agricultural field, that is, a plan relating the "agricultural operation" for the agricultural field to the "agricultural operation period" for the agricultural operation. The planting plan is created by the manager and the like after the creation of the planting plan. The agricultural operation is an operation for growth of the crop, that is, bed soil making, ridge coating, cultivating, seeding, rice planting, soil pudding, grooving, weeding, additional fertilizing, harvesting, and the like, for example.

Regarding an agricultural field (a completed agricultural field) to which the planting plan has been preliminarily set by the planting plan setup part 30, the operation plan setup part 40 sets an agricultural operation for the completed agricultural field and a period of the agricultural operation (the agricultural operation period) as the operation plan. In other words, regarding the agricultural field (the completed agricultural field) to which the crop being to be planted has been preliminarily set, the operation plan setup part 40 sets an operation plan of the agricultural operation for the completed agricultural field.

For example, as described above, the agricultural field A to the agricultural field D are related to the KOSHIIBUKI by the planting plan setup part 30, and the creation of the planting plan is completed. For this reason, the planting plan setup part 30 permits the creation of the operation plan relating to the completed agricultural fields (the agricultural field A to the agricultural field D). When the creation of the operation plan is permitted, the operation plan setup part 40 progresses to a processing for setting: the agricultural operation for the completed agricultural field; and the agricultural operation period.

Briefly, the operation plan setup part 40 creates an operation plan relating to the completed agricultural field and the crop, the completed agricultural field being given permission to create the operation plan by the planting plan setup part. On the other hand, the operation plan setup part 40 does not create an operation plan relating to an agricultural field and a crop, the agricultural field not being given permission to create the operation plan by the planting plan setup part 30.

The operation plan database 41 is constituted separately from the planting plan database 31. The operation plan database 41 stores the operation plan set by the operation plan setup part 40, relating the operation plan to the planting plan. In particular, the planting plan stored in the planting plan database 31 is higher than the operation plan stored in the operation plan database 41, and the operation plan set by the operation plan setup part 40 is stored to the operation plan database 41 as being lower than the planting plan.

That is, the operation plan setup part 40 sets the operation plan after the planting plan setup part 30 permits the setting of the operation plan, and the set operation plan is stored to the operation plan database 41, and thereby data of the planting plan is in the higher hierarchy, data of the operation plan is in the lower hierarchy, and the data of the planting plan and the data of the operation plan are related to each other. Meanwhile, in the embodiment, the operation plan is set after the permission of the setting of the operation plan by the planting plan part 30; however, the planting plan and the operation plan may be created at the same time if the planting plan can be in the higher hierarchy, the operation plan can be in the lower hierarchy, and the planting plan and the operation plan can be related to each other.

In addition, the operation standard database 42 stores default values of an agricultural operation and an agricultural operation period as standards in the setting of the operation plan. The default values of the agricultural operation and the agricultural operation period are set to each of predetermined crops or set on the basis of a past agricultural result and the like, the default values being stored in the operation standard database 42.

Next, the setting of the operation plan by the operation plan setup part 40 will be explained in detail. As shown in FIG. 2, the operation plan setup part 40 includes a common setup part 40A. The common setup part 40A sets the operation plan for a group of agricultural fields, considering common agricultural fields for planting of the same crop as one cluster (one group) among the plurality of agricultural fields. For example, as described above, since the crop "KOSHIIBUKI" is grown in the agricultural field A, the agricultural field B, the agricultural field C, and the agricultural field D, the common setup part 40A sets an operation plan for an agricultural field group (the agricultural field A, the agricultural field B, the agricultural field C, and the agricultural field D) collectively grouping the agricultural field A to the agricultural field D. In an explanation of the operation plan, the common agricultural fields (the group of the agricultural fields) for planting of the same crop is referred to as a common agricultural field, for convenience in the explanation.

In particular, when the management computer 3a requests the creation of the operation plan, the common setup part 40A displays a common setup screen Q2 on the management computer 3a, the common setup screen Q2 being provided for setting of an operation plan for the common agricultural field. FIG. 4 shows an example of the common setup screen Q2. Referring to FIG. 4, the common setup screen Q2 will be explained.

As shown in FIG. 4, the common setup screen Q2 includes a first course display part 43, a first crop display part 44, a first operation display part 45, and a first agricultural display part 46. The first course display part 43 displays a time course, for example, by using days, weeks, months, years, and the like. The first crop display part 44 displays a crop being to be planted. The first operation display part 45 displays an agricultural operation and an agricultural operation period, that is the operation plan. The first agricultural field display part 46 displays the agricultural field name, and the first agricultural field display part 46 displays the agricultural field name as "All agricultural fields", the "All agricultural fields" being the agricultural fields (the common agricultural field) collectively grouping the plurality of agricultural fields for growth of the same crop.

The first crop display part 44 and the first agricultural field display part 46 are, for example, arranged right and left to each other to be adjacent to each other. The agricultural field is related to the crop displayed on the first crop display part 44, and the agricultural field is shown adjoining next to the crop on the first agricultural field display part 46. For example, the "KOSHIIBUKI" is displayed as the crop on the first crop display part 44, and the "All agricultural fields" is displayed adjacent to the "KOSHIIBUKI" on the first agricultural field display part 46; under that condition, the "All agricultural fields (common agricultural field)" related to the "KOSHIIBUKI" is displayed on the common setup screen Q2.

In addition, the first agricultural field display part 46 and the first operation display part 45 are arranged right and left to each other to be adjacent to each other. An operation plan is displayed on the first operation display part 45 adjacent to the agricultural fields, the operation plan being related to the agricultural fields (the common agricultural field) displayed on the first agricultural field display part 46. For example, the "All agricultural fields" is displayed on the first agricultural field display part 46, the "All agricultural fields" collectively grouping the agricultural field A to the agricultural field D, and "Cultivation, 4/1 to 4/7" is displayed as the operation plan on the first operation display part 45, being adjacent to the "All agricultural fields"; under that condition, the "Cultivation" and the "4/1 to 4/7" are displayed on the common setup screen Q2, the "Cultivation" showing the agricultural operation in the "All agricultural fields", the "4/1 to 4/7" showing the agricultural operation period of the "Cultivation".

The common setup part 40A shows a predetermined time (for example, date of April in 2013) on the first course display part 43 on the basis of a time inputted from the management computer 3a, in the display of the above described common setup screen Q2. In addition, the common setup part 40A reads the crop (for example, the KOSHI- IBUKI) shown in the planting plan from the planting database, and shows the crop on the first crop display part 44. The common setup part 40A displays the "All agricultural fields" on the first agricultural field display part 46, the "All agricultural fields" collectively grouping the agricultural fields shown in the planting plan.

In addition, the common setup part 40A reads default values of the operation plan (the agricultural operation and the agricultural operation period) from the operation standard database 42, the default values serving as standards for the planting of the crop. Then, the common setup part 40A shows the read agricultural operation (for example, the cultivation and the seeding) and the read agricultural operation period (4/1 to 4/7 and 4/28) on the first operation display part 45. That is, in the setting of the operation plan being to be carried out in the common agricultural field, the common setup part 40A obtains the agricultural operation and the agricultural operation period from the operation standard database 42, the agricultural operation and the agricultural operation period being needed for growth of the crop related to the common agricultural field, and displays the agricultural operation and the agricultural operation period on the first operation display part 45.

To be more detailed, the common setup part 40A shows a common scale 47 on the first operation display part 45, the common scale 47 having a rectangular shape and indicating from a start of to an end of the agricultural operation period. The common scale 47 shows the agricultural operation period along with the time course displayed on the first course display part 43. In particular, the common scale 47 is a rectangular scale, that is, a straight display bar; one end of the common scale 47 shows the start of the agricultural operation period, and the other end of the common scale 47 shows the end of the agricultural operation period. In addition, the common setup part 40A shows the agricultural operation and the agricultural operation period near the common scale 47 with characters and numerical values.

The common setup part 40A is capable of changing the agricultural operation period on the above described common setup screen Q2. As shown in FIG. 4, a pointer 48 is putted on an end portion of the common scale (cultivation scale) 47a showing the agricultural operation period of the cultivation, for example. Then, when the pointer 48 is dragged along the longitudinal direction of the cultivation scale 47a, the common setup part 40A is capable of extending and shortening the cultivation scale 47a toward a direction of the dragging, thereby changing the agricultural operation period of the cultivation. In particular, the common setup part 40A is capable of changing the agricultural operation period corresponding to the common scale 47 by moving the end portion of the common scale 47 displayed on the first operation display part 45 along the common scale 47, that is, the first course display part 43.

As described above, the operation plan having the changed agricultural operation period of the common agricultural field can be set by: displaying the common setup screen Q2 by the common setup part 40A; and changing a length of the common scale 47 on the common setup screen Q2, the common scale 47 showing an operation period of the agricultural operation.

In addition, as shown in FIG. 2, the operation plan setup part 40 includes an individual setup part 40B. The individual setup part 40B sets an operation plan for each of the agricultural fields separately in addition to the operation plan for the common agricultural field (the agricultural field group). The individual setup part 40B displays an individual setup screen Q3 on the management computer 3a, the individual setup screen Q3 being provided for the setting of the operation plan for each of the agricultural fields, when the management computer 3a requests the creation of the operation plan. FIG. 5 shows an example of the individual setup screen Q3. Referring to FIG. 5, the individual setup screen Q3 will be explained.

As shown in FIG. 5, the individual setup screen Q3 includes a second course display part 53, a second crop display part 54, a second operation display part 55, and a second agricultural field display part 56. The second course display part 53 displays a course of time, for example, by using days, weeks, months, years, and the like. The second crop display part 54 displays the crop being to be planted. The second operation display part 55 displays the operation plan (the agricultural operation and the agricultural operation period). The second agricultural field display part 56 displays an agricultural field name.

The second crop display part 54 and the second agricultural field display part 56 are, for example, arranged right and left to each other to be adjacent to each other. The agricultural field is shown on the second agricultural field display part 56 adjacent to the crop, the agricultural field being related to the crop displayed on the second crop display part 54. For example, the "KOSHIIBUKI" is displayed as the crop on the second crop display part 54, and the "agricultural field A, the agricultural field B, the agricultural field C, and the agricultural field D" are displayed on the second agricultural field display part 56 adjacent to the "KOSHIIBUKI"; in that case, each of the agricultural fields (the agricultural field A, the agricultural field B, the agricultural field C, and the agricultural field D) for planting of the "KOSHIIBUKI" is shown on the individual setup screen Q3.

In addition, the second agricultural field display part 56 and the second operation display part 55 are arranged right and left to each other to be adjacent to each other. The operation plan is shown on the second operation display part 55 adjacent to the agricultural field, the operation plan being related to the agricultural field (the individual agricultural field) displayed on the second agricultural field display part 56. For example, the "agricultural field A and agricultural field B" are displayed on the second agricultural field display part 56, the "Cultivation, 4/2 to 4/5" is displayed as the operation plan on the second operation display part 55 adjacent to the "agricultural field A", and the "Cultivation, 4/1 to 4/6" is displayed as the operation plan on the second operation display part 55 adjacent to the "agricultural field B"; in that case, the agricultural operation "Cultivation" for the "agricultural field A" and the agricultural operation period "4/2 to 4/5" of the agricultural operation are displayed on the individual setup screen Q3, and the agricultural operation "Cultivation" for the "agricultural field B" and the agricultural operation period "4/1 to 4/6" of the agricultural operation are displayed on the individual setup screen Q3.

In the display of the individual setup screen Q3 described above, the individual setup part 40B shows a predetermined tome (for example, date of April in 2013) on the second course display part 53 on the basis of a time inputted from the management computer 3a. In addition, the individual setup part 40B reads the crop (for example, the KOSHIIBUKI) from the planting database to display the crop on the second crop display part 54, the crop being shown in the planting plan. The individual setup part 40B displays the agricultural field on the second agricultural field display part 56, the agricultural field being shown in the planting plan. That is, the individual setup part 40B displays the crop of the planting plan on the second crop display part 54, the planting plan being set before the operation plan, and displays the agricultural field of the planting plan on the second agricultural field display part 56.

Furthermore, the individual setup part 40B reads a default value of the operation plan (the agricultural operation and the agricultural operation period) from the operation standard database 42, the default value serving as a standard for the plantation of the crop. Then, the individual setup part 40B shows the read agricultural operation (for example, the cultivation and the seeding) and the read agricultural operation period (4/1 to 4/7 and 4/28) on the second operation display part 55. That is, in the setting of the operation plan carried out on the common agricultural field, the individual setup part 40B obtains the agricultural operation and the agricultural operation period from the operation standard database 42, the agricultural operation and the agricultural operation period being needed for the growth of crop corresponding to the individual agricultural field, and displays the agricultural operation and the agricultural operation period on the second operation display part 55.

To be more detailed, the individual setup part 40B shows a rectangular individual scale 57 on the second operation display part 55, the individual scale 57 showing the start of the agricultural operation period up to the end of the agricultural operation period. The individual scale 57 shows the agricultural operation period extending along a course of time shown in the second course display part 53. In particular, the individual scale 57 is a rectangular scale, that is, a straight display bar; one end of the individual scale 57 shows the start of the agricultural operation period, and the other end of the individual scale 57 shows the end of the agricultural operation period. In addition, the individual setup part 40B shows the agricultural operation and the agricultural operation period near the individual scale 57 with characters and numerical values.

The individual setup part 40B is capable of changing the agricultural operation period on the above described individual setup screen Q3. As shown in FIG. 5, the pointer 48 is putted on an end portion of the individual scale 57 (referred to as a cultivation scale 57a) showing the agricultural operation period of the cultivation, for example. Then, when the pointer 48 is dragged along the longitudinal direction of the cultivation scale 57a, the individual setup part 40B is capable of extending and shortening the cultivation scale 57a toward a direction of the dragging, thereby changing the agricultural operation period of the cultivation. In particular, the individual setup part 40B is capable of changing the agricultural operation period corresponding to the individual scale 57 by moving the end portion of the individual scale 57 displayed on the second operation display part 55 along the individual scale 57, that is, the second course display part 53.

As described above, the individual setup screen Q3 is displayed on the management computer 3a by using the individual setup part 40B, the crop and the agricultural field are displayed on the individual setup screen Q3, the crop and the agricultural field being set in the planting plan, the agricultural plan and the agricultural operation period each corresponding to the agricultural field are displayed, and at least the operation period of the agricultural operation can be changed among the displayed agricultural operations and the displayed agricultural operation period, thereby creating the operation plan being related to the planting plan.

Figure 6:
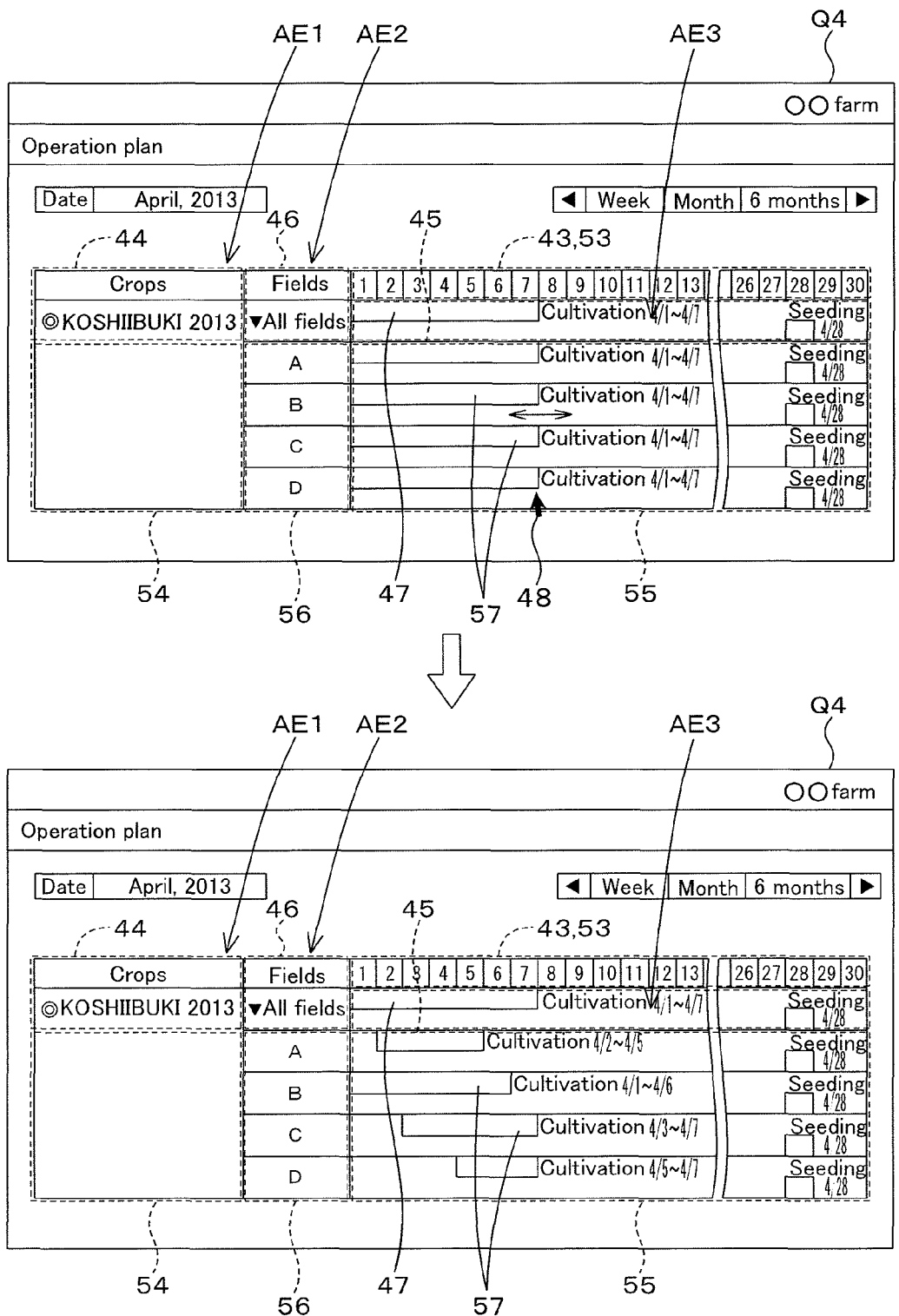
FIG. 6 is a view showing: an operation plan screen before changed; and the operation plan screen after changed.

Meanwhile, as shown in FIG. 2, the operation plan setup part 40 includes a screen integration part 40C. The screen integration part 40C displays the common setup screen Q2 and the individual setup screen Q3 on the same screen. FIG. 6 is an example where the common setup screen Q2, the individual setup screen Q3 on one screen. The one screen (the same screen) is referred to as an operation plan screen Q4, the one screen integrating the common setup screen Q2 and the individual setup screen Q3.

Referring to FIG. 6, the operation plan screen Q4 and the screen integration part 40C will be explained.

As shown in FIG. 6, the screen integration part 40C makes the first course display part 43 of the common setup screen Q2 and the second course display part 53 of the individual setup screen Q3 be shared with each other to displays a course of time on the operation plan screen Q4. In addition, the screen integration part 40C sets a position of the first crop display part 44 of the common setup screen Q2 in the left of the operation plan screen Q4, and sets a position of the second crop display part 54 of the individual setup screen Q3 in a lower portion of the first crop display part 44. That is, the screen integration part 40C sets an crop display area AE1 in the left of the operation plan screen Q4, the crop display area AE1 being provided for displaying of the crop, and arranges the first crop display part 44 and the second crop display part 54 being adjacent up and down to each other in the crop display area AE1.

In the operation plan screen Q4, the screen integration part 40C arranges the first agricultural field display part 46 of the common setup screen Q2 in the right of the first crop display part 44, and arranges the second agricultural field display part 56 of the individual setup screen Q3 in the lower portion of the first agricultural field display part 46. That is, in the operation plan screen Q4, the screen integration part 40C sets an agricultural field display area AE2 in the right of the crop display area AE1, the agricultural field display area AE2 being provided for displaying of the agricultural field, and arranges the first agricultural field display part 46 and the second agricultural field display part 56 being adjacent up and down to each other in the agricultural field display area AE2.

In the operation plan screen Q4, the screen integration part 40C arranges the first operation display part 45 of the common setup screen Q2 in the right of the first agricultural field display part 46, and arranges the second operation display part 55 of the individual setup screen Q3 in the lower portion of the first operation display part 45. That is, in the operation plan screen Q4, the screen integration part 40C sets an plan display area AE3 in the right of the agricultural field display area AE2, the plan display area AE3 being provided for displaying of the operation plan, and arranges the first operation display part 45 and the second operation display part 55 being adjacent up and down to each other in the plan display area AE3. In particular, in the operation plan area, the common scale 47 displayed on the first operation display part 45 and the individual scale 57 displayed on the second operation display part 55 are arranged being adjacent up and down to each other.

In the setting of the operation plan, when the common setup part 40A, the individual setup part 40B, and the screen integration part 40C are activated, the operation plan screen Q4 displays the crop (for example the "KOSHIIBUKI") as shown in FIG. 6, the crop being set in the planting plan. In addition, the operation plan screen Q4 displays: the individual agricultural field (for example, the agricultural field A, the agricultural field B, the agricultural field C, and the agricultural field D) corresponding to the crop set in the planting plan; and the common field collectively grouping the plurality of the agricultural fields.

Moreover, the operation plan screen Q4 displays a default value of the operation plan (the agricultural operation and the agricultural operation period) related to the crop. That is, as described above, the operation plan corresponding to the individual agricultural field is set by copying the operation plan shown for the common agricultural field. Accordingly, as shown in FIG. 6, the same operation plan will be displayed on the plan display area AE3 in the start of the setting of the operation plan.

As shown in the operation plan screen Q4 shown in an upper portion of FIG. 6, the operation period of the cultivation is "4/1 to 4/7" in the operation plan for the agricultural field A to the agricultural field D. Under that condition, a left end portion of the individual scale 57 for the agricultural field C is chosen by the pointer 48 and the like, and the end portion is slid (moved) toward the right; in this manner, a starting date of the agricultural operation period of the cultivation can be changed to "4/3" as shown in the operation plan screen Q4 shown in a lower portion of FIG. 6. Also in the other agricultural fields, the agricultural operation period can be changed by sliding (moving) the end portion of the individual scale 57.

As described above, when watching the operation plan screen Q4, the manager can know that the agricultural operation period for the cultivation is "4/1 to 4/7" in the all agricultural fields (the common agricultural field) regarding, for example, the crop "KOSHIIBUKI". After that, the manager can arbitrarily sets the agricultural operation period of the agricultural operation for each of the all agricultural fields (the individual agricultural fields), watching the agricultural operation period "4/1 to 4/7" for the all agricultural fields. In addition, when comparing the agricultural operation period for the common agricultural field to the agricultural operation period for the individual agricultural field, the manager can judge whether the agricultural operation can be actually carried out in each of the agricultural fields within the agricultural operation period shown for the common agricultural field. Here, when the manager determines that it is difficult to complete the agricultural operation in the all agricultural fields within the agricultural operation period for the common agricultural field, the agricultural operation period for the common agricultural field can be changed, for example, by moving the end portion of the common scale 47.

In this manner, the operation plan set by the operation plan setup part 40 is stored to the operation plan database 41. The operation plan database 41 stores each of the agricultural fields, the agricultural operation for each of the agricultural fields, and the operation period for each of the agricultural operations as the operation plan. For example, when the agricultural operation period of the cultivation in the agricultural field C is set by the operation plan setup part 40 as shown in the operation plan screen Q4 shown in the lower portion of FIG. 6, the operation plan database 41 stores that the agricultural operation period for the cultivation in the agricultural field C is "4/3 to 4/7".

Meanwhile, in the display of the scales (for example, the common scale 47 and the individual scale 57) along a course of time, the scales showing the agricultural operation period, it is preferred to display the scales by changing, in a vertical direction, the positions of the scales for each of the agricultural operations. For example, as shown in FIG. 6, it is preferred to display the scale showing the agricultural operation period of the cultivation and the scale showing the agricultural operation period of the seeding so as to be arranged up and down preventing the scales from overlapping with each other. In this manner, the scales can be prevented from being overlapped with each other in a longitudinal direction (a direction of the course of time). In addition, it is preferred to vary colors of the scales for each of the agricultural fields, the scales showing the agricultural operation period. For example, the color of the scale displayed on a column of the operation plan (an operation display part) for the agricultural field A may be water blue, and the color of the scale displayed on a column of the operation plan (an operation display part) for the agricultural field B may be orange. In this manner, the agricultural operation period for each of the agricultural fields can be made be easily recognized.

In addition, in the above described embodiment, the operation plan setup part 40 changes the agricultural operation period for the common agricultural field or the individual agricultural field as the operation plan; however, the operation plan setup part 40 may change not only the agricultural operation period of the common agricultural field and the agricultural operation period of the individual agricultural field but the agricultural operation of the common agricultural field and the agricultural operation of the individual agricultural field. In the changing of the agricultural operation, the agricultural operation displayed on the first operation display part 45 and the second operation display part 55 may be chosen by the pointer and the like, and thereby the chosen agricultural operation is changed to another agricultural operation. The method of changing the agricultural operation is not limited to the above described method.

Figure 7:
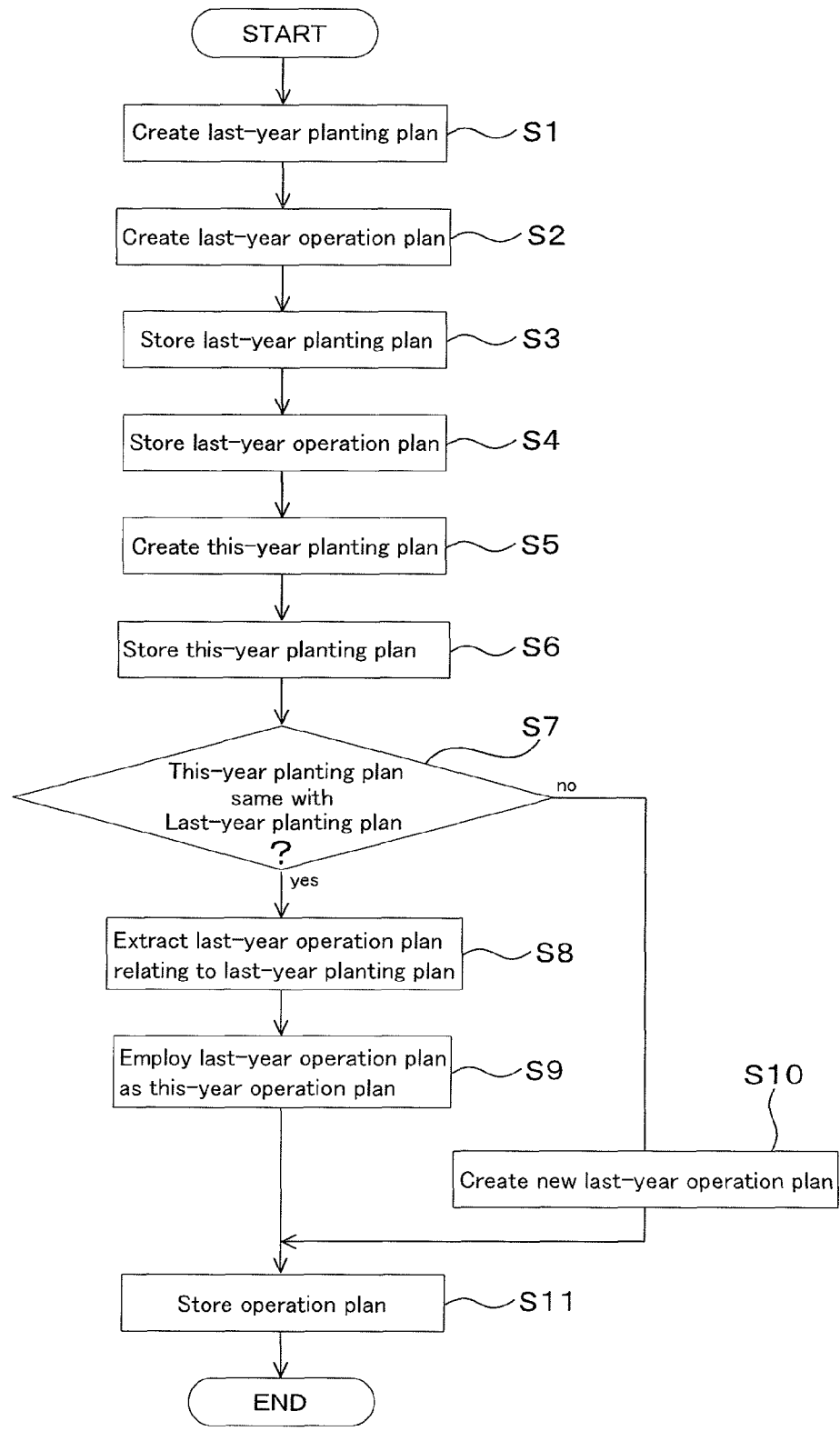
FIG. 7 is a view showing a flow of an operation plan screen for two years and an operation plan.

Meanwhile, the planting plan and the operation plan described above are carried out every time before the crop is planted to the agricultural field. For example, in the rice planting, the planting plan and the operation plan are created every year (in units of one year). FIG. 7 shows a flow of carrying out the planting plan and the operation plan for two years. In FIG. 7, a first year is a previous year, and a second year is this year, for convenience in the explanation.

As shown in FIG. 7, the planting plan setup part 30 creates the planting plan (a last-year planting plan) also in the last year (S1). The operation plan setup part 40 creates the operation plan (a last-year operation plan) after finishing the creation of the last-year planting plan (S2). The last-year planting plan and the last-year operation plan are stored to the planting plan database 31 and to the operation plan database 41, respectively (S3 and S4).

Meanwhile, also in this year, the planting plan setup part 30 sets the crop and the agricultural field for the planting of the crop to create the planting plan (a this-year planting plan) (S5). The this-year planting plan is stored to the planting plan database 31 (S6).

Then, after finishing of the creation of the this-year planting plan, the process proceeds to the creation of the operation plan of this year (a this-year operation plan). In the setting of the this-year operation plan, the operation plan setup part 40 judges whether the this-year planting plan is the same as the last-year planting plan, the this-year planting plan being set by the planting plan setup part 30 (S7). That is, the operation plan setup part 40 obtains the last-year planting plan (a combination of the crop and the agricultural field) from the planting plan database 31, and judges whether the obtained last-year panting plan is identical with the this-year planting plan. For example, as shown by an arrowed line 300 in FIG. 8, the crop being to be planted is determined to the "KOSHIIBUKI" in the this-year planting plan, and the agricultural field A, the agricultural field B, the agricultural field C, and the agricultural field D serve as the agricultural field for the planting of the "KOSHIIBUKI".

And, the crop being to be planted was determined to the "KOSHIIBUKI" in the last-year planting plan, and the agricultural field A, the agricultural field B, the agricultural field C, and the agricultural field D served as the agricultural field for the planting of the "KOSHIIBUKI". In that case, since the combination of the crop and the agricultural field in the last-year planting plan is identical with the combination of the crop and the agricultural field in the this-year planting plan, the operation plan setup part 40 determines that the this-year planting plan is the same as the last-year planting plan.

Figure 8:
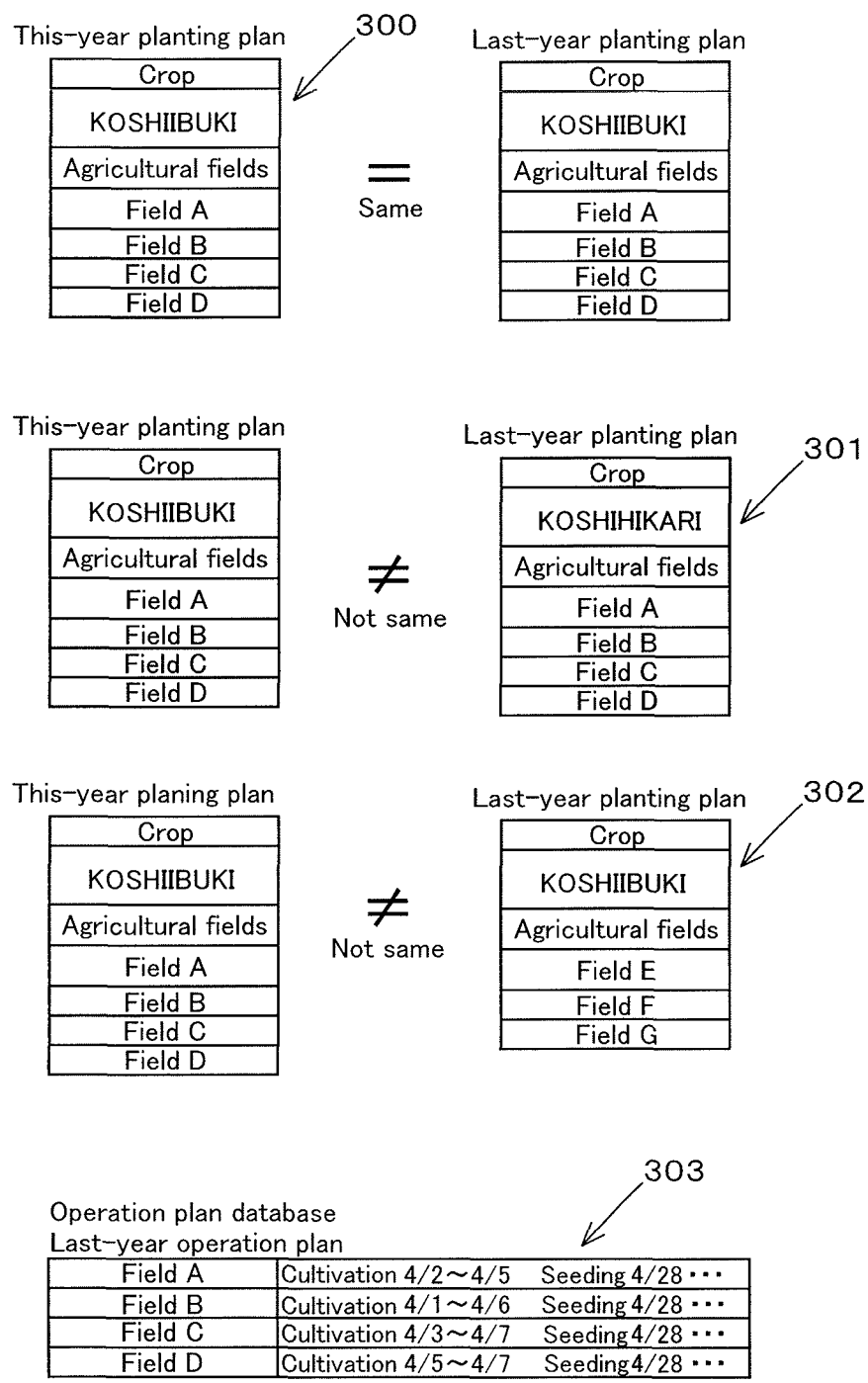
FIG. 8 is a view showing: an example where a combination of a crop and an agricultural field is suitable; a first example where a combination of a crop and an agricultural field is not suitable; a second example where a combination of a crop and an agricultural field is not suitable; and an example of a last-year operation plan stored in an operation plan database.

As shown by an arrowed line 301 in FIG. 8, the crop was a "KOSHIHIKARI" in the last-year planting plan, and the agricultural field A, the agricultural field B, the agricultural field C, and the agricultural field D served as the agricultural field for the crop; in that case, since the crop of last-year planting plan is not identical with the crop of the this-year planting plan, the operation plan setup part 40 determines that the this-year planting plan is not the same as the last-year planting plan. On the other hand, in a case where as shown by an arrowed line 302 in FIG. 8, an agricultural field E, an agricultural field F, and an agricultural field G serve as the agricultural field for the planting, the combination of agricultural fields is not identical with the combination of this year, and thus the operation plan setup part 40 determines that this-year planting plan is not the same as the last-year planting plan even when the crop was the "KOSHIIBUKI" same as the crop of this year in the last-year planting plan.

Meanwhile, when a majority of the agricultural fields are identical in the comparison between the this-year planting plan and the last-year planting plan, the operation plan setup part 40 determines that the this-year planting plan is identical with the last-year planting plan. In addition, when major agricultural fields owned by the manager are identical, the operation plan setup part 40 determines that the this-year planting plan is identical with the last-year planting plan.

In a case where the this-year planting plan is identical with the last-year planting plan, the operation plan setup part 40 extracts a relationship between the agricultural operation and the operation period from the operation plan database 41, the agricultural operation and the operation period being set relating to the last-year planting plan (S8). As described above, since the last-year operation plan is stored to the operation plan database 41, the last-year operation plan being related to the last-year planting plan after the last-year planting plan, the last-year operation plan is extracted. Then, the operation plan setup part 40 sets the last-year operation plan as the this-year operation plan, the last-year operation plan being extracted from the operation plan database 41 (S9). For example, as shown by an arrowed line 303 in FIG. 8, in a case where the last-year operation plan is stored in the operation plan database 41, the operation plan being related to the last-year planting plan, the operation plan setup part 40 employs the last-year operation plan as the this-year operation plan to create a new operation plan.

When the this-year planting plan is not identical with the last-year planting plan, the operation setup part 40 displays a new operation plan screen Q4, and sets the this-year operation plan related to the this-year planting plan (S10). In both of the cases where this-year planting plan is identical with the last-year planting plan and where this-year planting plan is not identical with the last-year planting plan, the operation plan setup part 40 stores a newly created operation plan to the operation plan database 41 (S11).

Meanwhile, in the above described embodiment, the last-year operation plan related to the last-year planting plan is employed as the this-year operation plan in a case where the this-year planting plan is identical with the last-year planting plan as a result of the comparison between the this-year planting plan and the last-year planting plan; however, not limited to that, it may be judged whether the this-year planting plan is identical with any one of past planting plans, and when the this-year planting plan is identical with one of the past planting plans, the past operation plan related to the identical planting plan may be employed as the this-year operation plan.

As described above, the cooperation between the planting plan setup part 30 and the operation plan setup part 40 enables the creation of the operation plan to be easy for several years.

Meanwhile, as shown in FIG. 2, the server 2 includes a default change part (a default change means) 120.

The default change part 120 is constituted of a computer program or the like stored in the server 2.

The default change part 120 changes the default values of the operation plan stored in the operation standard database 42, that is, the default values of the agricultural operation and the agricultural operation period, the default values being set for each of the crops. In the creation of the operation plan, the operation plan setup part 40 reads the default values of the agricultural operation and the agricultural operation period, the default values being preliminarily stored in the operation standard database 42, and creates the operation plan on the basis of the agricultural operation and the agricultural operation period. When the operation plan has been created, for example, when the agricultural operation and the agricultural operation period for the common agricultural field have been changed, the default change part 120 writes a changed agricultural operation and a changed agricultural operation period as new default values to the operation standard database 42. In other words, when the operation plan setup part 40 changes the setting of the operation plan for a predetermined crop, the default change part 120 sets the changed operation plan as the default value corresponding to the predetermined crop.

Figure 28:
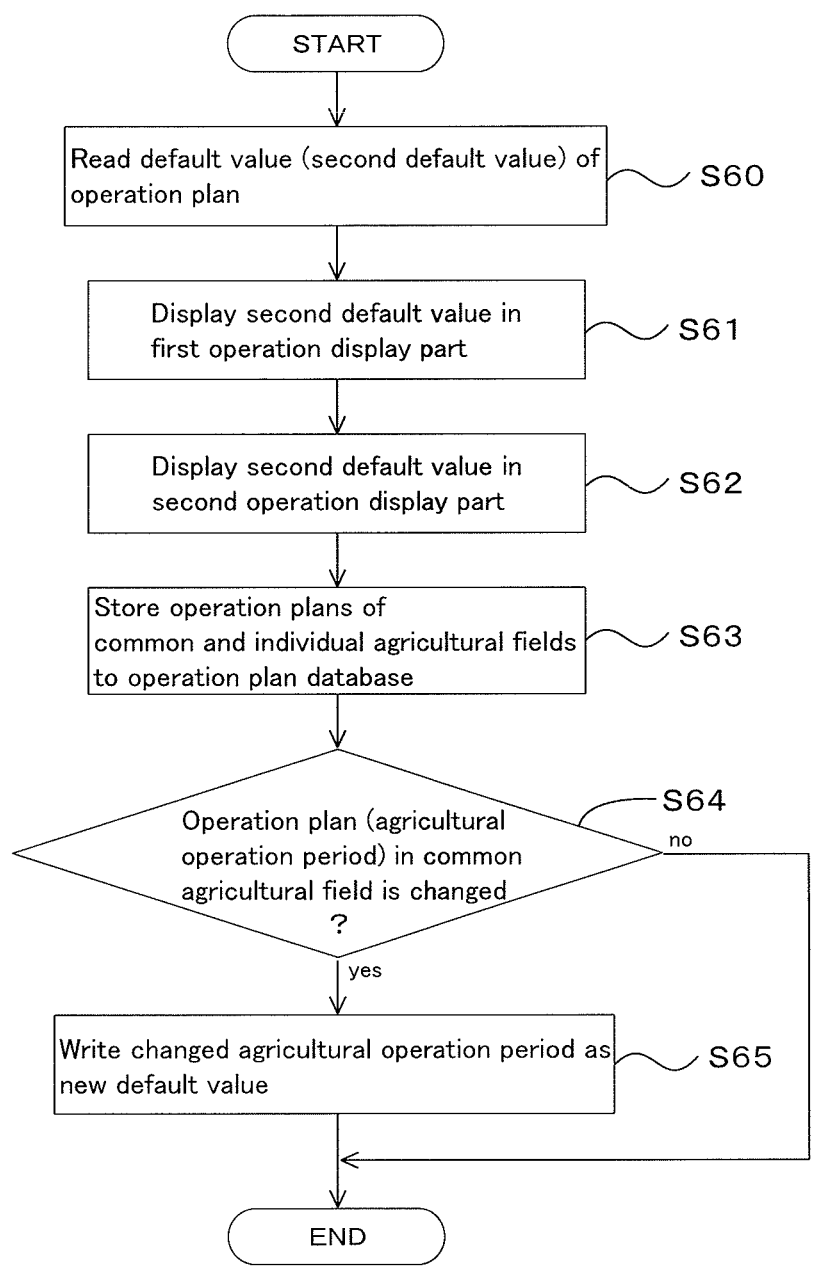
FIG. 28 is a view summarizing a flow of creation of the operation plan.

FIG. 28 is a view summarizing a flow of creation of the operation plan. As shown in FIG. 28, in the creation of the operation plan, the operation plan setup part 40 reads the default values of the operation plan from the operation standard database 42 at first (S60). Assume that the operation standard database 42 stores, for example, first standard information (a first default value) and second standard information (a second default value), the first standard information being used when the crop is the "KOSHIHIKARI", the second standard information being used when the crop is the "KOSHIIBUKI". And, in the creation of the operation plan corresponding to the crop "KOSHIIBUKI", the operation plan setup part 40 reads the second standard information (the second default value). For convenience in the explanation, the following explanation will be described assuming that the second standard information (the second default value) indicates the "4/1 to 4/7" as the agricultural operation period for the cultivation.

The common setup par 40A of the operation plan setup part 40 displays the second default value (Cultivation, Agricultural operation period, "4/1 to 4/7") on the first operation display part 45, the second default value being obtained from the operation standard database 42, the first operation display part 45 being provided for the setting of the operation plan for the common agricultural field (S61). In addition, the individual setup part 40B also displays the second default value (Cultivation, Agricultural operation period, "4/1 to 4/7") on the second operation display part 55, the second operation display part 55 being provided for the setting of the operation plan for the individual agricultural field (S62).

When the setting of the operation plan related to the "KOSHIIBUKI" has been completed, the operation plan setup part 40 stores the operation plans for the common agricultural field and the individual agricultural field to the operation plan database 41 (S63). For example, the setting of the agricultural operation and the agricultural operation period for the common agricultural field has been completed, the setting of the agricultural operation and the agricultural operation period for the individual agricultural field has been completed, and after that, the operation plan setup part 40 stores the already-set agricultural operation and the already-set agricultural operation period to the operation plan database 41.

After the setting of the operation plan, the default change part 120 judges whether the operation plan for the common agricultural field has been changed (S64). For example, in a case where the agricultural operation period of the cultivation for the common agricultural field has been changed from "4/1 to 4/7" to "4/2 to 4/11" at completion of the creation of the operation plan for the common agricultural field where the "KOSHIIBUKI" is to be planted, the default change part 120 determines that the operation plan has been changed. On the other hand, in a case where the agricultural operation period of the cultivation for the common agricultural field remains in "4/1 to 4/7", the default change part 120 determines that the operation plan is not changed.

In a case where the operation plan has been changed, that is, the agricultural operation period of the cultivation for the common agricultural field has been changed from the "4/1 to 4/7" to the "4/2 to 4/11", the default change part 120 writes the already-changed agricultural operation period ("4/2 to 4/11") as a new default value to the operation standard database 42 (S65). In particular, the default change part 120 updates (changes) the "Cultivation, Agricultural operation period, "4/1 to 4/7"" to the "Cultivation, Agricultural operation period, "4/2 to 4/11"", the "Cultivation, Agricultural operation period, "4/1 to 4/7"" being the second default value that is stored in the operation standard database 42 before the creation of the operation plan.

As described above, the operation plan setup part 40 obtains the default value of the operation plan from the operation standard database 42, the operation plan including: the agricultural operation for the agricultural field; and the agricultural operation period, and thus is capable of changing the obtained agricultural operation period. In a case where the operation plan setup part 40 has changed the agricultural operation period for the common agricultural field, the default change part 120 writes the already-changed agricultural operation period as a changed default value to the operation standard database 42.

Meanwhile, in the above-described embodiment, when the agricultural operation period for the common agricultural field has been changed in the creation of the operation plan, the default value of the agricultural operation period is changed, the agricultural operation period having been a target to be changed; however, also when the agricultural operation for the common agricultural field has been changed, the default value of the agricultural operation may be changed, the agricultural operation having been a target to be changed. In addition, the default values of both of the agricultural operation and the agricultural operation period may be changed, the agricultural operation and the agricultural operation period being set for the common agricultural field.

As shown in FIG. 2, the server 2 includes: an operation contents creation part (an operation contents creation means) 60 configured to create operation contents; and an operation contents storage part (an operation contents storage means) 61 configured to store the operation contents. The operation contents creation part 60 is constituted of a computer program or the like stored in the server 2. The operation contents storage part 61 is an operation contents database 61 storing (recording) the data on the basis of a predetermined rule. Meanwhile, the operation contents storage part 61 may be something simply storing the data other than the operation contents database 61 storing (recording) the data on the basis of a predetermined rule.

The operation contents creation part 60 mainly creates contents of operations, that is, which agricultural field, which agricultural operation in what time, and by whom. In the embodiment, the operation contents creation part 60 creates the operation contents including at least: the agricultural operation for the agricultural field; the agricultural field for the agricultural operation; and the agricultural operator for the agricultural operation.

When the management computer 3a requests the creation of the operation contents after the management computer 3a is connected to the server 2, the operation contents creation part 60, in response to the request, starts up an operation creation screen Q5 provided for the creation of the operation contents, and displays the operation creation screen Q5 on the management computer 3a. In particular, the operation contents creation part 60 displays the operation creation screen Q5 shown in FIG. 9 on the management computer 3a, for example. Referring to FIG. 9, the creation of the operation contents, the operation creation screen Q5, and the operation contents creation part 60 will be explained.

The operation contents creation part 60 displays a date setup part 62 on the operation creation screen Q5, the date setup part 62 being provided for setting of date for the agricultural operation. Date inputted to the server 2 by the management computer 3a is displayed on the date setup part 62, and the inputted date is an action date for the agricultural operation.

The operation contents creation part 60 displays a planting plan choice part 63 on the operation creation screen Q5, the planting plan choice part 63 being provided for choice of the planting plan. A list of the planting plans (a list of names of the planting plans) is shown in the planting plan choice part 63, the planting plans being obtained from the planting plan database 31, and a predetermined planting plan can be chosen from the list. For example, when the "KOSHIIBUKI" is chosen in the planting plan choice part 63, the operation contents created in the operation creation screen Q5 are related to the planting plan for the "KOSHIIBUKI".

The operation contents creation part 60 displays an agricultural field choice part 64 on the operation creation screen Q5, the agricultural field choice part 64 being provided for choice of the agricultural field. The agricultural fields on an agricultural field map are shown in the agricultural field choice part 64, the agricultural field map being obtained by the server 2, and the agricultural fields on the agricultural field map can be arbitrarily chosen. For example, when a portion showing the "agricultural field A" is chosen from among the plurality of agricultural fields shown in the agricultural field choice part 64, the chosen "agricultural field A" is determined as an agricultural field for the agricultural operation.

The operation contents creation part 60 displays an operation choice part 65 on the operation creation screen Q5, the operation choice part 65 being provided for choice of the agricultural operation. The plurality of agricultural operations are shown in the operation choice part 65, the agricultural operations being necessary for the planting of the crop shown in the planting plan, and a predetermined agricultural operation can be chosen from among the plurality of agricultural operations. For example, when the "Cultivation" is chosen from among the plurality of agricultural operations shown in the operation choice part 65, the chosen "Cultivation" is employed as an agricultural operation being to be carried out.

The operation contents creation part 60 displays an operator choice part 66 on the operation creation screen Q5, the operator choice part 66 being provided for choice of the agricultural operator. The operators preliminarily registered to the server 2 are sown in the operator choice part 66. For example, when "Operator B and Operator C" are chosen from among the plurality of operators shown in the operator choice part 66, the chosen "Operator B and Operator C" are employed as the operators (practice operators) being to carry out the operation.

The operation contents creation part 60 displays a time setup part 67 on the operation creation screen Q5, the time setup part 67 being provided for setting of an operation time. Time (for example, a clock time) is displayed in the time setup part 67, the time being inputted to the server 2 by the management computer 3a, and the inputted time is employed as a time to carry out the operation.

In addition, the operation contents creation part 60 displays a machine choice part 68, a fertilizer choice part 69, and a distribution amount setup part 70 on the operation creation screen Q5, the machine choice part 68 being provided for choice of the agricultural machine 4, the fertilizer choice part 69 being provided for choice of the fertilizer (a fertilizer name), the distribution amount setup part 70 being provided for setting of a fertilizer amount being to be distributed.

The machine choice part 68 is a portion for setting a use machine being to be used in the agricultural operation. For example, a type of and a model of the agricultural machine 4 and a type of and a model of the implement are displayed in the machine choice part 68, the agricultural machine 4 being preliminarily registered to the server 2, the implements being configured to be coupled to the agricultural machine 4, and further the displayed agricultural machines and the like can be chosen. FIG. 9 shows that an implement, a model "NW 4511", is set as the use machine in the machine choice part 68.

A plurality of fertilizer names are displayed in the fertilizer choice part 69, the plurality of fertilizer names being preliminarily registered to the server 2, and a chosen fertilizer name is employed for use in the agricultural operation. A numerical value is displayed in the distribution amount setup part 70, the numerical value being inputted to the server 2 by the management computer 3a, and the inputted numerical value is employed as a distribution amount value.

The planning plan, the agricultural field, the agricultural operation (the operation item), the operator (the agricultural operator), the operation time, the fertilizer, and the distribution amount are inputted in the operation creation screen Q5; when the "Registration" is chosen, the operation contents creation part 60 employs the items (the agricultural field, the agricultural operation, the operator, the operation time, the fertilizer, and the distribution amount) as the operation contents, the items being inputted to the operation creation screen Q5, and stores the operation contents to the operation contents database 61 after relating the operation contents to the planting plan.

Meanwhile, the operation contents created in the operation contents creation part 60 is not limited to the above described items; for example, the agricultural chemical and a distribution amount of the agricultural chemical may be set, the agricultural chemical being used in the agricultural field, and other agricultural operations may be set.

Now, as shown in FIG. 2, the server 2 includes an operation instruction part (an operation instruction means) 71, the operation instruction part 71 being configured to send the operation contents to the mobile terminal 3b allocated to the agricultural operator. The operation instruction part 71 is constituted of a computer program or the like stored in the server 2.

The operation instruction part 71 sends the operation contents to the mobile terminal 3b of the agricultural operator being a target of the operation instruction (hereinafter referred to as a target agricultural operator). That is, the operation instruction part 71 obtains a target agricultural operator, the target agricultural operator being the agricultural operator set as the practice operator in the operation contents, and sends the operation contents to the target agricultural operator.

As shown by an arrowed line 400 in FIG. 10, the plurality of operation contents (a first operation content, a second operation content, and a third operation content) are stored in the operation contents database 61, for example. In that case, when the mobile terminal 3b of the operator A requests the first operation content, the operation instruction part 71 extracts the first operation contents for the "Operator A" from the operation contents database 61, and sends the first operation contents to the mobile terminal 3b of the "Operator A" being the target agricultural operator. In addition, when the mobile terminal 3b of the operator B requests the operation contents, the operation instruction part 71 extracts the second operation contents and the third operation contents each for the "Operator B" from the operation contents database 61, and sends the second operation contents and the third operation contents to the mobile terminal 3b of the "Operator B" being the target agricultural operator.

Furthermore, when the mobile terminal 3b of the operator C requests the operation content, the operation instruction part 71 extracts the third operation contents for the "Operator C" from the operation contents database 61, and sends the third operation contents to the mobile terminal 3b of the "Operator C" being the target agricultural operator. In addition, the identification information for identifying the mobile terminal 3b and the identification information for identifying the agricultural operator are related to each other and are stored in the server 2, and thus the operation instruction part 71 is capable of sending the operation contents to the specified mobile terminal 3b.

Meanwhile, the operation instruction part 71 sends the operation contents not only to the mobile terminal 3b of the target agricultural operator being a target of the operation instruction but also to the mobile terminal 3b of the non-target agricultural operator not being a target of the operation instruction. That is, the operation instruction part 71 sends the operation contents of the target operator also to the agricultural operator (the non-target agricultural operator), the non-target agricultural operator being other than the agricultural operators set as the practice operator in the operation contents. For example, as shown by an arrowed line 401 in FIG. 10, the operation instruction part 71 sends the first operation content for the "Operator A" not only to the mobile terminal 3b of the "Operator A" being the target agricultural operator but also to the mobile terminal 3b of the "operator B" and to the mobile terminal 3b of the "Operator C", the "operator B" and the "operator C" each being the non-target agricultural operators.

In particular, assume that the plurality of agricultural operators have been registered to the server 2 for each of groups (organizations) for the agricultural operation, the agricultural operators belonging to any of the groups. For example, the operator A, the operator B, the operator C, and a manager P are registered as a first organization, and an operator H, an operator I, an operator J, and a manager Q are registered as a second organization.

The operation instruction part 71 sends the operation contents (the first operation content, the second operation content, and the third operation content) to all of the operator A, the operator B, and the operator C each belonging to the first organization. Meanwhile, the operation instruction part 71 does not send the first operation content, the second operation content, and the third operation content to the operator (the operator H, the operator I, and the operator J) of the second organization different from the first organization.

In this manner, the agricultural operator can obtain not only the operation contents addressed to him but also the operation contents addressed to the operators belonging to the same organization. In other words, the agricultural operators can obtain the operation contents addressed to other persons belonging to the same organization. For convenience in the explanation, in view of a certain agricultural operator, the operation contents addressed to the agricultural operator is referred to as an own operation contents, and the operation contents addressed to the other agricultural operators is referred to as an others operation contents.

As described above, the planting plan, the operation plan, and the operation contents are created in the server 2 and are sent to the specified mobile terminal 3b, and thereby the agricultural operator carries out an appropriate agricultural operation by watching the instructed own operation contents and the instructed others operation contents in the mobile terminal 3b.

Next, the mobile terminal 3b will be explained in detail.

As shown in FIG. 2, the mobile terminal 3b includes an obtaining part (an obtaining means) 72, a sort part (a sort means) 73, a display part (a first display means, that is, and a first display part) 74. The obtaining part 72, the sort part 73, and the first display part 74 each are constituted of computer programs and the like stored in the mobile terminal 3b.

The obtaining part 72 obtains the operation contents through the server 2, the operation contents being stored in the operation contents database 61. In addition, the obtaining part 72 obtains the operation plan through the server 2, the operation plan being stored in the operation plan database 41.

In particular, the obtaining part 72 requests the operation contents and the operation plan from the server 2 when the mobile terminal 3b logs in to the server 2, and when receiving the operation contents and the operation plan sent from the server 2 in response to the request, the obtaining part 72 stores the received operation contents and the operation plan to the second storage part 23.

The sort part 73 sorts the operation contents obtained by the obtaining part 72 into the own operation contents and the others operation contents. In particular, the sort part 73 extracts, for example, the operator (the practice operator) in the obtained operation contents when the obtaining part 72 obtains the operation contents. Then, the sort part 73 judges whether the extracted practice operator is identical with the agricultural operator allocated to the own mobile terminal 3b by using the identification information and the like stored in the mobile terminal 3b. The sort part 73 determines the obtained operation contents as the own operation contents when the practice operator is identical with the agricultural operator allocated to the own mobile terminal 3b, and determines the obtained operation contents as the others operation contents when the practice operator is not identical with the agricultural operator.

Figure 11:
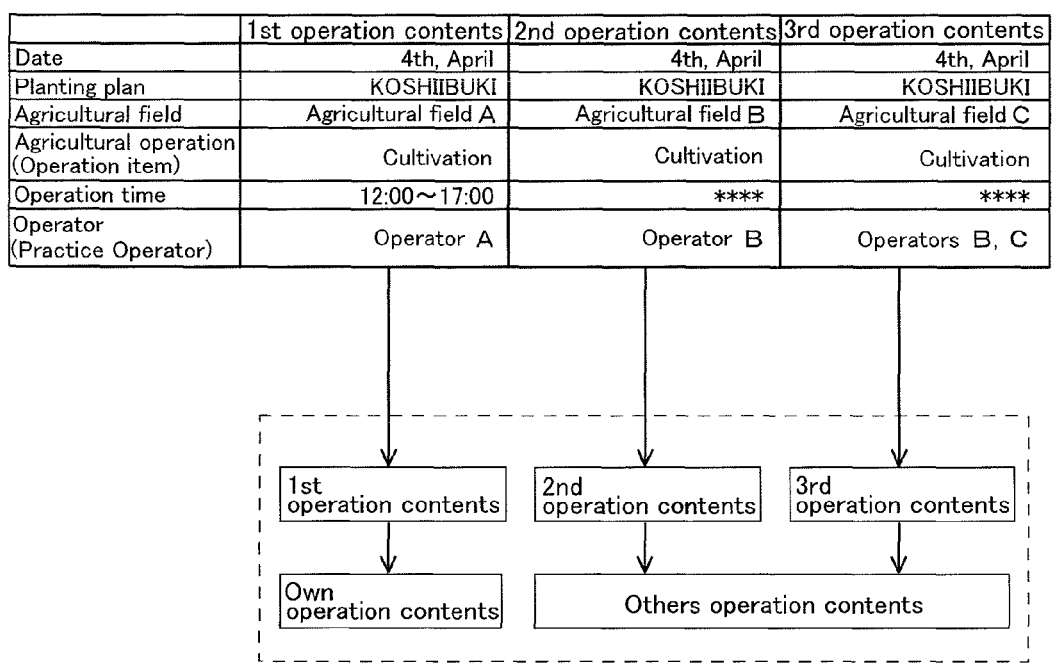
FIG. 11 is an explanation view explaining sorting of the operation contents by a sorting unit.

For example, as shown in FIG. 11, assume that the mobile terminal 3b allocated to the operator A obtains the first operation contents, the second operation contents, and the third operation contents from the server 2. In that case, since the "Operator A" is set as the practice operator in the first operation contents, the sort part 73 of the mobile terminal 3b determines the first operation contents as the own operation contents, the mobile terminal 3b being allocated to the operator A. In addition, since the "Operator other than the operator A" is set as the practice operator in the second operation contents and the third operation contents, the sort part 73 determined the second operation contents and the third operation contents as the others operation contents.

Meanwhile, the sorting method by the sort part 73 is not limited to the above description; the operation contents may preliminarily include identification information used for identifying whether being addressed to own self or addressed to others in addition to the operator included in the operation contents, and thus the sort part 73 may sort the operation contents into the own operation contents and the others operation contents on the basis of the identification information.

The first display part 74 displays: data stored in the mobile terminal 3b; and various information obtained by the mobile terminal 3b. FIG. 12 to FIG. 16 show a screen displayed on the mobile terminal 3b by the display part and show a transition of the screen. Referring to FIG. 12 to FIG. 16, various types of screens displayed on the mobile terminal 3b will be explained, and the display part will be explained. Hereinafter, the following explanation will be described on condition that the first display part 74 performs processing for displaying the various types of screens.

Figure 12:
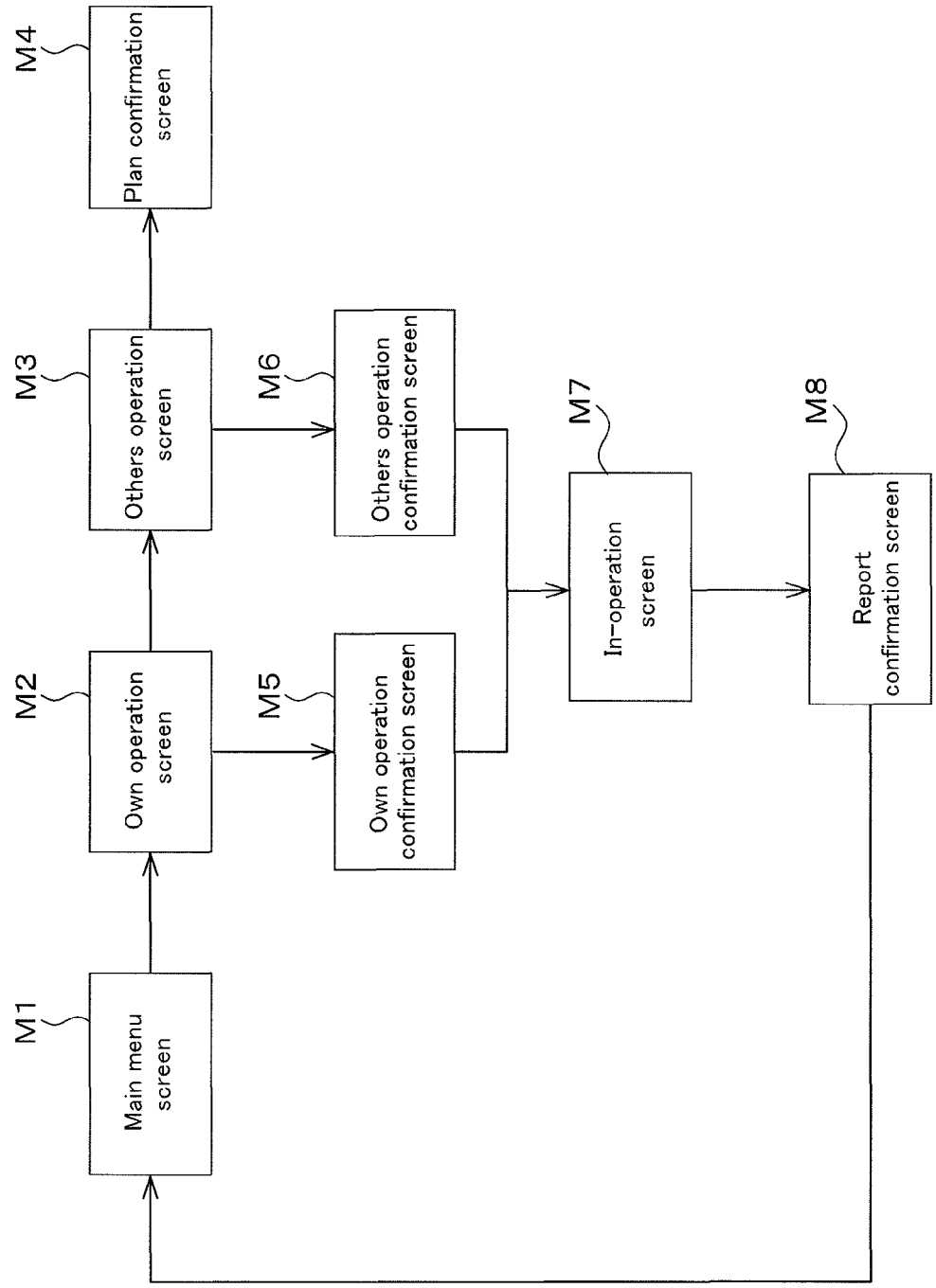
FIG. 12 is a view showing a transition of switching of various types of display screens.

FIG. 12 shows a transition of switching of the various types of display screens by the first display part 74.

As shown in FIG. 12, the first display part 74 displays, on the display part (for example, a touch panel) 78 of the mobile terminal 3b, a main menu screen M1, an own operation screen M2, an others operation screen M3, a plan confirmation screen M4, a own operation confirmation screen M5, an others operation confirmation screen M6, an in-operation screen M7, a report confirmation screen M8, and the like.

Figure 13:
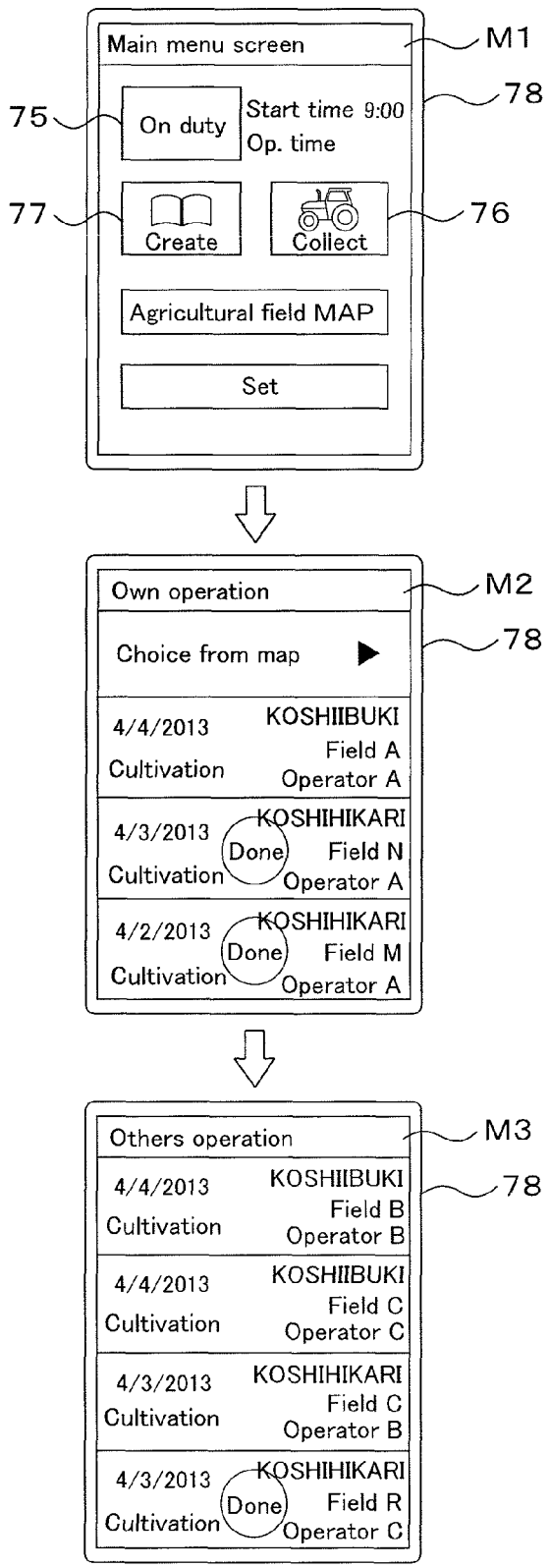
FIG. 13 is a view showing a main menu screen, an own operation screen, and an others operation screen.

As shown in FIG. 13, a notification button 75 is shown in the main menu screen M1, the notification button 75 being provided for notifying whether being on-duty or not, and a duty start time and an operation time are shown. When the agricultural operator and the like tap the notification button 75, a log-in processing between the mobile terminal 3b and the server 2 is performed. When the log-in is authorized, the mobile terminal 3b notifies the server 2 of start of the duty. When the notification button 75 is tapped again under a state where the duty has started, the mobile terminal 3b notifies the server of finish of the duty. Meanwhile, when the agricultural operator and the like taps the notification button 75, the obtaining part 72 requests the operation contents from the server 2.

A collection button 76 and a creation button 77 are shown in the main menu screen M1. When the agricultural operator taps the collection button 76, the mobile terminal 3b starts to access the agricultural machine 4 (the data collection device 5), and obtains agricultural operation data collected by the data collection device 5. The agricultural operation data is sent to the server 2, and is stored to an agricultural result part (an agricultural result database) included in the server 2. When the display part 78 is dragged under a state where the main menu screen M1 is displayed on the display part 78, the screen is changed from the main menu screen M1 to the own operation screen M2 as shown in FIG. 13. A brief list of the own operation contents sorted by the sort part 73 is shown in the own operation screen M2, the own operation contents being one of the operation contents obtained by the obtaining part 72. For example, a practice date of the agricultural operation (for example, 4/4/2013), the agricultural operation (for example, the cultivation), and the practice operator (for example, the operator A) are shown in the own operation screen M2 as the brief of the own operation contents, the practice date, the agricultural operation, and the practice operator being specified in the own operation contents.

When the display part 78 is dragged under a state where the own operation screen M2 is displayed on the display part 78, the screen is changed from the own operation screen M2 to the others operation screen M3 as shown in FIG. 13. A brief list of the others operation contents sorted by the sort part 73 is shown in the others operation screen M3, the others operation contents being one of the operation contents obtained by the obtaining part 72. For example, a practice date of the agricultural operation (for example, Apr. 4, 2013), the agricultural operation (for example, the cultivation), and the practice operator (for example, the operator C) are shown in the others operation screen M3 as the brief of the others operation contents, the practice date, the agricultural operation, and the practice operator being specified in the others operation contents.

Figure 14:
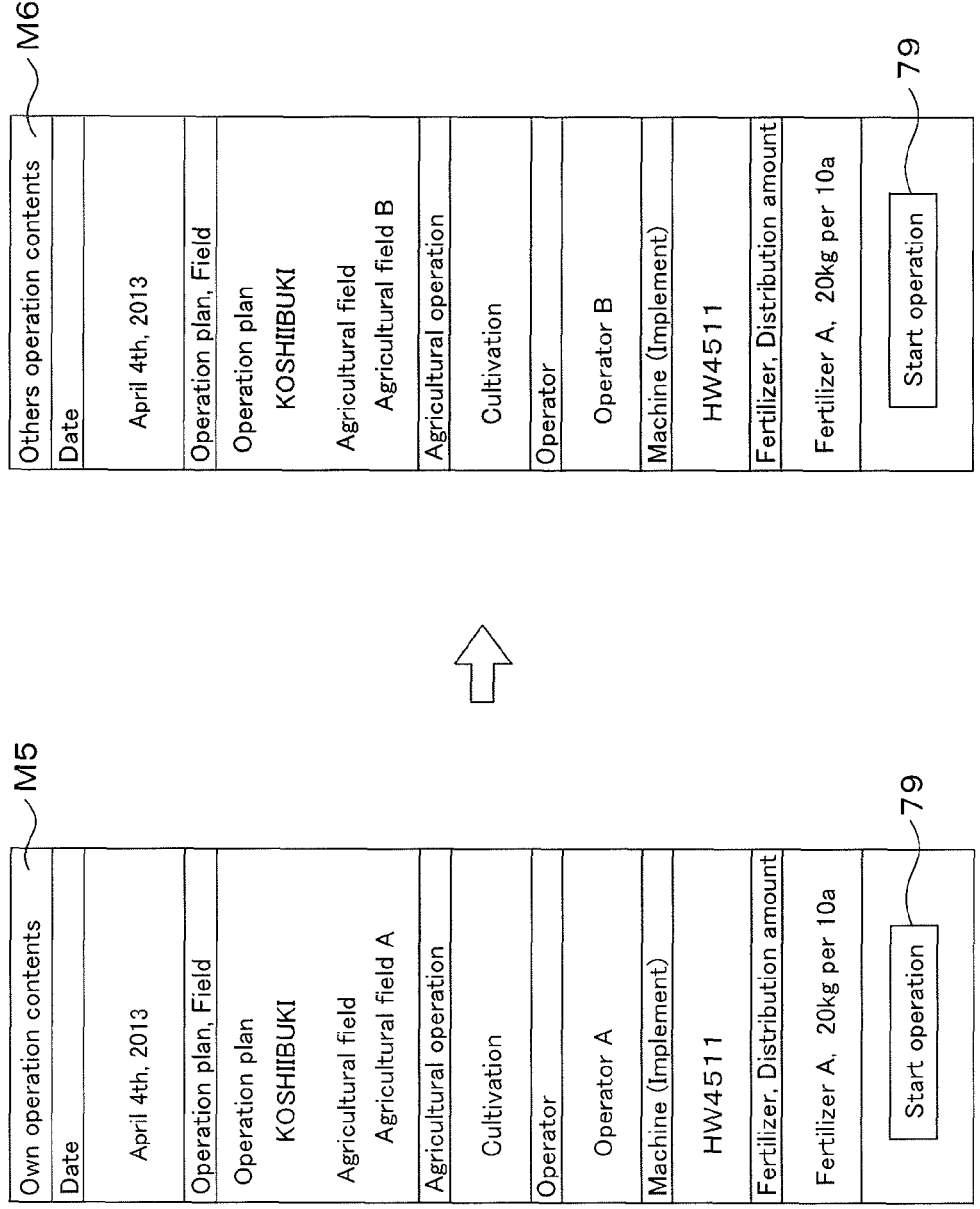
FIG. 14 is a view showing an own operation confirmation screen and an others operation confirmation screen.

In addition, when a predetermined own operation contents are chosen from the list of the own operation contents by the tapping and the like under a state where the own operation screen M2 on the display part 78, the screen is changed from the own operation screen M2 to the own operation confirmation screen M5 as shown in FIG. 14. Details of the own operation contents are displayed on the own operation confirmation screen M5, the own operation contents being chosen in the own operation screen M2. For example, the planting plan (for example, KOSHIIBUKI) corresponding to the operation contents, the agricultural field (for example, the agricultural field A) for the agricultural operation, the agricultural operation being to be carried out (for example, the cultivation), the practice operator (for example, the operator A), the practice time (for example, 12:00 to 17:00), the agricultural machine (for example, HW4511), the fertilizer name (for example, the fertilizer A), the distribution amount (for example, 20 kg per 10 are), and the like are shown in the own operation confirmation screen M5 as the details of the own operation contents.

In addition, when a predetermined own operation contents are chosen from the list of the others operation contents by the tapping and the like under a state where the others operation screen M3 on the display part 78, the screen is changed from the others operation screen M3 to the others operation confirmation screen M6 as shown in FIG. 14. Details of the others operation contents are displayed on the others operation confirmation screen M6, the own operation contents being chosen in the others operation screen M3. For example, the planting plan, the agricultural field for the agricultural operation, the agricultural operation being to be carried out, the practice operator, the practice time, the agricultural machine 4, the fertilizer name, the distribution amount, and the like are shown also in the others operation confirmation screen M6 as the details of the others operation contents.

A confirmation button 79 is shown in the own operation confirmation screen M5 and in the others operation confirmation screen M6, the confirmation button 79 being provided for confirmation of the operation contents. The confirmation button 79 is shared with an operation start button provided for notification of start of the operation. For this reason, when the agricultural operator and the like taps the confirmation button 79, the mobile terminal 3b notifies the server 2 of completion of confirming the operation contents (the own operation contents or the others operation contents), the operation contents being displayed in the own operation confirmation screen M5 and in the others operation confirmation screen M6. Moreover, the confirmation button 79 is also shared with a collection start button provided for determination of start of the collection of the agricultural operation data. For this reason, when the confirmation button 79 is tapped, the mobile terminal 3b orders the data collection device 5 to start the collection of the agricultural operation data. The data collection device 5 start to collect the agricultural operation data in response to the order from the mobile terminal 3b.

Figure 15:
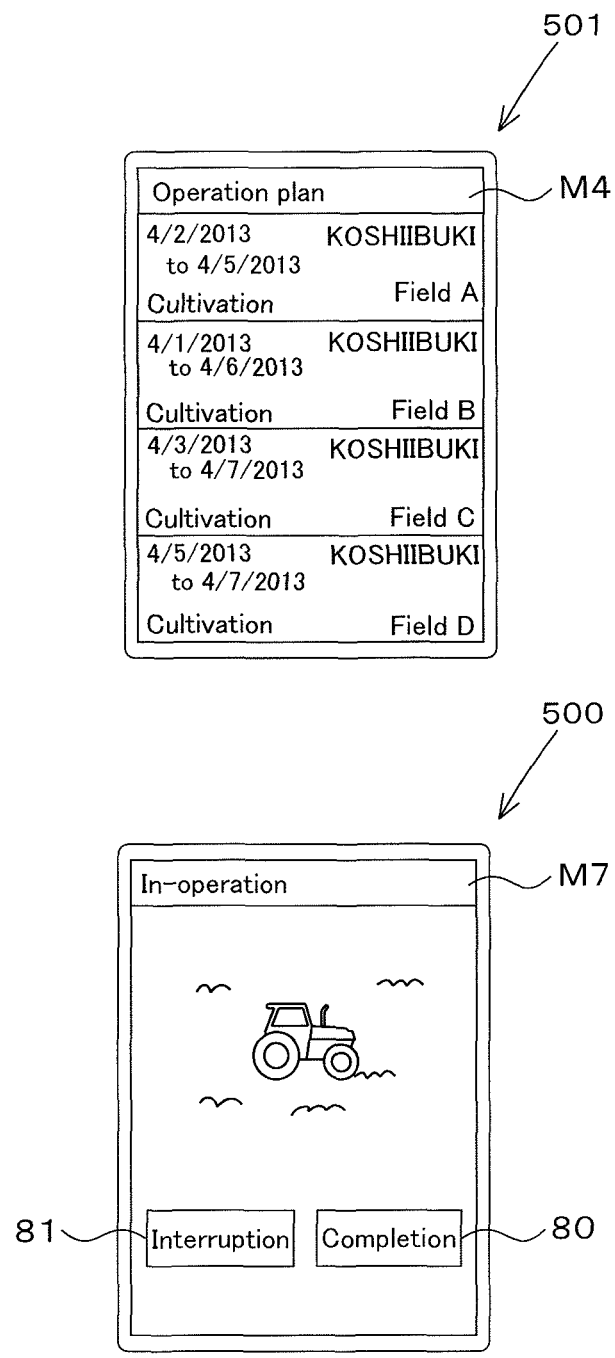
FIG. 15 is a view showing a plan confirmation screen and an in-operation screen.

In addition, when the confirmation button 79 is tapped, the confirmation button 79 being displayed in the own operation confirmation screen M5 and in the others operation confirmation screen M6, the first display part 74 changes the screen from the operation confirmation screen (the own operation confirmation screen M5 and the others operation confirmation screen M6) to the in-operation screen M7 as shown by an arrowed line 500 in FIG. 15. The in-operation screen M7 is a screen provided for mainly notifying the agricultural operator of being in-operation, and a completion button 80 and an interruption button 81 are shown in the in-operation screen M7. When the agricultural operator and the like tap the completion button 80 under a state where the in-operation screen M7 is displayed, the in-operation screen M7 is switched to the report confirmation screen M8. In addition, when the agricultural operator and the like tap the interruption button 81 under a state where the in-operation screen M7 is displayed, the mobile terminal 3b notifies the server 2 of interruption of the agricultural operation.

As shown in FIG. 16, the report confirmation screen M8 is a screen provided for the final confirmation of a report (a daily journal) being to be reported to the manager by the agricultural operator, and the report is preliminarily displayed in the report confirmation screen M8. The report is papers (documents) describing the report contents on a surface of paper and the like, and the document may be displayed on the computer as electronic data. In addition, the report may be in a form showing information relating to the agricultural operation (the agriculture), for example, may be a table (an information table), a graph, and the like.

A registration button 83 is shown in the report confirmation screen M8. When the registration button 83 is tapped, the report displayed on the report confirmation screen M8 is sent to the server 2. In addition, the registration button 83 is shared with a collection completion button provided for determining completion of the collection of the agricultural operation data. For this reason, when the registration button 83 is tapped, the mobile terminal 3b orders the data collection device 5 to complete the collection of the agricultural data.

As described above, the operator can confirm the own operation contents and the others operation contents, the own operation contents being displayed in the own operation confirmation screen M5, the others operation contents being displayed in the others operation confirmation screen M6. The operator can notifies the server 2 of completion of the operator's confirmation of the own operation contents, and can notifies the server 2 of completion of the operator's confirmation of the others operation contents.

Next, the notification of the operation contents will be explained.

As shown in FIG. 2, the mobile terminal 3b includes a notification part 84 (a first notification means, that is, a first notification part). The first notification part 84 is constituted of a computer program or the like stored in the mobile terminal 3b. In addition, the server 2 includes a notification part (a second notification means, that is, a second notification part) 85. The second notification part 85 is constituted of a computer program or the like stored in the server 2.

The first notification part 84 notifies the server 2 of completion of confirming the own operation contents shown in the own operation confirmation screen M5, that is, notifies that the target agricultural operator carries out the agricultural operation (the operation) on the basis of the own operation contents. In particular, when the confirmation button 79 of the own operation confirmation screen M5 is tapped, the first notification part 84 sends a notification showing the confirmation of the own operation contents displayed in the own operation confirmation screen M5 (hereinafter the notification being referred to as an own confirmation notification).

On the other hand, when receiving the own confirmation notification from the mobile terminal 3b, the second notification part 85 of the server 2 notifies the other mobile terminal 3b of completion of confirming the own operation contents, the other mobile terminal 3b being other than the mobile terminal 3b that has notified the server 2 of the own confirmation notification.

Figure 17:
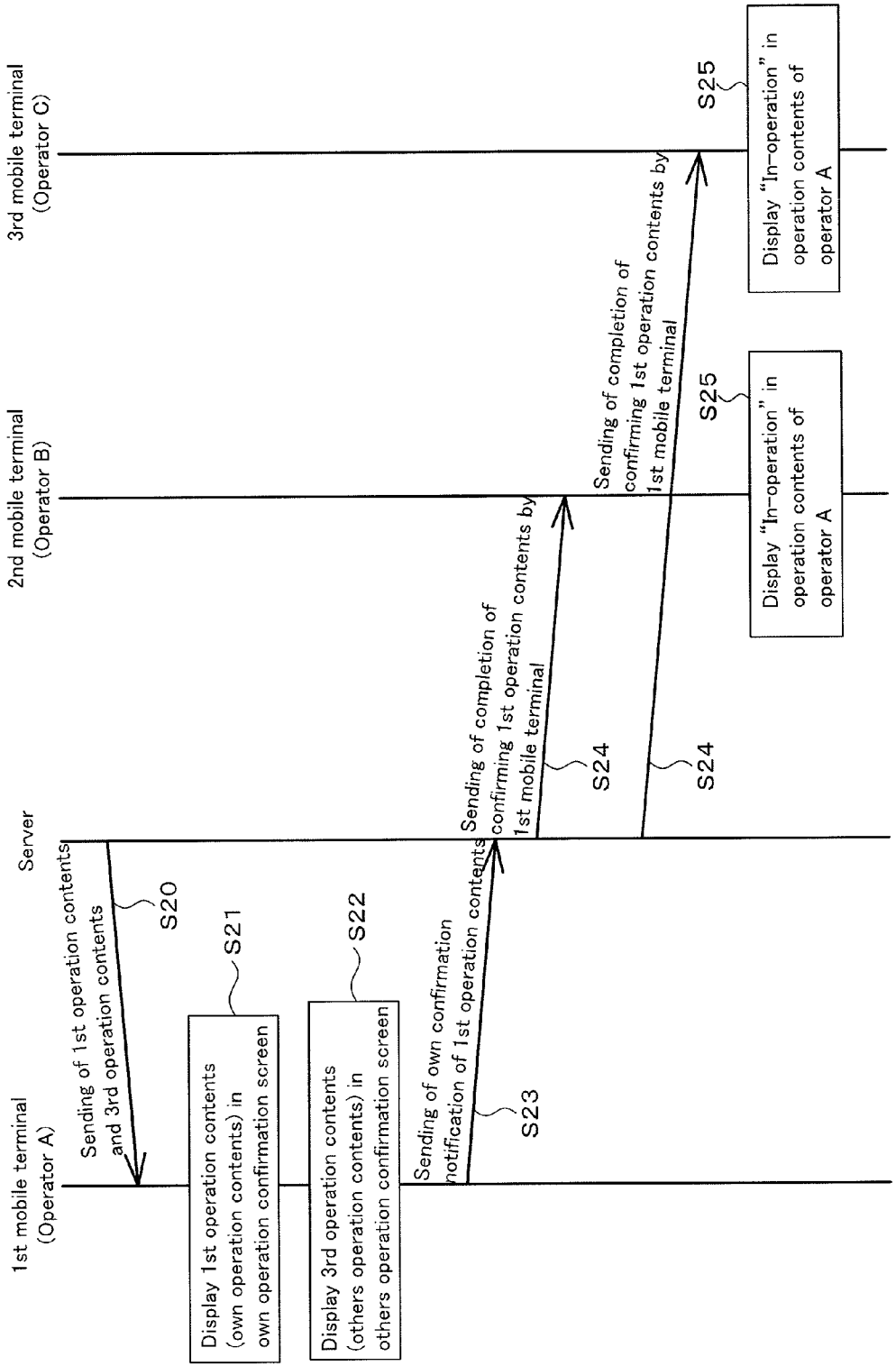
FIG. 17 is a first example showing a flow of sending and receiving the operation contents in a server and a mobile terminal.

FIG. 17 is a first example showing a flow of sending and receiving the operation contents between the server and the mobile terminal. As shown in FIG. 17, when the mobile terminal 3b (the first mobile terminal 3b) allocated to the operator A, for example, accesses the server 2, the server 2 sends the first operation contents and the third operation contents to the first mobile terminal 3b, the first operation contents and the third operation contents being stored in the operation contents database 61 (S20). Out of the received first operation contents and the received third operation contents, the first mobile terminal 3b displays the first operation contents (the own operation contents) in the own operation confirmation screen M5 (S21), and displays the third operation contents (the others operation contents) in the others operation confirmation screen M5 (S22).

Then, when the confirmation button 79 of the own operation confirmation screen M5 is tapped, the first mobile terminal 3b sends the own confirmation notification of the first operation contents to the server 2 (S23). When the server 2 receives the own confirmation notification, the second notification part 85 sends completion of the confirmation of the first operation contents, the confirmation being made by the first mobile terminal 3b, to the mobile terminal other than the first mobile terminal 3b, that is, the mobile terminal 3b of the operator B (referred to as a second mobile terminal) and the mobile terminal 3b of the operator C (referred to as a third mobile terminal), for example (S24).

When receiving the own confirmation notification from the server 2 (the second notification part 85), the second mobile terminal 3b and the third mobile terminal 3b display, in the others operation screen M3, the "In-operation" on the operation contents of the operator A corresponding the own confirmation notification, the "In-operation" showing that the operation contents have been confirmed (S25).

As described above, it can be notified to the other agricultural operators that a predetermined agricultural operator has confirmed the own operation contents, and the other agricultural operator can recognize that the predetermined agricultural operator issuing the notification is carrying out the agricultural operation on the basis of the own operation contents.

Meanwhile, in the above described embodiment, it is notified to the other agricultural operator that the target agricultural operator has confirmed the own operation contents addressed to himself; however, it also can be notified to the other agricultural operator that the non-target agricultural operator has confirmed the others operation contents addressed to another person. In particular, the first notification part 84 notifies the server 2 of completion of confirming the others operation contents shown in the others operation confirmation screen M6, that is, notifies the operator carries out the agricultural operation (the operation) on the basis of the others operation contents. In particular more specifically, when the confirmation button 79 of the others operation confirmation screen M6 is tapped, the second notification part 85 sends the notification to the server 2, the notification showing the confirmation of the others operation contents displayed in the others operation confirmation screen M6 (hereinafter the notification being referred to as an others confirmation notification).

When the first notification part of the mobile terminal 3b receives the others confirmation notification, the second notification part 85 of the server 2 notifies the other mobile terminal 3b of completion of confirming the others operation contents, the other mobile terminal 3b being other than the mobile terminal 3b that has notified the server 2 of the others confirmation notification.

Figure 18:
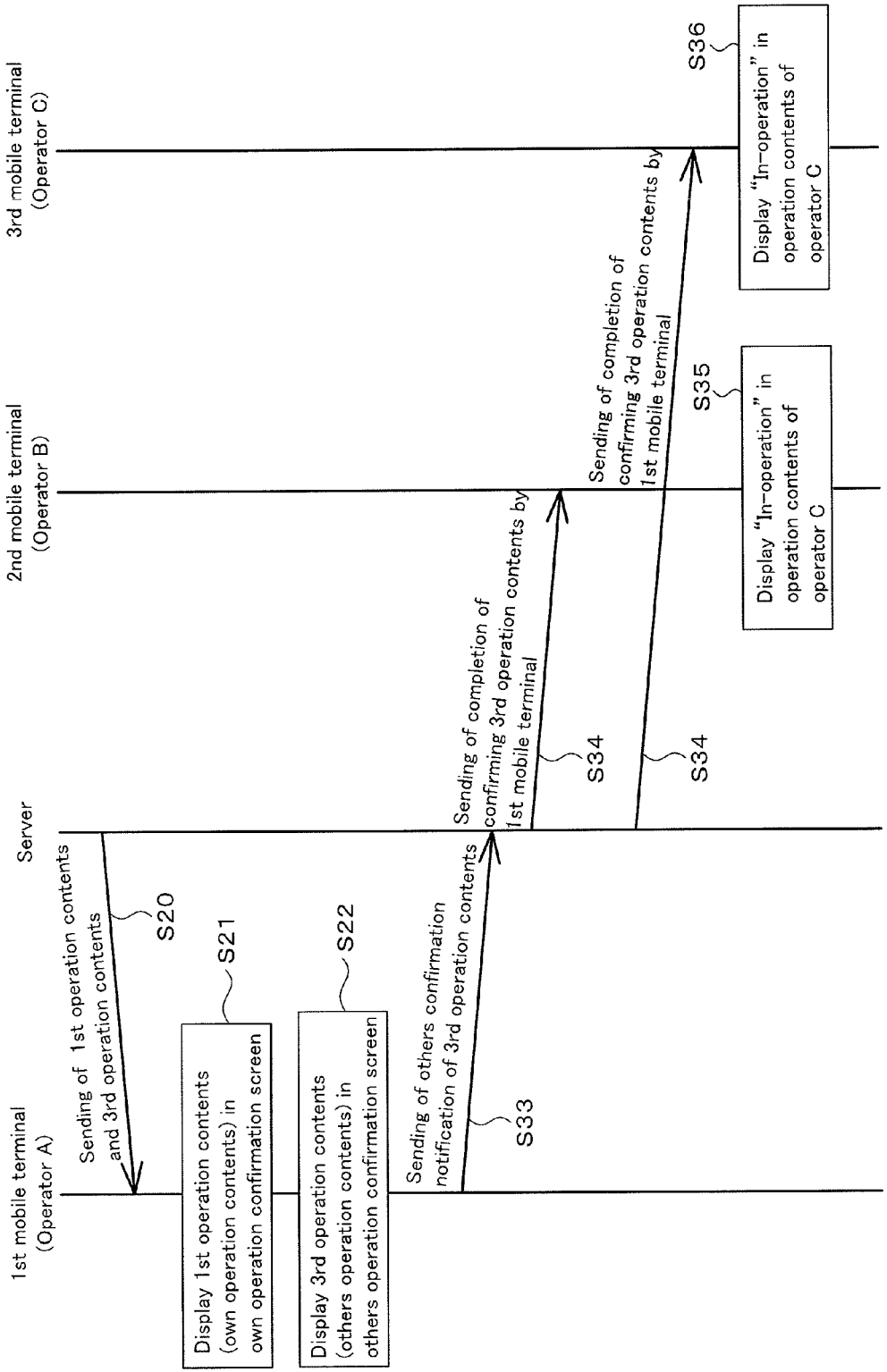
FIG. 18 is a second example showing a flow of sending and receiving the operation contents in the server and the mobile terminal.

FIG. 18 is a second example showing a flow of sending and receiving the operation contents between the server and the mobile terminal. Steps S20 to S22 of FIG. 11 are the same as the steps of FIG. 17.

When the confirmation button is tapped under a state where the third operation contents (the others operation contents) of the operator C is displayed in the others operation confirmation screen M6 in the first mobile terminal 3b, the first mobile terminal 3b sends the others confirmation notification of the third operation contents to the server 2 (S33). When the server 2 receives the others confirmation notification, the second notification part 85 sends the notification to the other mobile terminals (the second mobile terminal and the third mobile terminal) other than the first mobile terminal 3b, the notification showing that the third operation contents are confirmed by the first mobile terminal 3b (S34).

When receiving the others confirmation notification from the sever 2 (the second notification part 85), the second mobile terminal 3b displays, in the others operation screen M3, the "In-operation" on the operation contents of the operator C corresponding the others confirmation notification, the "In-operation" showing that the operation contents have been confirmed. In addition, when receiving the others confirmation notification from the sever 2 (the second notification part 85), the third mobile terminal 3b displays, in the own operation screen M2, the "In-operation" on the operation contents of the operator C (the operation contents addressed to own self) corresponding the others confirmation notification, the "In-operation" showing that the operation contents have been confirmed.

As described above, the operator A being the non-target operator can confirm the operation contents for the operator C being the target operator, and the operator C can be notified that the operator A being the non-target operator has confirmed the operation contents for the operator C.

Meanwhile, in the above-described embodiment, the second notification part 85 of the server 2 sends the own confirmation notification and the others confirmation notification to the mobile terminal 3b independently from the operation instruction part 71 being configured to send the operation contents to the mobile terminal 3a; however, the second notification part 85 may send the confirmation notification (the own confirmation notification and the others confirmation notification) in association with the operation instruction part 71. For example, the second notification part 85 adds a notification flag on the operation contents corresponding to the confirmation notification, the notification flag indicating the reception of the confirmation notification, when the confirmation notification is received, and then the second notification part 85 instructs the operation instruction part 71 to send the operation contents including the confirmation notification. When the predetermined mobile terminal 3b requests the operation contents, the operation instruction part 71 sends the operation contents and the confirmation flag to the mobile terminal 3b, that mobile terminal 3b having requested the operation contents.

Meanwhile, the mobile terminal 3b described above is capable of automatically sets up the agricultural machine 4 on the basis of the own operation contents displayed in the own operation confirmation screen M5; and/or the others operation contents displayed in the others operation confirmation screen M6.

As shown in FIG. 2, the mobile terminal 3b includes a setup part (a setup means) 86. The setup part 86 is constituted of a computer program or the like stored in the mobile terminal 3b. In a case where the agricultural operation shown in the operation contents is an operation carried out by the agricultural machine 4, the setup part 86 extracts a setup value of the agricultural machine 4 from the operation contents, and sends the extracted setup value to the agricultural machine 4.

The operation contents received by the mobile terminal 3b includes data used for setting of the agricultural machine. For example, out of the operation contents, the use machine (a type of and a model of an agricultural machine, a type of and a model of an implement, and the like) and the distribution amount are data used for the setting of the agricultural machine.

Figure 19:
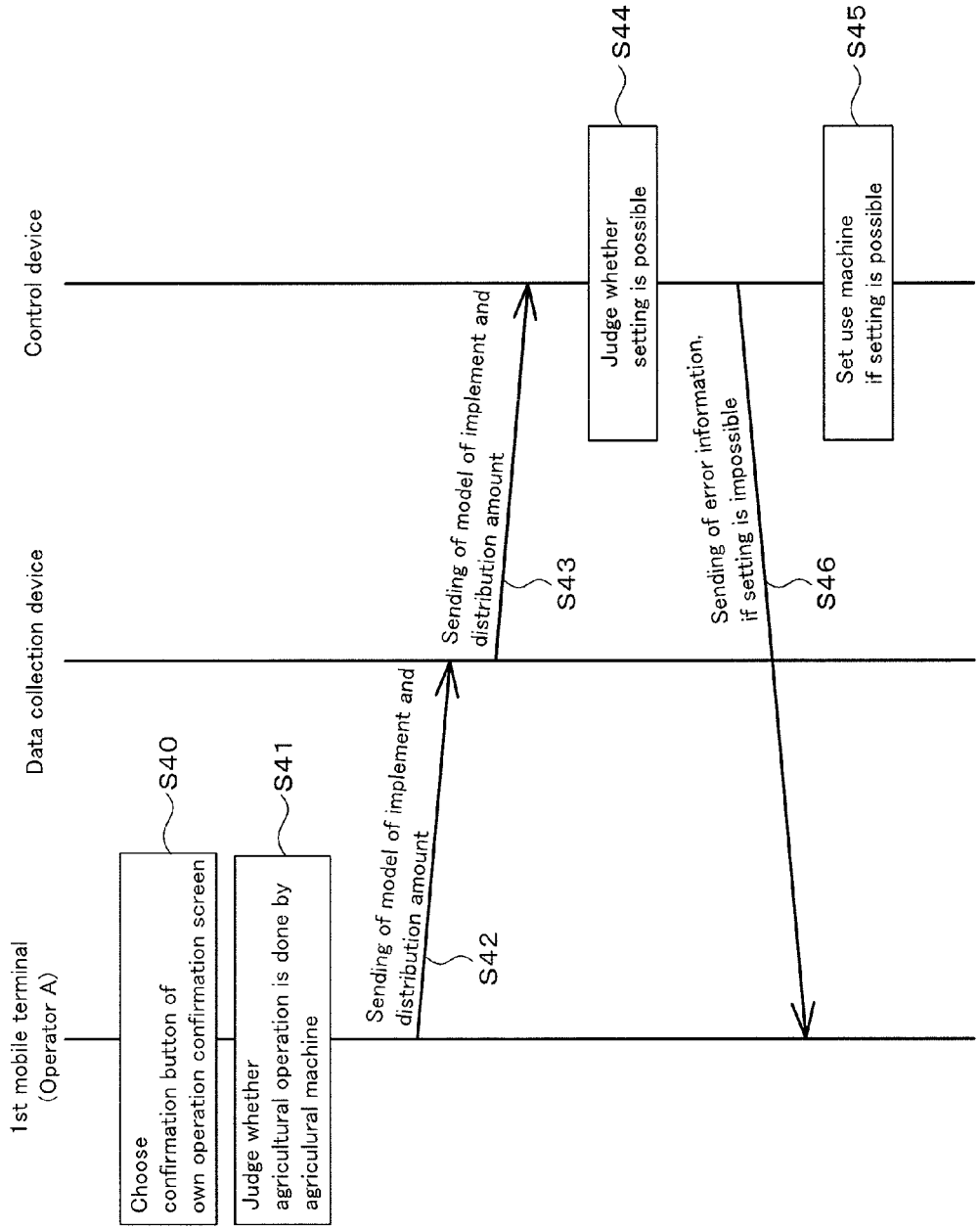
FIG. 19 is a view showing a flow for setting a configuration of an agricultural machine (a machine to be used) on the basis of the operation contents.

FIG. 19 shows a flow for setting a configuration of the agricultural machine (the use machine) on the basis of the operation contents. As shown in FIG. 19, when the confirmation button 79 is tapped under a state where the operation contents are displayed in the own operation confirmation screen M5 of the first mobile terminal 3b, the mobile terminal 3b being carried by the operator A (S40), for example, the setup part 86 judges whether the agricultural operation set in the operation contents is carried out by the agricultural machine (S41). In a case where the operation contents includes the use machine "a type of and a model of an agricultural machine or a type of and a model of an implement", the setup part 86 determines that the agricultural operation is carried out by the agricultural machine, and in a case where the use machine is not included in the operation contents, the setup part 86 determines that the agricultural operation is not carried out by the agricultural machine. For example, in a case where the "NW4511" indicating a model of an implement is set as the use machine in the operation contents, the setup part 86 determines that the agricultural operation is carried out by the agricultural machine, and in a case where a model of an implement is not set as the use machine in the operation contents, the setup part 86 determines that the agricultural operation is not carried out by the agricultural machine.

Then, when determining that the agricultural operation is carried out by the agricultural machine, the setup part 86 extracts the setup value of the agricultural machine from the operation contents, and sends the extracted setup value to the data collection device 5 (S42). For example, the setup part 86 extracts the distribution amount (20 kg per 10 are) from the operation contents, and sends the distribution amount and the use machine (the NW4511 that is a model of an implement) as the setup value to the data collection device 5. Meanwhile, the distribution amount may be the setup value.

When receiving the setup value (the distribution amount and the use machine), the data collection device 5 sends the setup value to the control device 6 (S43). The control device 6 judges, on the basis of the setup value sent from the setup part 86, whether the setup is possible (S44). In particular, the control device 6 judges whether the use machine included in the setup value (for example, the implement of the "NW4511") is attached to the agricultural machine 4. When determining that the use machine is attached, the control device 6 sets up the use machine on the basis of the setup value (S45). The control device 6 sends a fertilizer distribution amount (a fertilizer distribution amount of the operation contents) to the use machine, and thus sets up the use machine.

Meanwhile, in the setting of the use machine, the control device 6 may convert the fertilizer distribution amount of the operation contents into a value corresponding to the use machine, and send the converted value as the setup value to the use machine, and thereby the use machine carries out a fertilizer distribution on the basis of the fertilizer distribution amount shown in the operation contents, without directly sending the fertilizer distribution amount of the operation contents.

On the other hand, in a case where the use machine indicated in the operation contents is not attached to the agricultural machine 4 or where the use machine does not match the agricultural machine 4, the control device 6 sends error information to the mobile terminal 3b that has sent the setup value, the error information indicating that the setup is impossible (S46). In particular, the control device 6 sends the error information to the data collection device 5, and the data collection device 5 sends the error information to the mobile terminal 3b. When receiving the error information, the mobile terminal 3b displays a warning in the display part on the basis of the operation contents, the warning indicating that the setting of the agricultural machine is impossible. For example, the mobile terminal 3b displays as the warning that the use machine shown in the operation contents is not attached to the agricultural machine 4 (for example, "Not attached"), and displays as the warning that the use machine shown in the operation contents is different from the agricultural machine 4 (for example, "No matching between the operation contents and the machine"); in this manner, the mobile terminal 3b displays as the warning that the setup value indicated in the operation contents does not allow the setting of the agricultural machine 4 (for example, "Setup impossible in the setup value of the operation contents").

Meanwhile, the control device 6 sends the error information to the mobile terminal 3b through the data collection device 5, and displays the warning on the mobile terminal 3b; however, instead of that, the control device 6 may outputs the warning to a display device disposed around an operator seat of the agricultural machine to display the warning on the display device. In addition, the warning may be displayed on both of the mobile terminal 3b and the display device.

Furthermore, in the above described embodiment, the fertilizer distribution amount is sent from the mobile terminal 3b to the use machine out of the agricultural operator (the practice operator), the agricultural field, and the fertilizer distribution amount each described in the operation contents, and thus the use machine is set up; however, the operation contents may not include the information "who, where, and when the agricultural operation" (the practice operator, the agricultural field, and the agricultural operation time), and may include only contents (the fertilizer distribution amount and the distribution amount) that at least enables prediction of the type of agricultural operation being to be carried out by the agricultural operator, and accordingly the use machine may be set up on the basis of the contents.

Meanwhile, as show in FIG. 2, the mobile terminal 3b includes a creation part (a creation means) 87 provided for creation of a daily journal (a report). The creation part 87 is constituted of a computer program or the like stored in the mobile terminal 3b. In a case where the operation has been carried out on the basis of the operation contents, the creation part 87 creates the daily journal using the operation contents.

Figure 20:
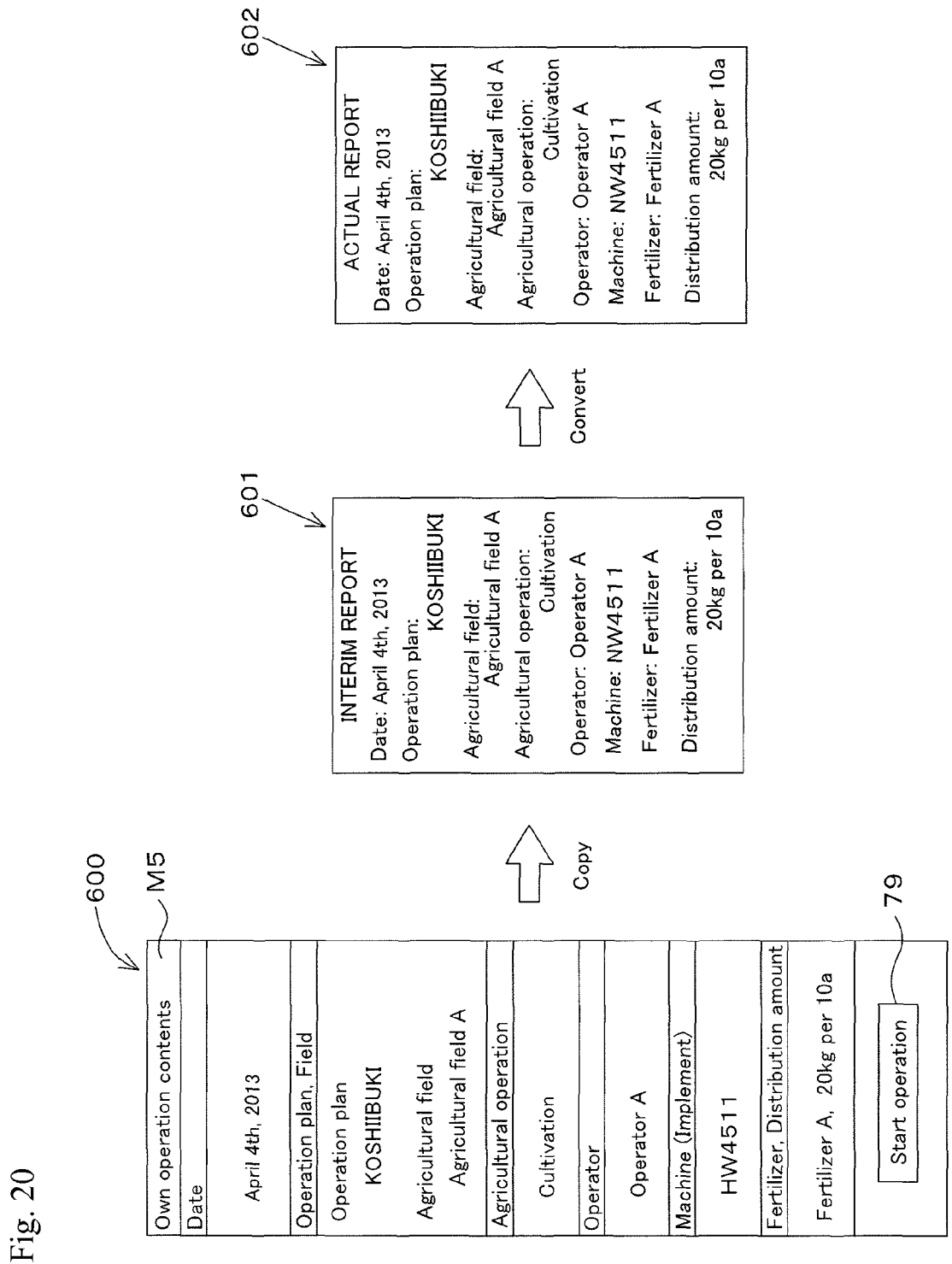
FIG. 20 is a view showing: an example of displaying the own operation contents on the own operation confirmation screen; an example of changing the own operation contents into an interim report; and an example of changing the interim report into a proper report.

For example, as shown by an arrowed line 600 in FIG. 20, assume that the first operation contents (the own operation contents) are displayed in the own operation confirmation screen M5 of the first mobile terminal 3b. Here, when the confirmation button 79 is tapped under a state where the first operation contents are displayed in the own operation confirmation screen M5 of the first mobile terminal 3b, the creation part 87 copies the first operation contents shown by the arrowed line 600 in FIG. 20 to create an interim report shown by an arrowed line 601 in FIG. 20, for example, and stores the interim report to the second storage part 23.

Figure 21:
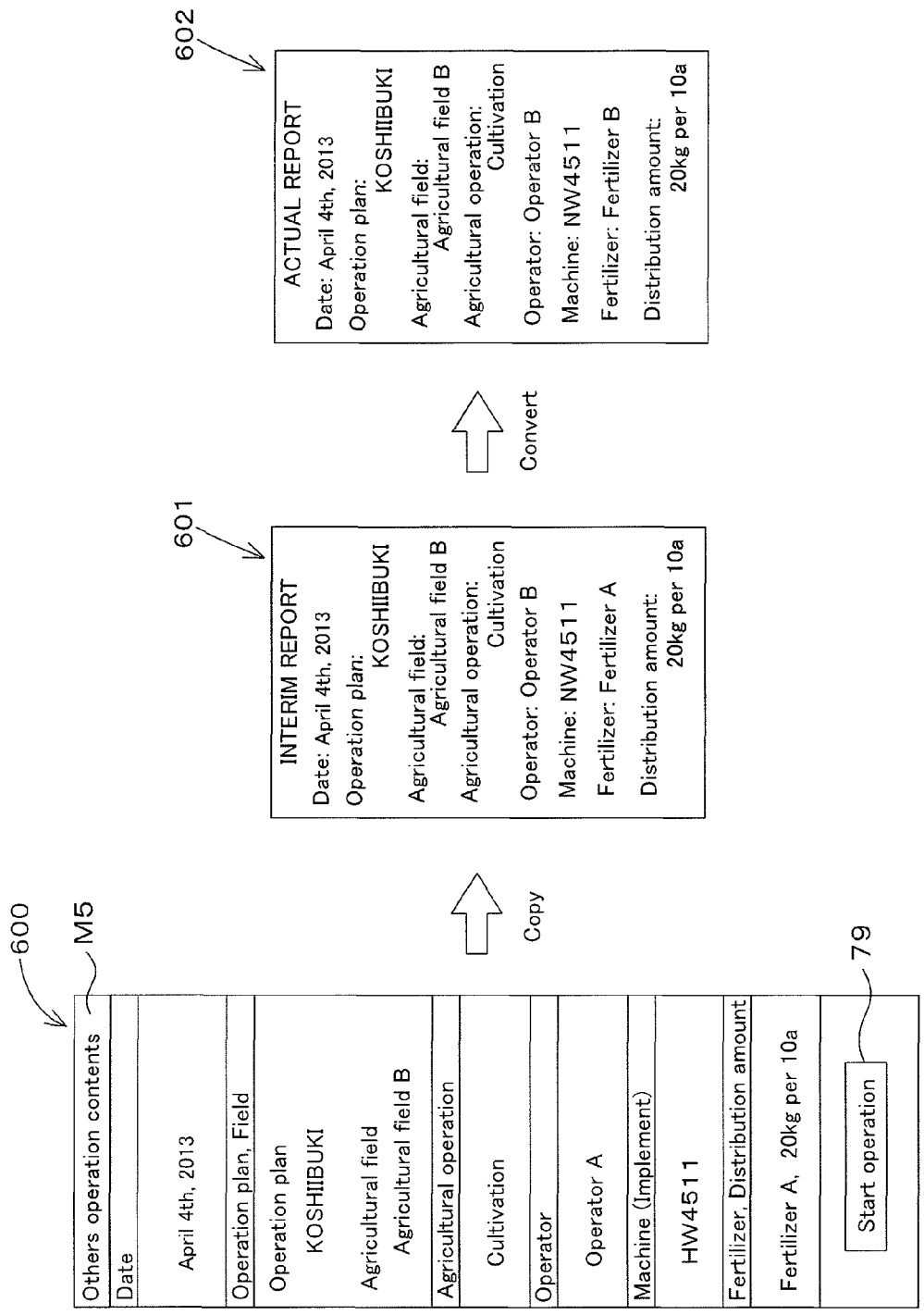
FIG. 21 is a view showing: an example of displaying the others operation contents on the others operation confirmation screen; an example of changing the others operation contents into an interim report; and an example of changing the interim report into a proper report.

Meanwhile, as shown by an arrowed line 700 in FIG. 21, assume that the third operation contents (the others operation contents) are displayed in the others operation confirmation screen M6 of the first mobile terminal 3b. Here, when the confirmation button 79 is tapped under a state where the third operation contents are displayed in the others operation confirmation screen M6 of the first mobile terminal 3b, the creation part 87 copies the third operation contents shown by the arrowed line 700 in FIG. 21 to create an interim report shown by an arrowed line 701 in FIG. 21, for example, and stores the interim report to the second storage part 23.

As described above, the interim report corresponding to the operation contents can be created in a case where the agricultural operation is carried out on the basis of the own operation contents and the others operation contents. The interim report created by the creation part 87 is sent to the server 2 by the first notification part 84. When receiving the interim report sent from the mobile terminal 3b (the first notification part 84), the server 2 stores the interim report to a report storage part (a report database) 50 included in the server 2. Meanwhile, the report storage part may be something simply storing the data other than the report database 50 storing (recording) the data in accordance with a predetermined rule.

In addition, after the agricultural operator confirms the own operation contents and the others operation contents in the operation confirmation screen (the own operation confirmation screen M5 and the others operation confirmation screen M6), the confirmed operation contents can be changed to the interim report, and the own confirmation notification and the others confirmation notification can be notified to the server 2.

Meanwhile, as shown in FIG. 2, the server 2 includes a second display part (a second display means) 121. The second display part 121 is constituted of a computer program or the like stored in the server 2. The second display part 121 displays the operation contents as the interim report on an external device (for example, the management computer 3a) other than the mobile terminal 3b, the operation contents corresponding to the confirmation notification (the own confirmation notification and the others confirmation notification) sent from the mobile terminal 3b.

That is, when the confirmation button 79 of the operation confirmation screen is tapped, the operation contents displayed in the operation confirmation screen is converted into the interim report, and the confirmation notification is sent to the server 2, on a side of the mobile terminal 3b; however, in response to the confirmation notification, the operation contents corresponding to the confirmation notification is converted into the interim report, and displays the interim report (an interim report converted from the operation contents by the server 2 in response to the notification information) on the management computer 3a accessing the server 2, on a side of the server 2. Meanwhile, the external device may be any alternate device capable of connecting to the server 2, the alternate device serving as the mobile terminal 3b (other than the mobile terminal 3b carried by the agricultural operator) allocated to the agricultural operator for the agricultural operation.

Figure 24:
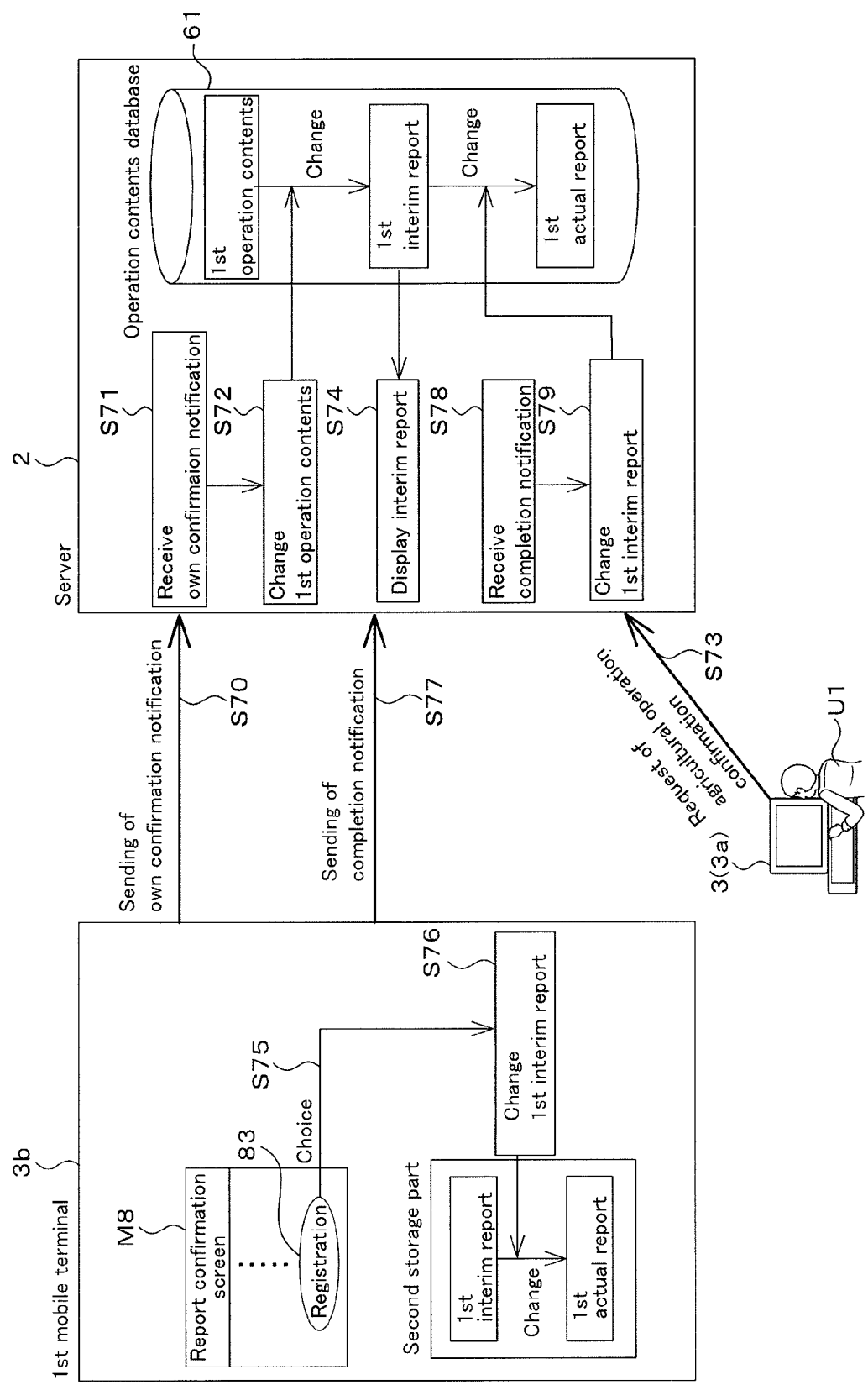
FIG. 24 is a view showing a flow of creation of a report.

FIG. 24 is a view summarizing a flow of the creation of the report.

As shown in FIG. 24, when the operator A confirms the first operation contents, for example, the first mobile terminal 3b carried by the operator A sends the own confirmation notification to the server 2, the own confirmation notification indicating the confirmation of the first operation contents (S70). When receiving the own confirmation notification (S71), the server 2 converts the first operation contents into the interim report, the first operation contents stored in the operation contents database 61 (S72). Hereinafter, the interim report corresponding to the first operation contents is referred to as a first interim report for convenience in the explanation.

Then, in a case where the management computer 3a accesses the server 2 and the management computer 3a requests the server 2 to confirm the agricultural operation of the operator A (S73), the second display part 121 refers to the operation contents database 61 and displays the first interim report on the management computer 3a (S74).

In this manner, in a case where the operator A notifies the server 2 of carrying out the agricultural operation on the basis of the first operation contents (in a case where the confirmation notification is issued), the first operation contents can be displayed as the first interim report on the management computer 3a, on the side of the server 2; and in this manner, the manager and the like can confirm, on the management computer 3a, which type of the agricultural operation is carried out by the operator A.

Meanwhile, the interim report is displayed in a report confirmation screen M8, the interim report being created by the creation part 87 of the mobile terminal 3b. That is, the mobile terminal 3b extracts the interim report from the second storage part 32, the interim report being created by the creation part 87, and displays the extracted interim report on the report confirmation screen M8. Here, when the registration button 83 of the report confirmation screen M8 is tapped, the creation part 87 converts the interim report displayed in the report confirmation screen M8 into an actual report and stores the actual report to the second storage part 23, as shown by an arrowed line 602 in FIG. 20 and by an arrowed line 702 in FIG. 21. In addition, when the registration button 83 of the report confirmation screen M8 is tapped, the first notification part 84 of the mobile terminal 3b sends a completion notification (a notification of completion of the agricultural operation) to the server 2, the completion notification indicating that the interim report has been converted into the actual report, that is, the agricultural operator has actually carried out the agricultural operation of the contents shown in the interim report. When receiving the completion notification, the server 2 converts the interim report corresponding to the completion notification into an actual report and stores the actual report to the report database 50.

As shown in FIG. 24, when the registration button 83 is tapped under a state where the first interim report is displayed in the report confirmation screen M8, for example (S75), the mobile terminal 3b converts the first interim report into a first actual report, and stores the first actual report to the second storage part 23 (S76). In addition, when the registration button 83 is tapped under a state where the first interim report is displayed in the report confirmation screen M8, for example (S75), the mobile terminal 3b sends the completion notification to the server 2, the completion notification indicating that the agricultural operator has actually carried out the agricultural operation of the contents shown in the first interim report (S77). When receiving the completion notification (S78), the server 2 converts the first interim report into the first actual report and stores the first actual report to the report database 50 (S79).

In addition, instead of the completion notification (the notification of completion of the agricultural operation), the first notification part 84 may send the actual report to the server 2, the actual report being stored to the second storage part 23 of the mobile terminal 3b. That is, the actual report may be uploaded to the report database 50 by the first notification part 84.

In a case where the completion notification cannot be sent due to failure of connection between the mobile terminal 3b and the server 2, the failure being caused depending on a radio wave condition and the like, for example, the mobile terminal 3b sends the actual report to the server 2, the actual report being stored in the second storage part 23, just after the connection between the mobile terminal 3b and the server 2 is established. In that case, when receiving the actual report sent from the mobile terminal 3b (the first notification part 84), the server 2 determines that the agricultural operation indicated in the actual report has completed, and stores the actual report to the report database 50.

Meanwhile, the mobile terminal 3b is capable of displaying not only the operation contents but also the operation plan. As shown in FIG. 12, when the display part 78 is dragged under a state where the others operation screen M3 is displayed on the display part 78, for example, the screen is changed from the others operation screen M3 to the plan confirmation screen M4. As shown by an arrowed line 501 in FIG. 15, the operation plan obtained by the obtain part 72 is displayed on the plan confirmation screen M4. For example, on the plan confirmation screen M4, the agricultural field (for example, the Agricultural field A), the agricultural operation (for example, Cultivation), and the agricultural operation period (for example, 4/2 to 4/5) are displayed as the operation plan, and the planting plan (for example, KISHIIBUKI and the Agricultural field A) relating to the operation plan is displayed.

Figure 22:
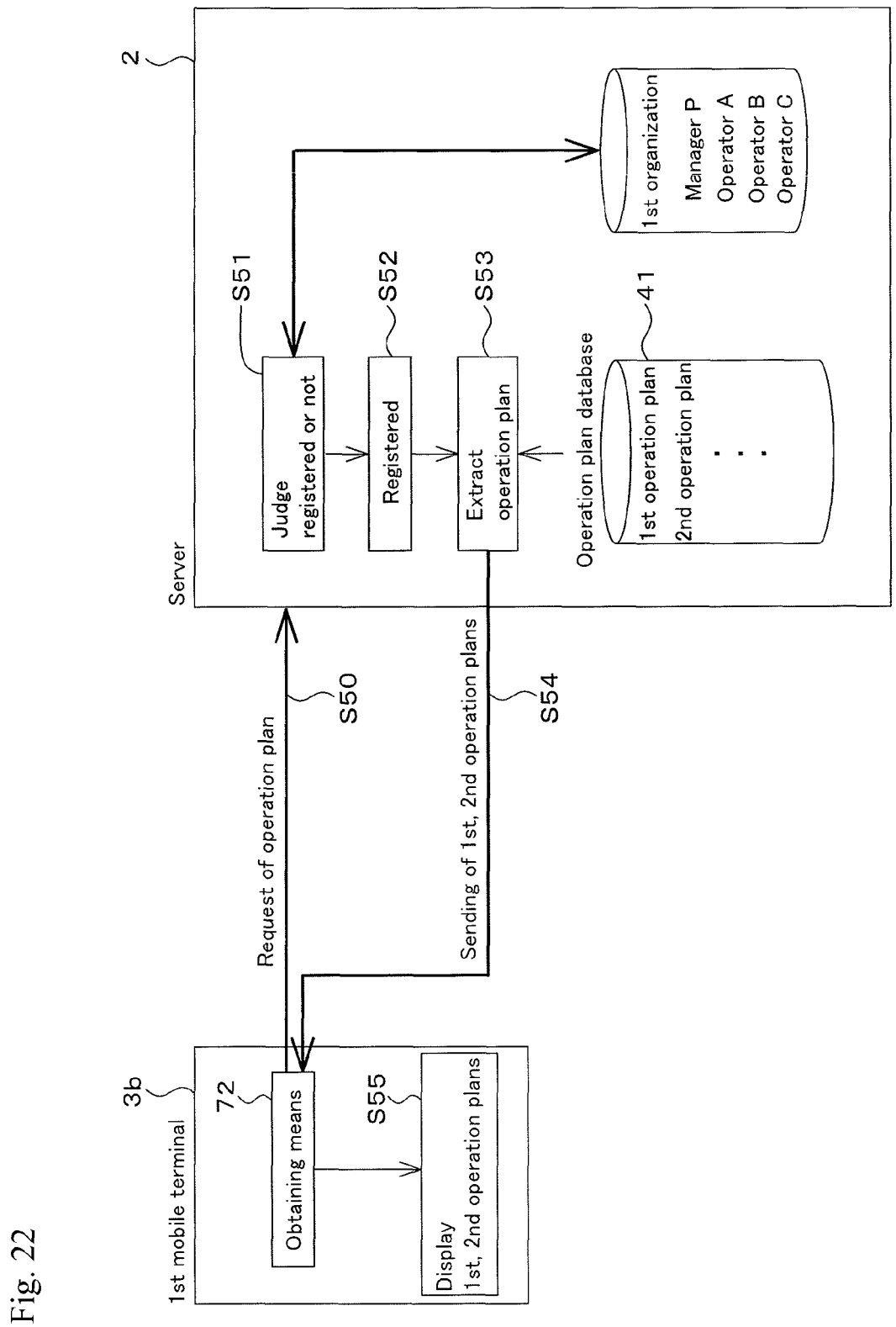
FIG. 22 is a view showing a flow from obtain of an operation plan to display of the operation plan.

FIG. 22 shows an example of a flow from the obtain of the operation plan to the display of the operation plan. Next, referring to FIG. 22, detailed explanation will be described below.

As shown in FIG. 22, assume that the operator A, the operator B, the operator C, and the manager P are registered as the first organization to the server 2, for example. In addition, assume that out of the operation plans, the first operation plan and the second operation plan are created by the manager P, that is, the management computer 3a allocated to the manager P.

The obtaining part (the obtaining means) 72 of the mobile terminal 3b requests the operation plan at the logging in to the server 2 (S50). The server 2 judges whether the logging-in mobile terminal 3b is the mobile terminal 3b allocated to the agricultural operator, the agricultural operator being registered in the server 2, that is, the logging-in mobile terminal 3b is registered (S51). For example, in a case where the mobile terminal 3b (the first mobile terminal 3b) allocated to the operator A requests the operation plan from the server 2, the server 2 determines that the requesting mobile terminal 3b is registered since the requesting first mobile terminal 3b is allocated to the operator A belonging to the first organization. On the other hand, the mobile terminal 3b other than the first mobile terminal 3b, the second mobile terminal 3b, and the third mobile terminal 3b logs in to the server 2 and requests the operation plan, the server 2 determines that the requesting mobile terminal 3b is not registered since the request is made by the mobile terminal 3b of the agricultural operator not belonging to the first organization.

Then, in a case where the operator A is registered (S52), the operation plans (the first operation plan and the second operation plan) are extracted from the operation plan database 41, the operation plans being created for the first mobile terminal 3b of the operator A by the "Manager P", the manager of the operator A (S53), and sends the extracted operation plan to the first mobile terminal 3b of the operator A (S54). The first mobile terminal 3b displays the first operation plan and the second operation plan in the plan confirmation screen M4 (S55).

As described above, a predetermined operation plan can be sent, the predetermined operation plan being created for the mobile terminal 3b of an agricultural operator by a manager of the agricultural operator, the agricultural operator belonging to a preliminarily registered organization. And, since the mobile terminal 3b is capable of displaying not only the operation contents but also the operation plan, the agricultural operator can watch the operation plan and thus can carry out the agricultural operation in a predetermined agricultural field even in a case where the mobile terminal 3b cannot obtain the operation contents, for example. Or, in a case where the agricultural operator has completed the agricultural operation based on the operation contents earlier than the predetermined plan to have a spare time, the agricultural operator can watch the operation plan and thus can carry out an additional agricultural operation.

In the above described embodiment, the mobile terminal 3b obtains the operation plan, regardless of completion of obtaining the operation, at the logging in of the mobile terminal 3b to the server 2, that is, at the tapping of the notification button 75 displayed in the main menu screen M1; however, instead of that, the operation plan may be obtained only when the operation contents cannot be obtained. For example, the obtaining part 72 firstly requests the obtaining of the operation contents from the server 2 after the mobile terminal 3*b* logs in to the server 2. Then, in a case where the own operation contents could not be obtained out of the operation contents obtained from the server 2 by the mobile terminal 3*b*, the obtaining part 72 requests the obtaining of the operation plan from the server 2, and thus obtains the operation plan.

In the above described embodiment, the operation contents created by the management computer 3*a* is obtained through the server 2 by the mobile terminal 3*b*; however, the operation contents can be created by using the mobile terminal 3*b*. In particular, the creation part 87 starts up when the creation button 77 shown in the main menu screen M1 is tapped, and the creation part 87 firstly orders the first display part 74 to display an operation contents creation screen M9 shown in FIG. 23 on the display part 78 of the mobile terminal 3*b*. The operation contents creation screen M9 is a screen provided for manual creation of the operation report. The operation contents creation screen M9 is a screen used when the operation contents is required to be created, for example, under a specific condition where a communication between the mobile terminal 3*b* and the server 2 cannot be established temporarily due to an affection of radio wave or where the agricultural operator cannot obtain the operation contents due to the manager forgetting to create the operation contents.

Figure 23:
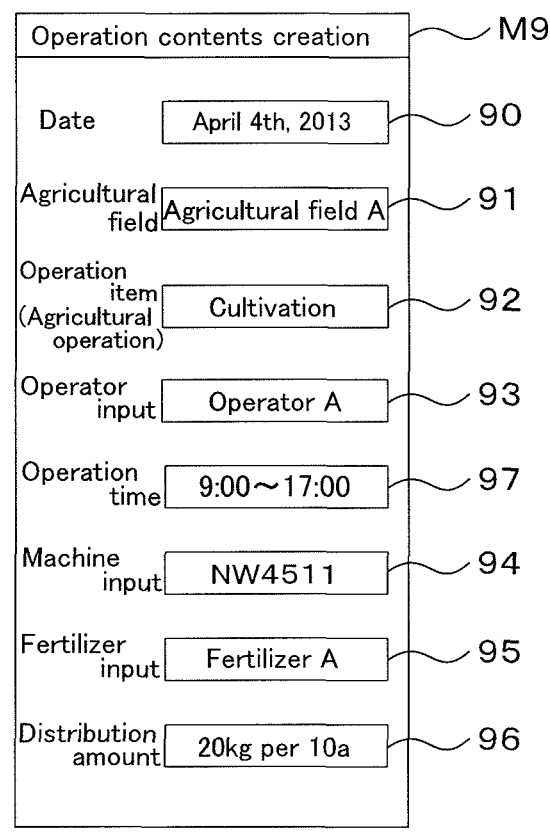
FIG. 23 is a view showing a report creation screen.

As shown in FIG. 23, the first display part 74 displays a date setup part 90 on the operation contents creation screen M9 on the basis of the order of the creation part 87, the date setup part 90 being provided for setting date of completion of the agricultural operation. The creation part 87 employs the date inputted to the date setup part 90 as a practice date of the agricultural operation. In addition, the first display part 74 displays an agricultural field choice part 91 in the operation contents creation screen M9, the agricultural field choice part 91 being provided for choice of the agricultural field. The creation part 87 sets the agricultural field inputted to the agricultural field choice part 91 as the agricultural field where the agricultural operation is carried out.

Furthermore, the first display part 74 displays, in the operation contents creation screen M9: an operation input part 92 provided for inputting the agricultural operation; an operator input part 93 provided for inputting the agricultural operator; a machine input part 94 provided for inputting the agricultural machine 4; a fertilizer input part 95 provided for inputting the fertilizer (the fertilizer name); and a distribution amount setup part provided for setting the fertilizer amount being to be distributed. The creation part 87 sets an agricultural operation name inputted to the operation input part 92 as the agricultural operation that was carried out, sets an operator name inputted to the operator input part 93 as the practice operator who carried out the agricultural operation, sets a machine name inputted to the machine input part 94 as the machine that carried out the agricultural operation, sets a fertilizer name inputted to the fertilizer input part 95 as the fertilizer that was distributed, and sets a numerical value inputted to the distribution amount setup part 96 as the fertilizer amount that was distributed. Meanwhile, the operation contents being created by the creation part 87 is not limited to the above described contents; for example, the agricultural chemical and a distribution amount of the agricultural chemical may be inputted as the operation contents, the agricultural chemical being used in the agricultural field.

In this manner, the operation contents manually created by the creation part 87 is sent to the server 2. For example, as shown in FIG. 23, when the registration button of the operation contents creation screen M9 is chosen, the mobile terminal 3*b* sets the operation contents, the operation contents being inputted to the operation contents creation screen M9, as the own operation contents, and sends the own operation contents to the server 2. When receiving the operation contents sent from the mobile terminal 3*b* (the first notification part 84), the server 2 stores the received operation contents to the operation contents database 61. In addition, the server 2 sends the received own operation contents to the other mobile terminals 3*b*.

For example, when the operation contents (the own operation contents) are created by the first mobile terminal 3*b* carried by the operator A, the first mobile terminal 3*b* sends the own operation contents as the first operation contents to the server 2, the first operation contents corresponding to the operator A. The server 2 stores the received first operation contents of the operator A to the operation contents database 61. In addition, the server 2 sends the first operation contents to the mobile terminals 3*b* of others, the operator B and the operator C belonging to the same organization with the operator A. The mobile terminals 3*b* of the operator B and the operator C display the received first operation contents as the others operation contents in the others operation screen M3.

In this manner, the operator receiving no operation instruction can create the operation contents by using the own mobile terminal 3*b*, and can notify other operators of the operation contents through the server 2, for example. In addition, the management computer 3*a* can display the operation contents (the operation contents created by the mobile terminal 3*b*) stored in the operation contents database 61 of the server 2, and accordingly the manager can know the agricultural operation being to be carried out by the operator on the basis of the operation contents (the operation contents created by the mobile terminal 3*b*) even when the manager issued no instruction.

Meanwhile, the server 2 includes a calculation part (a calculation means) 122 and a progression display part (a progression display means) 123. The calculation part 122 and the progression display part 123 are constituted of a computer program or the like stored in the server 2.

The calculation part 122 calculates a progression state of the operation plan, the progression state showing how much extent the operation plan progresses, and calculates the progression status of the operation plan on the basis of: the operation plan stored in the operation plan database 41; and an operation result storage part configured to store completion of the agricultural operation for each of the agricultural fields, for example. As described above, the actual report shows the completion of the agricultural operation, and accordingly the report database 50 storing the actual report is employed as the operation result storage part in the embodiment. Meanwhile, the operation result storage part may be anything capable of storing: completion of the agricultural operation; or incompletion of the agricultural operation in a predetermined agricultural field, and the operation result storage part is not limited to the report database 50 accordingly.

Figure 26:
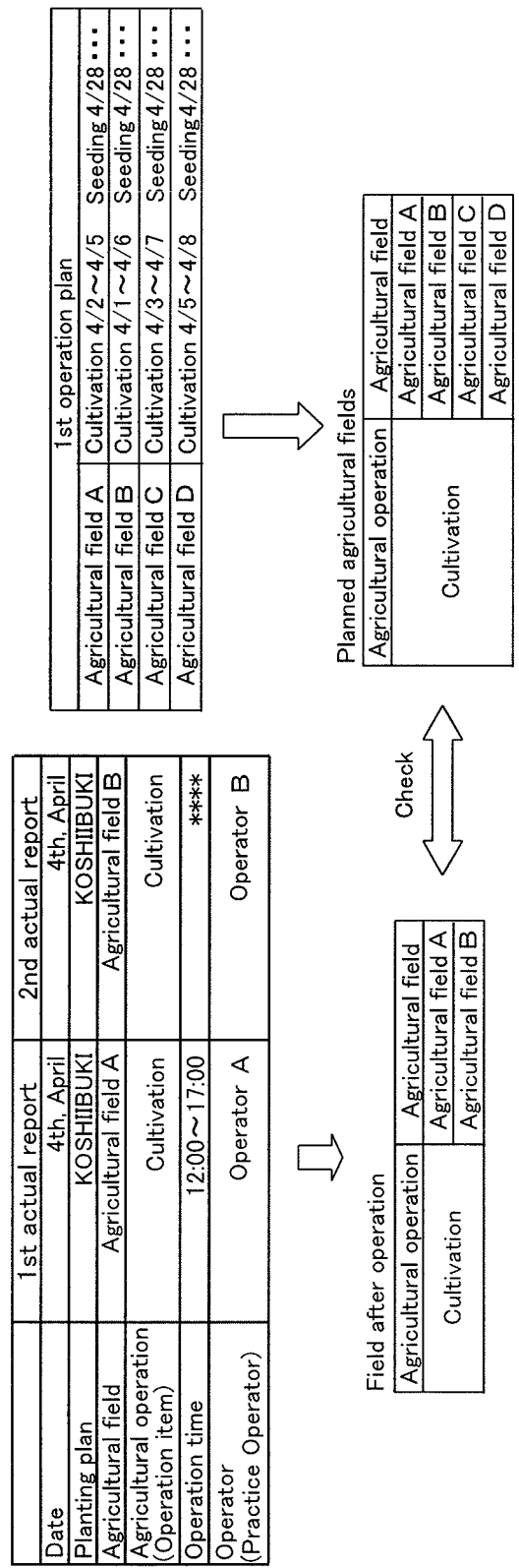
FIG. 26 is an explanation view explaining calculation of a progression state.

Referring to FIG. 25 and FIG. 26, the calculation of the progression state will be explained.

Referring to FIG. 25, a relationship between the actual report and completion of the agricultural operation will be explained first.

Assume that the server 2 (the operation instruction part 71) sends the first operation contents, the second operation contents, and the third operation contents to the mobile terminals 3b allocated to the operator A, the operator B, and the operator C, the first operation contents, the second operation contents, and the third operation contents being shown by an allowed line 800 in FIG. 25. Here, assume that the operator A completes the agricultural operation (the cultivation) shown in the first operation contents at a designated date (4/4), the operator B also completes the agricultural operation (the cultivation) shown in the second operation contents at the designated date (4/4), and the server 2 has received each of the completion notifications.

In that case, as shown by an arrowed line 801 in FIG. 25, the first actual report and the second actual report are stored to the report database 50, the first actual report corresponding to the first operation contents, the second actual report corresponding to the second operation contents. Since the first actual report and the second actual report are stored in the report database 50, it can be known by the first actual report and the second actual report that: the cultivation in the agricultural field A completed at "4/4"; and the cultivation in the agricultural field B completed at "4/4" out of the agricultural group (the agricultural field A, the agricultural field B, the agricultural field C, and the agricultural field D) for the plantation of the crop "KOSHIIBUKI". On the other hand, since the third actual report corresponding to the third operation contents cannot be found in the report database 50, it can be known that the cultivation in the agricultural field C does not complete.

Next, referring to FIG. 26, the calculation of the progression state will be explained, the calculation being based on the actual report.

In the calculation of the progression state, the calculation part 122 firstly refers to the actual report in the report database 50, and refers to the operation plan in the operation plan database 41. Then, the calculation part 122 calculates the progression state of a predetermined agricultural operation shown in the operation plan, using the referred actual report and the referred operation plan.

For example, assume that in the calculation of the progression state, the calculation part 122 referred to the first actual report and the second actual report shown in FIG. 26, and referred to the first operation plan. When the calculation part 122 refers to the first actual report, the first actual report shows that the cultivation in the agricultural field A completed at "4/4", and accordingly the calculation part 122 determines that the cultivation in the agricultural field A completed, the cultivation being shown in the first operation plan. In addition, when the calculation part 122 refers to the second actual report, the second actual report shows that the cultivation in the agricultural field B completed at "4/4", and accordingly the calculation part 122 determines that the cultivation in the agricultural field B also completed, the cultivation being shown in the second operation plan. That is, regarding a predetermined agricultural operation, the calculation part 122 extracts from the report an agricultural field (a completed agricultural field) where the predetermined agricultural operation (for example, the cultivation) completed, checks the completed agricultural fields and the agricultural fields (a planned agricultural field) shown in the operation plan, and determines that the agricultural operation completed in the planned agricultural field checked to match the completed agricultural field.

Next, the calculation part 122 extracts the agricultural field for the same agricultural operation from the operation plan (the operation plan database 41). In other words, the calculation part 122 extracts the agricultural fields for the same agricultural operation from among the agricultural fields for the plantation of the same crop.

For example, as shown in FIG. 26, the agricultural fields (for example, the agricultural field A, the agricultural field B, the agricultural field C, and the agricultural field D) for the agricultural operation "cultivation" from the first operation plan. Then, the calculation part 122 calculates a completion rate showing a proportion of the agricultural fields where the "cultivation" completed in the extracted agricultural field group (the agricultural field A, the agricultural field B, the agricultural field C, and the agricultural field D). For example, the calculation part 122 calculates the completion rate of the agricultural fields by using an equation "the completion rate of the agricultural fields (%)=the number of agricultural fields for the same agricultural operation/the number of agricultural fields where the agricultural operation completed". As described above, out of the agricultural field A, the agricultural field B, the agricultural field C, and the agricultural field D, the agricultural fields where the cultivation completes are "the agricultural field A and the agricultural field B", and accordingly the completion rate of the agricultural fields is 50%.

As described above, the agricultural fields for the same agricultural operation are extracted from the operation plan database 41, the completion rate of the agricultural fields where the agricultural operation completed is calculated in the extracted agricultural field group, and thereby the progression state of the operation plan can be calculated, that is, it can be calculated how much extent a predetermined agricultural operation progresses.

The progression display part 123 displays the progression state calculated by the calculation part 122. For example, when the management computer 3a is connected to the server 2 and requests the progression state, the progression display part 123 displays a progression state screen Q6 on the management computer 3a, the progression state screen Q6 showing the progression state.

Figure 27:
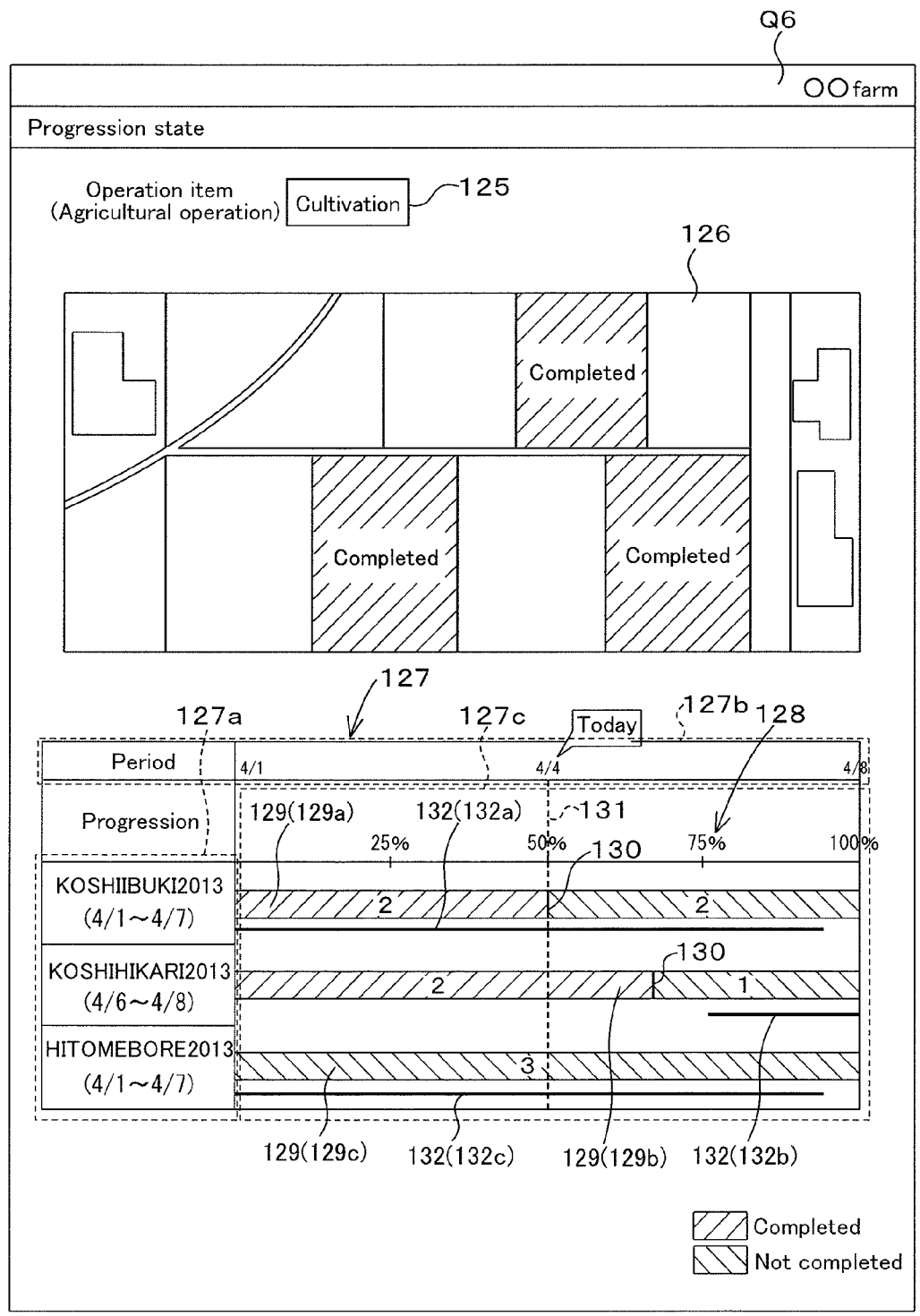
FIG. 27 is a view showing a progression state screen.

FIG. 27 shows an example of the progression state screen Q6 displayed on the management computer 3a by the progression display part 123. Referring to FIG. 27, the progression state screen Q6 will be explained. Meanwhile, the explanation will be described supposing a processing for the display of the progression state screen Q6 is executed by the progression display part 123.

As shown in FIG. 27, the progression state screen Q6 includes: an operation choice part 125 provided for choice of the item of the agricultural operation; an agricultural field display part 126 provided for display of an agricultural field map; and a state display part 127.

For example, a list of the agricultural operations included in the operation plan is displayed in the operation choice part 125, the operation plan being stored in the operation plan database 41, and then the agricultural operation being to be displayed on the progression state screen Q6 can be chosen from the list. The agricultural field display part 126 displays on the agricultural field map separately: an agricultural field where the agricultural operation chosen by the operation choice part 125 completed; and an agricultural field where the agricultural operation does not complete. For example, the agricultural field where the agricultural operation completed is shown in red, and the agricultural field where the agricultural operation does not complete is shown in blue.

The state display part 127 displays the progression state for each of the operation plans (for each of the planting plans), the progression state relating to the agricultural operation chosen by the operation choice part 125. For example, the state display part 127 displays: the progression state of the identical agricultural field group for the "cultivation" shown in the first operation plan; the progression state of the identical agricultural field group for the "cultivation" shown in the second operation plan; and the progression state of the identical agricultural field group for the "cultivation" shown in the third operation plan.

In particular, the state display part 127 includes: a plan display part 127a provided for display of the operation plan (the planting plan); a third course display part 127b provided for display of a time course; and a result display part 127c provided for display of the progression state (the calculation result) of the operation plan (the planting plan). The planting plan is displayed in the plan display part 127a, the planting plan being related to the operation plan for the agricultural operation chosen in the operation choice part 125. The server 2 extracts: "KOSHIIBUKI 2013", a name of the planting plan related to the first operation contents; "KOSHIHIKARI 2013", a name of the planting plan related to the second operation contents; and "HITOMEBORE 2013", a name of the planting plan related to the third operation contents, and displays the names on the plan display part 127a in the order of description. Meanwhile, the name of the planting plan displayed in the plan display part 127a is referred to as a "planting plan name" for convenience in the explanation.

A predetermined period is displayed on the third course display part 127b. The earliest date for start of the agricultural operation is displayed at one end (on a left side) of the third course display part 127b, and the latest date for completion of the agricultural operation is displayed at the other end (on a right side) of the third course display part 127b. For example, as shown in FIG. 27, among the first operation plan, the second operation plan, and the third operation plan respectively corresponding to the "KOSHIIBUKI 2013", the "KOSHIHIKARI 2013", and the "HITOMEBORE 2013" each shown in the plan display part 127a, the earliest date "4/1" for start of the agricultural operation period is displayed on the left side of the third course display part 127b, and the latest date "4/8" for completion of the agricultural operation period is displayed on the right side of the third course display part 127b. That is, one end side of the third course display part 127b is a portion for displaying a first date of the period, and the other end side of the third course display part 127b is a portion for displaying a final date of the period.

As shown in FIG. 27, the result display part 127c includes a scale part 128 and a scale (a first scale) 129, the scale part 128 being provided for expressing the progression state in percentile, the scale 129 being provided for showing the completion rate, that is, the progression state of the agricultural fields, corresponding to the scale part 128.

The scale part 128 is arranged on a lower side of the third course display part 127b. The minimum value (0%) of the scale part 128 is set on a lower side of the first date displayed in the third course display part 127b, and the maximum value (100%) of the scale part 128 is set on a lower side of the final date displayed in the third course display part 127b.

The scale (the first scale) 129 is displayed on one side (for example, a right side) of the planning plan name, corresponding to the planting plan name displayed in the plan display part 127a. For example, the first scale 129a is displayed on a right side of the plan display part 127a displaying the "KOSHIIBUKI 2013", the first scale 129a displaying the progression state of the first operation plan (the cultivation shown in the first operation plan), the first operation plan corresponding to the planting plan of the "KOSHIIBUKI 2013". In addition, the first scale 129b is displayed on a right side of the plan display part 127a displaying the "KOSHIHIKARI 2013", the first scale 129b displaying the progression state of the second operation plan (the cultivation shown in the second operation plan), the second operation plan corresponding to the planting plan of the "KOSHIHIKARI 2013", and the first scale 129c is displayed on a right side of the plan display part 127a displaying the "HITOMEBORE 2013", the first scale 129c displaying the progression state of the third operation plan (the cultivation shown in the third operation plan), the third operation plan corresponding to the planting plan of the "HITOMEBORE 2013".

The first scale 129 has a rectangular shape along the scale part 128, that is, a straight display bar; one end of the first scale 129 corresponds to the minimum value of the scale part 128, and the other end of the first scale 129 corresponds to the maximum value of the scale part 128. The first scale 129 includes a first index part 130 indicating the completion rate of the agricultural fields, the completion rate being calculated by the calculation part 122. For example, when the completion rate of the agricultural fields relating to the "cultivation" is 50% in the first operation plan, the first index part 130 is displayed at a position indicating "50%" on the first scale 129a.

In addition, the number of the agricultural fields where the agricultural operation completed is displayed on the first scale 129. In particular, the number of the agricultural fields where the agricultural operation completed is displayed in an area extending from one end (the minimum value side) of the first scale 129 to the first index part 130, and the number of the agricultural fields where the agricultural operation does not complete is displayed in an area extending from the first index part 130 to the other end (the maximum value) of the first scale 129.

As described above, the first scale 129 is displayed in the result display part 127c, and the first index part 130 is shown on the first scale 129, thereby showing the completion rate of the agricultural fields.

Meanwhile, as shown in FIG. 27, a second index part 131 may be displayed in the progression state screen Q6, the second index part 131 indicating a date (a present date) of display of the progression state. In particular, the second index part 131 is displayed at a position indicating a present date (for example, 4/4) in the third course display part 127b. In addition, the second index part 131 shows the position of the present date (for example, 4/4) by using a line, the position being determined relative to the third course display part 127b, and the linear second index part 131 intersects the first scale 129. For example, in displaying the progression state screen Q6 on the management computer 3a, the server 2 extracts, by using an internal timer and the like, a present date (for example, 4/4) of the display of the progression state screen Q6, displays the second index part 131 at a predetermined position in the result display part 127c (the third course display part 127b), and thus indicates the present date on the first scale 129.

As shown in FIG. 27, in the above described embodiment, the first scale displays the completion rate of the agricultural field (the progression state) for the "cultivation", for each of the operation plans (for example, the first operation plan, the second operation plan, and the third operation plan); however, it is preferred to display, by the second scale 132, the agricultural operation period for the "cultivation" shown in each of the operation plans.

For example, the agricultural operation period (4/1 to 4/7) of the "cultivation" of the first operation plan is shown, by the second scale 132a, on a lower side of the first scale 129a showing the progression state of the first operation plan. In addition, the agricultural operation period (4/6 to 4/8) of the "cultivation" of the second operation plan is shown, by the second scale 132*b*, on a lower side of the first scale 129*b* showing the progression state of the second operation plan, and the agricultural operation period (4/1 to 4/7) of the "cultivation" of the third operation plan is shown, by the second scale 132*c*, on a lower side of the first scale 129*c* showing the progression state of the third operation plan.

The second scale 132 has a rectangular shape along the scale part 128, that is, a straight display bar, and is arranged along the first scale 129. In addition, one end side (a left side) of the second scale 132 shows a start date of the agricultural operation period, and the other end side (a right side) of the second scale 132 shows a completion date of the agricultural operation period. Meanwhile, the second scale 132 is arranged in parallel along a longitudinal direction of the first scale 129, and as described below, accordingly the second scale 132 intersects the second index part 131 depending on a relation between a length of the second scale 132 and the present date.

For this reason, the completion rate of the agricultural fields (the progress of the agricultural operation) and the agricultural operation period can be known, being related to each other, the completion rate being shown by the first scale 129, the agricultural operation period being shown by the second scale 132.

For example, regarding the "KOSHIIBUKI 2013", the "cultivation" of a half of the agricultural fields has completed at a present time "4/4" (the completion rate 50%). In addition, the second index part 131 showing a present date (4/4) is positioned at a center portion of the second scale 132*a* (a center portion of the second scale 132 in a longitudinal direction). In other words, when the second index part 131 intersecting the second scale 132*a* is seen under a condition where one end side of the second scale 132*a* shows "0%" and the other end side of the second scale 132*a* shows "100%", the second index part 131 is seen at a position indicating approximately 50% of a whole length of the second scale 132*a*.

That is, when the first scale 129*a* and the second scale 132*a* are seen, the completion rate of the agricultural field (50%) shown by the first scale 129*a* approximately corresponds to the position of the second index part 131 (50% of the whole length), the position being relative to the second scale 132*a*, and thus regarding the "KOSHIIBUKI 2013", it can be known that the "cultivation" progresses in accordance with the operation plan at the present moment.

On the other hand, regarding the "KOSHIHIKARI 2013", the "cultivation" of two thirds of the agricultural fields has completed at a present time "4/4". Here, when the present date (for example, 4/4) shown in the second index part 131 is seen, the second index part 131 being relative to the second scale 132*b*, the start date of the agricultural operation period shown by the second scale 132*b* is behind the present date (4/4), and thus the second index part 131 does not intersect the second scale 132*b*. That is, when the first scale 129*b* and the second scale 132*b* are seen, the completion rate of the agricultural fields (67%) shown by the first scale 129*b* can be seen sufficiently progressive; however, the second index part 131 is positioned closer to a side of the minimum value (the first date) than the second scale 132*b*, and accordingly it can be known that regarding the "KOSHIHIKARI 2013", the "cultivation" has been carried out too much earlier than the operation plan.

In addition, regarding the "HITOMEBORE 2013", the "cultivation" of the agricultural fields has not completed at all (the completion rate 0%). Furthermore, the second index part 131 is positioned at a portion indicating an approximately 50% in a longitudinal direction of the second scale 132*c*. That is, regarding the "HITOMEBORE 2013", the "cultivation" is not carried out in accordance with the operation plan; however, if it is desired to complete the "cultivation conclusively in accordance with the operation plan, it can be known that the "cultivation" for all of the agricultural fields has to be carried out in half of the agricultural operation period shown in the operation plan.

Meanwhile, as shown in FIG. 27, the agricultural operation period corresponding to each of the second scales 132 may be displayed in the plan display part 127.

As described above, the agriculture support system 1 of the present invention includes: the operation contents creation part 60; the operation contents database 61; the operation instruction part 71; the first display part 74 configured to display the operation contents on the mobile terminal 3*a*, the operation contents being sent by the operation instruction part 71; the notification part (the first notification part 84 and the second notification part 85) configured to notify, from the mobile terminal 3*b*, the external device (for example, the server 2 and the management computer 3*a*) different from the mobile terminal 3*b* of the confirmation of the operation contents displayed on the mobile terminal 3*b*; and the second display part 121 configured to display the operation contents on the external device, the operation contents being confirmed by the notification part. For this reason, it can be notified to the management computer 3*a* and the like that the agricultural operator has confirmed the operation contents at the start of the agricultural operation by using the mobile terminal 3*b*, and the manager and the like can confirm, by using the management computer 3*a*, the operation contents currently carried out by the agricultural operator, for example. That is, the manager can know the agricultural operation being to be carried out by the agricultural operator; thus, the manager can judge whether the agricultural operation being to be carried out by the agricultural operator is right, and can inform the agricultural operator to change the agricultural operation when the agricultural operation is wrong.

In addition, in receiving the confirmation notification of the operation contents from the notification part, the server 2 creates the operation contents as the interim report, and in receiving the notification of completion of the agricultural operation from the notification part, the server 2 converts the interim report into the actual report; thus, in a case where the agricultural operator confirmed the operation contents at the start of the agricultural operation by using the mobile terminal 3*b*, the operation contents can be stored (saved) as the interim report on a side of the server 2, and the operation contents being carried out by the agricultural operator can be confirmed on the side of the server 2, for example. In addition, at completion of the agricultural operation, the interim report can be converted into the actual report, the actual report can be stored on the side of the server 2, and thus the actual report can be confirmed on the side of the server 2, the actual report showing a result of the agricultural operation.

In addition, the mobile terminal 3*b* creates the operation contents as the interim report at the confirmation of the operation contents, and converts the interim report into the actual report at the completion of the agricultural operation; thus, the interim report and the actual report can be stored in the mobile terminal 3*b* even in a case where the side of the server 2 could not create the interim report and the actual report due to an influence of the communication, such as a temporal impossibility of the communication between the mobile terminal 3*b* and the server 2, for example.

In addition, the agriculture support system 1 of the present invention includes the operation contents creation part 60, the operation instruction part 71, and the setup part 86; in a case where the agricultural operation of the operation contents is an operation to be carried out by the agricultural machine, the setup part 86 extracts the setup value of the agricultural machine 4 from the operation contents and sends the setup value to the control device 6 of the agricultural machine 4, and the control device 6 sets up the agricultural machine 4 on the basis of the setup value, and thereby the agricultural machine can be easily set up on the basis of the operation contents. For example, in a case where the agricultural operator does not know the setting (for example, the fertilizer distribution setting) of the agricultural machine 4 (for example, the fertilizer distributor), the agricultural operation itself becomes hard to be carried out; however, in the present invention, since the agricultural machine 4 can be automatically set up on the basis of the operation contents, the agricultural operation can be carried out. In addition, even the agricultural operator capable of setting up the agricultural machine 4 happens to mistake the setting of the agricultural machine 4; however, the wrong setup can be prevented.

Furthermore, the mobile terminal 3b includes the display part (the first display part) 74, the setup part 86 sends the setup value when confirming the operation contents displayed by the first display part 74, and thereby the agricultural operator watches the operation contents and sets up the agricultural machine 4 on a timing to start the agricultural operation. That is, the agricultural operator presses the confirmation button 79 provided for the confirmation of operation contents, the agricultural machine 4 can be set up on the timing to start the agricultural operation corresponding to the operation contents, and thereby the agricultural operation by the agricultural machine 4 is accurately carried out.

Moreover, in a case where the agricultural machine 4 cannot be set up by using the setup value, the control device 6 outputs a warning to the mobile terminal 3b or the display device disposed on the agricultural machine 4, the warning indicating that the setup cannot be carried out, and thereby it can be immediately known that the agricultural machine 4 does not match the operation contents. For example, it can be immediately known by the warning that the implement attached to the tractor is different from the implement shown by the setup value sent from the mobile terminal 3b, and it can be introduced to attach the implement suitable for the agricultural operation (the operation contents).

In addition, the agriculture support system 1 of the present invention includes the operation plan setup part 40, the operation plan database 41, the operation result storage part, the calculation part 122, and the progression display part 123; the calculation part 122 extracts the agricultural fields for the same agricultural operation from the operation plan database 41 and calculates the completion rate of the agricultural field where the agricultural operation has completed in the extracted agricultural field group, and the progression display part 123 shows the completion rate of the agricultural field as the progression state, thereby it is easily known how much extent the "cultivation" of the agricultural fields completed in all of the agricultural fields for the "cultivation", as described above. A farming group owns many agricultural fields, and thus carries out, depending on the crop, the same agricultural operation in may agricultural fields in the same period. In the agriculture support system 1 of the present invention, even when the same agricultural operation is carried out in many agricultural fields in the same period, it is easy to know the progressions of all of the agricultural fields where the same agricultural operation is carried out, and thereby the manager can adequately control a staff arrangement for the agricultural operators, monitoring the progression state.

In addition, the progression display part 123 displays the completion rate of the agricultural field by using the first scale 129, displays, along the first scale 129, the agricultural operation period relating to the same agricultural operation for the agricultural field group by using the second scale 132, and displays date of displaying the progression state superposing on the first scale 129 and the second scale 132, thereby the progression of the agricultural operation at the present moment is easily known as described above.

The progression display part displays, on the agricultural field map, the agricultural field where the agricultural operation completed and the agricultural field where the agricultural operation does not complete, and thereby the agricultural field where the agricultural operation completed and the agricultural field where the agricultural operation does not complete are monitored.

Furthermore, the agriculture support system 1 of the present invention includes the operation plan setup part 40, the operation plan database 41, the operation standard database 42, and the default change part 120; when the operation plan relating to a predetermined crop is set up by the operation plan setup part 40, the default change part 120 converts the set operation plan into the default value corresponding to a predetermined crop. In addition, in a case where the agricultural operation and/or the agricultural operation period is changed by the operation plan setup part 40, the default change part 120 writes the changed agricultural operation and/or the agricultural operation period as the changed default value to the operation standard database 42.

In this manner, the operation plan can be easily created in the plantation of the same crop for several years. For example, in a case of planting the crop that was planted in past, that is, the crop same with the crop that was actually planted, a new operation plan can be created on the basis of the operation plan (the default values of the agricultural operation and the agricultural operation period) serving as the standard corresponding to the crop. In particular, in a case of creating the new operation plan, the agricultural operation and the agricultural operation period both actually used for the plantation serve as the standard, and thus the operation plan can be set without widely changing the agricultural operation and the agricultural operation period. In addition, the operation plan is mainly created by the manager; however, the manager can create a new operation plan based on the certain operation plan at the creation of the operation plan if the manager does not remember his past plantation. In other words, even when a manager (a former manager) who created the operation plan in past is different from a manager (a present manager) who presently creates the operation plan and even when the present manager does not know whether the former manager planted a certain crop, the present manager can creates a new operation plan based on the operation plan of the former manager. Moreover, the present manager can create an operation plan directly employing the operation plan of the former manager.

Meanwhile, in the above described embodiment, the default value of the operation plan (the agricultural operation and the agricultural operation period), the operation plan being changed for the common agricultural fields, is changed when the operation plan (the agricultural operation and the agricultural operation period) is changed for the common agricultural fields; however, the default value can be changed also in a case of setting the operation plan only for an individual agricultural field by using the operation plan setup part 40. The changing of the default in the operation plan of the individual agricultural field will be explained below.

As shown by an arrowed line 900 in FIG. 29, in a case where the default value of the agricultural operation period of the cultivation is "4/1 to 4/7" for the crop "KOSHI-IBUKI", the agricultural operation period of the cultivation is "4/1 to 4/7" for the individual agricultural field (the agricultural field A, the agricultural field B, the agricultural field C, and the agricultural field D), for example.

As shown by an arrowed line 901 in FIG. 29, in a case where the agricultural operation period for the agricultural field A, the agricultural field C, and the agricultural field D is changed from "4/1 to 4/7" to "4/2 to 4/3" by the operation plan setup part 40, the default change part 120 determines that the operation plan is changed. And, the default change part 120 calculates the default value on the basis of the changed operation plan.

For example, the number of the agricultural fields for the same agricultural operation period is calculated out of the individual agricultural fields (the agricultural field A, the agricultural field B, the agricultural field C, and the agricultural field D) for the plantation of "KOSHIIBUKI". The number of agricultural fields for the agricultural operation period "4/1 to 4/7" is "1", and the number of agricultural fields for the agricultural operation period "4/2 to 4/3" is "3". Then, the default change part 120 employs the agricultural operation period of the maximum number of the agricultural fields, that is, "4/2 to 4/3" as a new default value. Meanwhile, the calculation of the default value by the default change part 120 is not limited to the above described manner. For example, in the changed operation plan, an average of the start dates shown in the agricultural operation period may be employed as a start date of the agricultural operation period employed as the default value, an average of the completion dates shown in the agricultural operation period may be employed as a completion date of the agricultural operation period employed as the default value, and other methods may be employed.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

A part of the configuration (for example, the planting plan setup part 30, the planting plan database 31, the operation plan setup part 40, the operation plan database 41, the operation standard database 42, and the like) disposed on the server 2 may be disposed on the management computer 3*a* or the mobile terminal 3*b*. For example, the planting plan setup part 30 and the operation plan setup part 40 are disposed on the server 2 in the above described embodiment; however, the planting plan setup part 30 and the operation plan setup part 40 may be disposed on the management computer 3*a*. In the above described embodiment, the system may be configured by combining: the configuration disposed on the server 2; the configuration disposed on the mobile terminal 3*b*; and the configuration disposed on the management computer 3*a*.

The common setup screen Q2 and the individual setup screen Q3 are displayed on the same screen by the screen integration part 40C in the above described embodiment; however, the common setup screen Q2 and the individual setup screen Q3 may be separately displayed on different screens with each other. In addition, it is preferable that the operation plan setup part 40 sets up the operation plans of the common agricultural field and the individual agricultural field; however, the operation plan may be set up only for the individual agricultural field.

DESCRIPTION OF THE REFERENCE NUMERAL

1 Agriculture support system
2 Server
3 Computer
3*a* Management computer (Personal computer)
3*b* Operator computer (Mobile terminal)
4 Agricultural machine (Tractor)
30 Planting plan setup part
31 Planting plan storage part (Planting plan database)
40 Operation plan setup part
40A Common setup part
40B Individual setup part
40C Screen integration part
41 Operation plan storage part (Operation plan database)
42 Operation standard (Operation standard database)
60 Operation contents creation part
61 Operation contents storage part (Operation contents database)
71 Operation instruction part
72 Obtaining part
73 Sort part
74 Display part (First display part)
84 First notification part
85 Second notification part
86 Setup part
87 Creation part

The invention claimed is:
1. An agriculture support system comprising:
a mobile terminal allocated to an agricultural operator;
an external device different from the mobile terminal;
an operation contents creation part configured to create an operation contents, the operation contents including an agricultural operation to be carried out in an agricultural field; and
an operation instruction part configured to send the operation contents to the mobile terminal, wherein the mobile terminal includes:
an obtaining part configured to obtain the operation contents created by the operation contents creation part;
a first display part configured to display an operation confirmation screen that shows the operation contents, the operation contents being obtained by the obtaining part;
a confirmation button configured to select and confirm the operation contents shown on the operation confirmation screen; and
a notification part configured to notify the external device of completion of selecting and confirming the operation contents using the confirmation button, the operation contents being shown on the operation confirmation screen of the mobile terminal, and wherein
the external device displays the operation contents confirmed by the mobile terminal.

2. An agriculture support system comprising:
a mobile terminal allocated to an agricultural operator;
a server;
an operation contents creation part configured to create an operation contents, the operation contents including an agricultural operation to be carried out in an agricultural field;
an operation instruction part configured to send the operation contents to the mobile terminal the operation contents being created by the operation contents creation part,
wherein
the mobile terminal including:
an obtaining part configured to obtain the operation contents created by the operation contents creation part;
a first display part configured to display an operation confirmation screen that shows the operation contents, the operation contents being obtained by the obtaining part;
a confirmation button configured to select and confirm the operation contents shown on the operation confirmation screen; and
a notification part configured to notify the server of completion of selecting and confirming the operation contents with use of the confirmation button, the operation contents being shown on the operation confirmation screen of the mobile terminal, and wherein
the server creates the operation contents as an interim report when confirmation of the operation contents is notified from the notification part, and converts the interim report into an actual report when completion of the agricultural operation is notified from the notification part.

3. The agriculture support system according to claim 1, wherein
the mobile terminal creates the operation contents as the interim report in the confirmation of the operation contents, and includes:
a creation part configured to convert the interim report into the actual report in the completion of the agricultural operation.

4. An agriculture support system comprising:
a mobile terminal allocated to an agricultural operator;
an external device different from the mobile terminal;
an operation contents creation part configured to create an operation contents based on information inputted by the external device, the operation contents including an agricultural operation to be carried out in an agricultural field; and
an operation instruction part configured to send the operation contents to the mobile terminal, the operation contents being created by the operation contents creation part, wherein the mobile terminal includes:
an obtaining part configured to obtain the operation contents created by the operation contents creation part;
a first display part configured to display an operation confirmation screen that shows the operation contents, the operation contents being obtained by the obtaining part;
a confirmation button configured to select and confirm the operation contents shown on the operation confirmation screen; and
a notification part configured to notify completion of selecting and confirming the operation contents with use of the confirmation button, the operation contents being shown on the operation confirmation screen of the mobile terminal, and wherein
the external device displays the operation contents selected and confirmed by the confirmation button of the mobile terminal.

5. An agriculture support system comprising:
a mobile terminal allocated to an agricultural operator;
an external device different from the mobile terminal;
an operation contents creation part configured to create an operation contents based on information inputted by the external device, the operation contents including an agricultural operation to be carried out in an agricultural field,
an operation instruction part configured to send the operation contents to the mobile terminal, the operation contents being created by the operation contents creation part; and
a server,
wherein the mobile terminal includes:
an obtaining part configured to obtain the operation contents created by the operation contents creation part;
a first display part configured to display an operation confirmation screen that shows the operation contents, the operation contents being obtained by the obtaining part;
a confirmation button configured to select and confirm the operation contents shown on the operation confirmation screen; and
a notification part configured to notify the server of completion of selecting and confirming the operation contents with use of the confirmation button, the operation contents being shown on the operation confirmation screen of the mobile terminal and to notify the server of completion of an agricultural operation, and wherein
the server creates the operation contents as an interim report when confirmation of the operation contents is notified from the notification part, and converts the interim report into an actual report when completion of the agricultural operation is notified from the notification part.

6. An agriculture support system comprising:
a mobile terminal allocated to an agricultural operator;
a control device configured to communicate with the mobile terminal, the control device being mounted on an agricultural machine;
an operation contents creation part configured to create an plural pieces of operation contents, the operation contents including an agricultural operation and an agricultural field for the agricultural operation; and
an operation instruction part configured to send the plural pieces of operation contents to the mobile terminal, wherein
the mobile terminal includes:
a first display part configured to display the plural pieces of operation contents sent by the operation instruction part;
a setup part configured to judge whether a predetermined one of the plural pieces of operation contents shows on the first display part an agricultural operation to be carried out by a predetermined agricultural machine, extract a setup value of the agricultural machine from the operation contents and send the setup value to the control device when the predetermined one of the plural pieces of operation contents shows the agricultural operation to be carried out by the predetermined agricultural machine, and does not send the setup value when the predetermined one of the plural pieces of operation contents does not show the agricultural operation, and the control device configured to set up the agricultural machine based on the setup value sent by the setup part when the agricultural machine is the predetermined agricultural machine shown in the predetermined one of the plural pieces of operation contents.

7. The agriculture support system according to claim 6, further comprising:
a confirmation button configured to select and confirm the operation contents displayed on the first display part.

8. The agriculture support system according to claim 7, wherein the control device outputs a warning to a display device of the mobile terminal or of the agricultural machine when the setting of the agricultural machine cannot be carried out by using the setup value sent by the setup part, the warning indicating that the setup cannot be carried out.

9. An agriculture support system comprising:
an operation plan setup part configured to set an operation plan for each of the agricultural fields, the operation plan relating an agricultural operation and the agricultural operation period where the agricultural operation is carried out to each other;
an operation plan storage part configured to store the operation plan;
a calculation part configured to calculate a progression state of the operation plan, the calculation part being configured to extract the agricultural fields for an identical agricultural operation from the operation plan storage part and to calculate a completion rate of the agricultural fields where the agricultural operation is completed in a group of the agricultural fields having been extracted; and
a progression display part configured to display the completion rate of the agricultural fields as the progression state on a progression state screen, the completion rate of the agricultural fields being calculated by the calculation part, wherein the progression state screen includes:
a plan display part configured to display the operation plan;
a course display part configured to display a time course; and
a result display part configured to display the completion rate of the agricultural fields with respect to the operation plan displayed on the plan display part, and wherein
the progression display part displays a first scale on the result display part along the time course of the course display part, the first scale showing the completion rate of the agricultural fields with respect to the operation plan, and displays a second scale on the result display part along the first scale, the second scale showing an agricultural operation period of the identical agricultural operation for the group of the agricultural fields.

10. The agriculture support system according to claim 9, wherein
the progression display part displays date of the displaying of the progression state on the course display part, and displays an index part corresponding to the date on the first scale or on the second scale.

11. The agriculture support system according to claim 9, wherein:
the first scale is displayed along a scale part showing the completion rate of the agricultural fields, and the progression display part displays a number of the agricultural fields where the agricultural operation is completed between the index part and an end portion of the scale part, the index part indicating the completion rate of the agricultural fields in the first scale, the end portion corresponding to a minimum value of the scale part, and displays a number of the agricultural fields where the agricultural operation is not completed between the index part and another end portion of the scale part, the another end portion corresponding to a maximum value of the scale part.

12. An agriculture support system comprising:
an operation plan setup part configured to set an operation plan of an agricultural operation being to be carried out in an agricultural field, the agricultural field being for a predetermined crop to be planted;
an operation standard storage part configured to store a default value of the operation plan for each of the crops; and
a default change part configured to change the operation plane as a default value corresponding to a predetermined crop when the operation plan of the predetermined crop is changed after the operation plan of the predetermined crop is set by the operation plan setup part and writes the operation plan changed above to the operation standard storage part as the default value corresponding to the predetermined crop, wherein
the operation plan setup part obtains the default value of the operation plan of the crop from the operation standard storage part in the setting of the operation plan, the crop being related to the agricultural field, and sets the operation plan on the basis of the default value previously obtained.

13. The agriculture support system according to claim 12, comprising:
an operation plan storage part configured to store the operation plan, the operation plan being set by the operation plan setup part, wherein
the operation plan setup part obtains the default value of the operation plan from the operation standard storage part, the operation plan including: the agricultural operation for the agricultural field; and the agricultural operation period, and is capable of changing the agricultural operation and/or the agricultural operation period each having obtained,
the operation plan storage part stores the agricultural operation and/or the agricultural operation period as the operation plan, the agricultural operation and the agricultural operation period each having changed, and
the default change part writes the agricultural operation and/or the agricultural operation period to the operation standard storage part as the default value when the agricultural operation and/or the agricultural operation period is changed by the operation plan setup part, the agricultural operation and the agricultural operation period each having changed, the default value having changed.

14. The agriculture support system according to claim 12, wherein
the operation plan setup part includes:
a common setup part configured to set the operation plan of the predetermined to common agricultural fields that are agricultural fields where the predetermined crop is commonly cropped; and
an individual setup part configured to set the operation plan of the predetermined to an individual agricultural field that is an agricultural field where the predetermined crop is cropped, and wherein the default change part changes the operation plan to the common agricultural fields as a default value corresponding to a predetermined crop when the common setup part changes the operation plan of the predetermined crop is changed with respect to the common agricultural fields.

\* \* \* \* \*